US012810263B2

(12) United States Patent
Komandur et al.

(10) Patent No.: US 12,810,263 B2
(45) Date of Patent: Nov. 24, 2026

(54) SYSTEM AND METHOD FOR CROSS-BORDER BLOCKCHAIN PLATFORM

(71) Applicant: ROYAL BANK OF CANADA, Toronto (CA)

(72) Inventors: Venkatadri Kaushik Komandur, Toronto (CA); Goran Zugic, Toronto (CA)

(73) Assignee: ROYAL BANK OF CANADA, Montreal (CA)

( * ) Notice: Subject to any disclaimer, the term of this patent is extended or adjusted under 35 U.S.C. 154(b) by 380 days.

(21) Appl. No.: 16/684,546

(22) Filed: Nov. 14, 2019

(65) Prior Publication Data

US 2020/0151686 A1 May 14, 2020

Related U.S. Application Data

(60) Provisional application No. 62/767,238, filed on Nov. 14, 2018.

(51) Int. Cl.

| | |
|---|---|
| ***G06Q 20/10*** | (2012.01) |
| ***G06F 16/23*** | (2019.01) |
| ***G06Q 20/02*** | (2012.01) |
| ***G06Q 20/38*** | (2012.01) |
| ***G06Q 30/018*** | (2023.01) |
| ***G06Q 40/02*** | (2023.01) |
| ***H04L 9/08*** | (2006.01) |

(52) U.S. Cl.

CPC ......... *G06Q 20/10* (2013.01); *G06F 16/2315* (2019.01); *G06Q 20/02* (2013.01); *G06Q 20/3829* (2013.01); *G06Q 30/0185* (2013.01); *G06Q 40/02* (2013.01); *H04L 9/0819* (2013.01); *G06Q 2220/00* (2013.01); *H04L 2209/56* (2013.01)

(58) Field of Classification Search

None

See application file for complete search history.

(56) References Cited

U.S. PATENT DOCUMENTS 10,410,190 B1 * 9/2019 Kapoor .................. G06Q 20/40
10,423,938 B1 * 9/2019 Gaeta .................. G06Q 20/042

(Continued)

FOREIGN PATENT DOCUMENTS

EP 3454272 A1 * 3/2019 ............. G06Q 40/04
WO WO-2019001141 A1 * 1/2019 ............. G06Q 20/38
WO WO-2019043454 A1 * 3/2019 ........... H04L 9/0637

OTHER PUBLICATIONS

Andreas M. Antonopoulos, Mastering Bitcoin, 2014, First Edition, Published by O'Reilly Media, Inc (Year: 2014).*

*Primary Examiner* — Jahed Ali

(74) *Attorney, Agent, or Firm* — NORTON ROSE FULBRIGHT CANADA LLP

(57) ABSTRACT

An approach for coordinated transaction messaging using a cross-border blockchain platform is described in various embodiments. A blockchain backend data structure, stored across a set of distributed computing nodes provide better transparency of cross border payments and Nostro accounts as such payments are processed through the network of correspondent and beneficiary banks. Correspondents and beneficiary banks record key states of payments transactions and Nostro balance movements directly to the blockchain providing improved payment state transparency.

23 Claims, 13 Drawing Sheets

(56) References Cited

U.S. PATENT DOCUMENTS

| | | | | |
|---|---|---|---|---|
| 10,579,974 | B1 * | 3/2020 | Reed | G06Q 20/065 |
| 10,878,409 | B1 * | 12/2020 | Chheda | G06Q 20/065 |
| 11,182,776 | B1 * | 11/2021 | Bhos | G06Q 20/389 |
| 2005/0246263 | A1 * | 11/2005 | Ogg | G06Q 40/04 705/37 |
| 2012/0016795 | A1 * | 1/2012 | Hill | G06Q 20/102 705/39 |
| 2017/0132630 | A1 * | 5/2017 | Castinado | G06Q 20/385 |
| 2017/0237554 | A1 * | 8/2017 | Jacobs | G06F 21/64 713/171 |
| 2017/0270493 | A1 * | 9/2017 | Lugli | G06Q 20/10 |
| 2018/0025442 | A1 * | 1/2018 | Isaacson | H04L 51/48 705/26.62 |
| 2018/0114205 | A1 * | 4/2018 | Thomas | G06Q 40/02 |
| 2018/0225640 | A1 * | 8/2018 | Chapman | G06Q 20/0855 |
| 2018/0253702 | A1 * | 9/2018 | Dowding | H04L 63/123 |
| 2018/0322485 | A1 * | 11/2018 | Jayaram | G06Q 20/3829 |
| 2019/0080284 | A1 * | 3/2019 | Kim | G06Q 10/0833 |
| 2019/0108140 | A1 * | 4/2019 | Deshpande | G06F 12/1408 |
| 2019/0116142 | A1 * | 4/2019 | Chalakudi | H04L 67/104 |
| 2019/0238525 | A1 * | 8/2019 | Padmanabhan | H04L 63/101 |
| 2019/0280878 | A1 * | 9/2019 | Xia | H04L 9/3247 |
| 2019/0318353 | A1 * | 10/2019 | Castinado | G06Q 40/02 |
| 2019/0318424 | A1 * | 10/2019 | McWilliams | G06Q 20/227 |
| 2020/0074458 | A1 * | 3/2020 | Govindarajan | H04L 9/3247 |
| 2020/0099518 | A1 * | 3/2020 | Jacobs | G06Q 20/3825 |
| 2020/0099531 | A1 * | 3/2020 | Chidambaram | G06Q 50/18 |
| 2020/0184553 | A1 * | 6/2020 | Serrano | G06Q 20/405 |
| 2021/0004799 | A1 * | 1/2021 | Buckman | H04L 9/083 |
| 2021/0320806 | A1 * | 10/2021 | Boudreault | H04L 9/3242 |
| 2021/0326844 | A1 * | 10/2021 | Zhou | G06Q 20/389 |

* cited by examiner

SYSTEM AND METHOD FOR CROSS-BORDER BLOCKCHAIN PLATFORM

CROSS-REFERENCE TO RELATED APPLICATIONS

This application claims all benefit including priority to U.S. Provisional Patent application 62/767,238, filed Nov. 14, 2018, and entitled "SYSTEM AND METHOD FOR CROSS-BORDER BLOCKCHAIN PLATFORM", entirety of which is hereby incorporated by reference.

FIELD

Embodiments of the present disclosure generally relate to the field of transaction messaging, and more specifically, embodiments relate to devices, systems and methods for coordinated transaction messaging using a cross-border blockchain platform.

INTRODUCTION

Existing approaches for conducting cross-border transactions include the Society for Worldwide Interbank Financial Telecommunication (SWIFT) network, which coordinates point-to-point communications between financial institutions. A series of data messages are transferred between the financial institutions, which include payment order data sets that are settled by correspondent accounts as between financial institutions, Financial institutions may, for example, not have direct relationships with one another and, in certain situations, the data messages must utilize further steps in communication through one or more additional intermediary banks. Accordingly, a single transaction may require the involvement of more than two financial institutions, in some aspects.

Currently, cross-border transactions require several days for processing, and it is difficult for end customers to obtain clarity when issues arise that delay processing. Issues that may delay transactions or lead to rejections include incorrect or incomplete data fields, sanctions compliance, anti-money laundering compliance, among others. Delays in transfer further cause uncertainty in amounts being held in various accounts for settlement as between financial institutions, as foreign exchange fluctuate.

To accommodate reconciliation between accounts of the participating financial institutions, an amount of liquidity is required to be maintained in the accounts to accommodate the transfers. An additional reserve amount is maintained to account for potential shifts in exchange rates, and as delays and other uncertainties impact the processing time of the transaction, the size of the reserve amount is increased to maintain sufficient liquidity (e.g., to avoid overdraft fees if there are insufficient funds).

SUMMARY

An improved approach for coordinated transaction messaging using a cross-border blockchain platform is described in various embodiments. The improved approach is adapted to overcome technical deficiencies in existing cross-border transactions by providing a coordinated messaging network or message bus, whereby a blockchain backend data structure, stored across a set of distributed computing nodes provide better transparency of cross border payments and Nostra accounts as such payments are processed through the network of correspondent and beneficiary banks.

In legacy systems, disparate computing systems and processes at intermediate and end financial institutions may not be configured to communicate electronic transaction statuses with each other. In some situations, this can lead to uncertainty as a computing system which transmitted an originating data processing request for an electronic transaction may not be provided with any information regarding whether an intermediate processing task has been successful, has been delayed, has triggered an error status and/or any reasons for such delays or error statuses.

Correspondents and beneficiary banks record key states of payments transactions and Nostro balance movements directly to the blockchain providing improved payment state transparency, driving efficiencies in servicing, investigations and repairs. In addition, this approach enables delivery of an enhanced customer experience through providing better visibility of payment instructions lifecycle including status, fees, settlement times, etc.

Furthermore, a coordinated system allows for Nostro Account Transparency, whereby Treasury users are able to obtain near-real time visibility into Nostra accounts held at intermediary banks. The forecasting process may be improved as near-real time reconciliation can be conducted on the blockchain ledger.

Real time visibility to cash movements in Nostra account(s) enables efficient liquidity management and capital allocation, minimizing exposures, fees (overdraft fees) & charges and ensuring that the financial institution meets its obligations in a timely manner. Furthermore, an additional benefit is the elimination of a batch reconciliation process by providing ability to perform reconciliation in a timely fashion (near real time). In addition, by tracking Nostra mirror account entries on Blockchain, aspects of reconciliation process can be automated through the use of smart contracts.

In some situations, aspects of the present application address technical challenges faced when interfacing distributed ledger technologies with conventional centralized ledger systems such as those operated by financial institutions. For example, aspects of some embodiments may handle out of order messages which can be triggered by different computing systems processing and electronic transaction between different accounts managed by these different computing systems. Aspects of some embodiments may also handle duplicate messages which may be caused by delays in acknowledgement communications, users erroneously submitting duplicate transaction requests, and the like.

Conventional distributed ledger technologies may simply discard out of order messages and/or may simply process duplicate messages as individual transactions. In some situations, these conventional implementations may not be desired.

In accordance with an aspect, there is provided a system for managing data processing states utilizing distributed ledgers on a plurality of nodes, the system comprising: a memory device for storing distributed ledger data, and at least one processor of one or more of the plurality of nodes configured for: receiving an originating data set including parameters for initiating a data process for an electronic transfer from an originator account, managed by a first centralized ledger system associated with a first entity, to a beneficiary account managed by a second centralized ledger system associated with a second entity; generating one or more first entries for storing the originating data set on a distributed ledger and generating signals to initiate propagation of the one or more first entries to the plurality of nodes; generating signals to initiate the data process for execution via an intermediary system; and upon receipt of one or more event messages associated with the data process being executed via the intermediary system, generating one or more event entries for storing in association with the one or more first entries on the distributed ledger and generating signals to initiate propagation of the one or more event entries to the plurality of nodes.

In accordance with another aspect, there is provided a computer-implemented method for managing data processing states utilizing distributed ledgers on a plurality of nodes, the method comprising: receiving an originating data set including parameters for initiating a data process for an electronic transfer from an originator account, managed by a first centralized ledger system associated with a first entity, to a beneficiary account managed by a second centralized ledger system associated with a second entity; generating one or more first entries for storing the originating data set on a distributed ledger and generating signals to initiate propagation of the one or more first entries to the plurality of nodes; generating signals to initiate the data process for execution via an intermediary system; and upon receipt of one or more event messages associated with the data process being executed via the intermediary system, generating one or more event entries for storing in association with the one or more first entries on the distributed ledger and generating signals to initiate propagation of the one or more event entries to the plurality of nodes.

In accordance with another aspect, there is provided a non-transitory, computer readable medium or media having stored thereon instructions which when executed by at least one processor, configure the at least one processor for: receiving an originating data set including parameters for initiating a data process for an electronic transfer from an originator account, managed by a first centralized ledger system associated with a first entity, to a beneficiary account managed by a second centralized ledger system associated with a second entity; generating one or more first entries for storing the originating data set on a distributed ledger and generating signals to initiate propagation of the one or more first entries to a plurality of nodes; generating signals to initiate the data process for execution via an intermediary system; and upon receipt of one or more event messages associated with the data process being executed via the intermediary system, generating one or more event entries for storing in association with the one or more first entries on the distributed ledger and generating signals to initiate propagation of the one or more event entries to the plurality of nodes.

In some embodiments, the instructions when executed configure the at least one processor for performing any or all of the aspects of the methods and processes described herein.

In accordance with another aspect, there is provided a computer implemented method for intermediating cross-border financial transaction messages.

The method comprises, for example, receiving, from one or more computing systems in a payment chain of computing systems, one or more data messages (e.g., SWIFT messages) each having a set of fields representative information associated with a current status of a funds transaction between a first computing system associated with a first jurisdiction and a second computing system associated with a second jurisdiction.

The one or more data messages are generated through a point-to-point network for securing financial transactions. The messages are processed for extracting and consolidating the information associated with the current status of the funds transaction in a data structure on a data storage.

The data structure, in some embodiments, is a distributed ledger synchronized across the one or more computing systems in the payment chain, each computing system adapted to receive the one or more data messages corresponding to the computing system as the funds transaction electronically traverses across the one or more computing systems in the payment chain.

In another aspect, the one or more data messages include pairs of data messages collected at each step of traversal as the funds transaction electronically traverses across the one or more computing systems in the payment chain, a first data message from an earlier computing system in the payment chain, and a corresponding second data message from a subsequent computing system in the payment chain. For example, messages are received from both sides of each step in the point-to-point network (e.g., each financial institution).

The data structure is configured to record state transitions as the funds transaction electronically traverses across the one or more computing systems in the payment chain (e.g., extracting information from the SWIFT message).

One or more logical operators are applied to the data structure to determine whether one or more transaction events has occurred; and responsive to a determination that the one or more transaction events has occurred, a system triggers an alert or sending control signals to modify an amount of reserve funds held for maintaining liquidity to account for foreign exchange fluctuations.

In another aspect, a subset of the one or more computing systems in the payment chain are assigned a role of endorser peer, in which a corresponding digital signature is required from at least one endorser peer before an incoming data message is incorporated into the data structure, the digital signature requirement expressed through a consensus mechanism governing whether the data message will be incorporated into the data structure. The endorser peers control propagation of new information in the distributed ledger.

In another aspect, the data structure is publicly accessible and responsive to an information request data message, any one of the one or more computing systems outputs with a response data message encapsulating the current status of the funds transaction, such that third parties are able to conveniently access transaction status.

In another aspect, the data structure is privately accessible and responsive to an information request data message by a financial institution in the point-to-point network, any one of the one or more computing systems outputs with a response data message encapsulating the current status of the funds transaction, such that third parties are able to conveniently access transaction status.

In another aspect, the method further includes processing the data structure to determine an estimated probability of success and an estimated time to completion of the funds transaction; and modifying of the amount of reserve funds held for maintaining liquidity to account for the foreign exchange fluctuations based at least on the estimated probability of success and the estimated time to completion of the funds transaction. Accordingly, a float size of a modification can be based on an expected time of transaction completion (or steps thereof being completed).

In another aspect, the one or more transaction events include at least one of irregular holds, sanctions-holds, incorrect field entries, returned payments, or routing delays.

In another aspect, the data messages are provided in the form of at least one structured transaction format including at least one of FIN, ISO 20022, (Single Euro Payment Area) SEPA, or FEDWIRE.

The methods are performed on computing systems, including processors, computer readable media, data storage devices, and computer memory.

Corresponding systems, devices, apparatuses, and computer readable media storing machine interpretable instructions, which when executed by processors, perform steps of the approaches above are contemplated.

In some embodiments, the devices are special purpose machines that operate as mechanisms that are configured for interoperation with the point-to-point network of the financial institutions, capturing data messages and encapsulating them for addition onto a backend blockchain data structure that is stored and synchronized as a distributed ledger across a set of computing nodes. The special purpose machines, for example, could represent specific computing nodes that maintain and modify the distributed ledgers stored thereon in accordance with one or more propagation and consensus rules.

The backend data structure stored on the distributed ledgers, in some embodiments, is a blockchain data structure whereby cascaded encryption techniques are utilized to establish a practically immutable data structure consisting of cross-encrypted data blocks, which contain encapsulated data messages stored thereon as obtained during steps of a point-to-point payment process.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

The SWIFT network is an existing approach for coordinating transfers of payments between a first financial institution and a second financial institution, the transfers typically conducted on behalf of customers. SWIFT allows secure transactions as between accounts held at different financial institutions, including in different currencies and in different jurisdictions.

The SWIFT network is provided by a coordinated network of financial institutions, which transmit information to one another through data messages storing data fields organized in relation to a standardized schema of codes. Each financial institution of the network includes computing devices configured to process the data messages, and in accordance with the data messages, process instructions stored therein for funds transfers as between the financial institutions. Processing may be delayed, for example, due to sanctions analyses, anti-money laundering verifications, fraud verifications, among others.

A challenge with the SWIFT network is that not all financial institutions have direct relationships with one another (e.g., the first financial institution does not have a commercial account at the second financial institution, or vice versa). Where the financial institutions do not have a direct relationship, one or more intermediary financial institutions are required to facilitate the transfer. In some cases, where there are differences in currencies between the receiving part of the transaction and the sending part of the transaction, there may be correspondent financial institutions that facilitate foreign exchange services as part of the transaction.

There are other messaging services, including FEDWIRE, FIN, ISO 20022, SEPA, Ripple, CHIPS, among others, and other messaging services aside from SWIFT are contemplated.

Accordingly, cross-border financial transactions are typically complex and suffer from issues in relation to delay, and transparency in messaging that arise in relation to limitations from point-to-point messaging networks.

Figure 1:
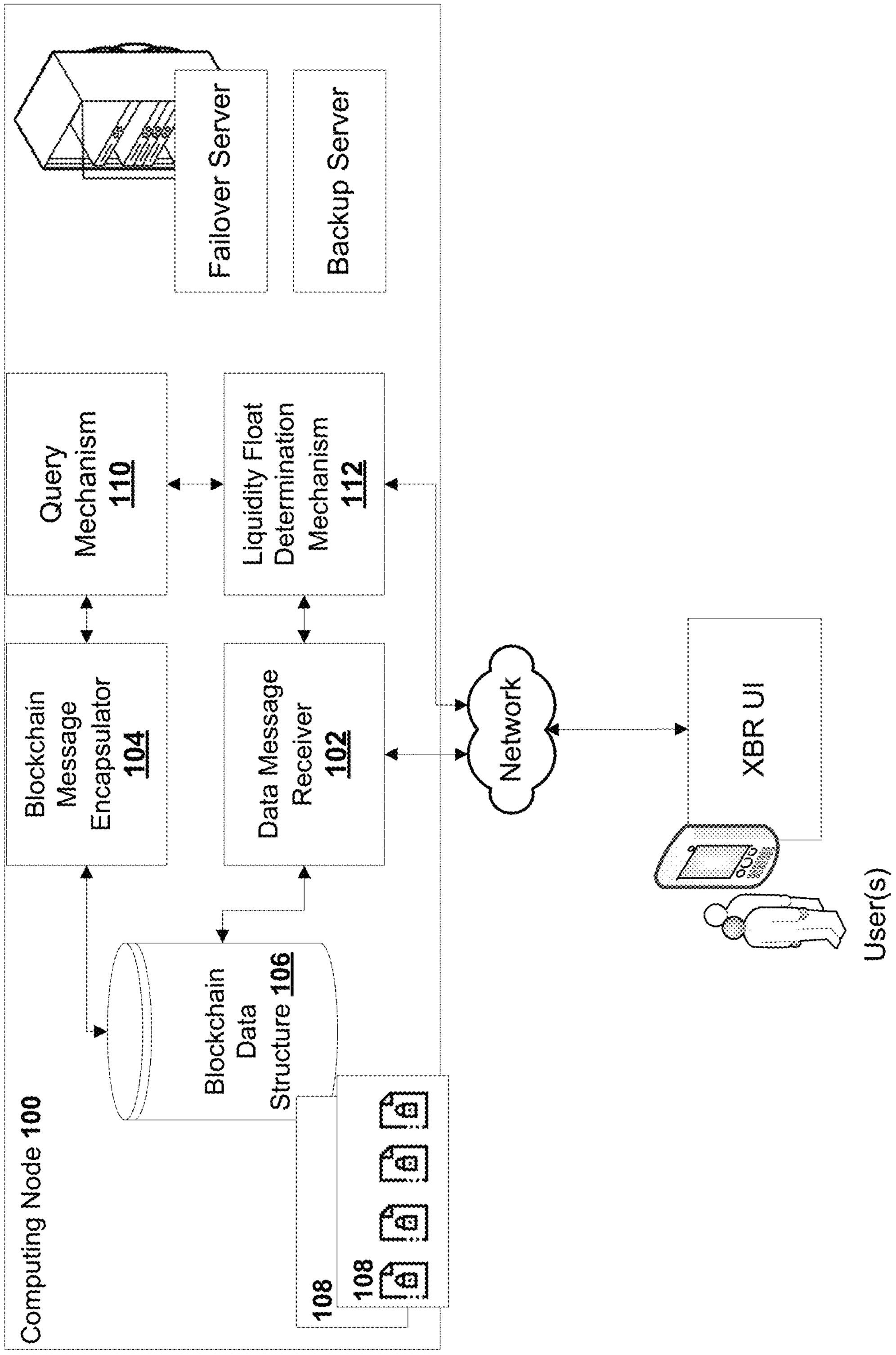
FIG. 1 is an example block schematic diagram illustrating example components of a computing system, according to some embodiments.

FIG. 1 is an example block schematic diagram illustrating example components of a computing system, according to some embodiments. The system is described broadly as the cross border (XBR) Blockchain Solution, which includes the platform described in various embodiments. The components can be implemented using a variety of software and hardware devices, or embedded firmware, and alternate, different, less, more components can be utilized in different embodiments. The components are provided through configured computing resources, including processors, computer memory, data storage, and computer-readable media.

The system 100 is configured for intermediating cross-border financial transaction messages, on a blockchain data structure backend.

A data message receiver 102 is adapted to receive, from one or more computing systems in a payment chain of computing systems, one or more data messages (e.g., SWIFT messages) each having a set of fields representative information associated with a current status of a funds transaction between a first computing system associated with a first jurisdiction and a second computing system associated with a second jurisdiction.

The one or more data messages are generated through a point-to-point network for securing financial transactions.

For example, the point-to-point network could include computing devices configured to transmit and process data messages in accordance with the SWIFT network. The data messages may be provided in the form of chaincodes, which may require pre-processing to identify and segregate payment information and confidential information (e.g., Vostro/Nostro account information, authorization codes) of the transactions thereof.

The messages are processed by the data message receiver 102 for extracting and consolidating the payment information associated with the current status of the funds transaction in a data structure on a data storage. The messages are encapsulated by a blockchain message encapsulator 104 for provisioning onto a blockchain data structure on the data storage. The blockchain message encapsulator 104 can, for example, include mechanisms for interacting and pushing messages to a distributed, horizontally stable commit log which maintains a data structure that is configured only for appending (e.g., no modifications or deletions are possible).

Accordingly, blockchain message encapsulator 104 causes persistent messages to be provided onto a message queue for incorporation onto the blockchain data structure 106.

The blockchain data structure 106, in some embodiments, is maintained across a distributed ledger 108 synchronized across the one or more computing systems in the payment chain, each computing system adapted to receive the one or more data messages corresponding to the computing system as the funds transaction electronically traverses across the one or more computing systems in the payment chain. The distributed ledger 108 can be, built, for example, on a blockchain framework such as Hyperledger Fabric™, among others.

The blockchain framework provides and maintains, through a consensus mechanism, the distributed ledger 108 storing the blockchain data structure, having representations of transactions grouped into blocks that may be hash-linked to preceding blocks of the blockchain data structure. In some embodiments, the one or more computing systems represent permissioned nodes, which, in concert, maintain the distributed ledger 108 and synchronization thereof as blocks representing information extracted from the data messages are added to the blockchain data structure at one or more nodes.

New blocks are then propagated across the nodes to synchronize the distributed ledger 108 in accordance with the propagation mechanism. One or more certificate authority components 130 may be configured to maintain permissions as between nodes. Each organization and corresponding computing systems of an overall payment network topology can include their own certificate authorities as well as endorser components, which include blockchain message encapsulator 104 for actions for interacting with the blockchain data structure 106 and distributed ledger 108. Endorser nodes are configured to validate transactions and to approve or disapprove new transactions, controlling whether they should be appended to distributed ledger 108.

Different deployment structures are possible, for example, having endorser nodes deployed for fault tolerance, high availability (HA), and workload balancing. The deployment structures are configured for improving potential message throughput and performance of the distributed ledger 108, in relation to speed of propagation of block update messages across each distributed ledger 108 stored thereon to ensure a consistent view of distributed ledger 108 at each nodes as blocks are received.

In some embodiments, the network topology includes computing nodes configured to operate as orderer nodes, which help maintain communication channels and broadcast messages as between computing nodes, improving delivery time guarantees and times for synchronizing distributed ledger 108.

The one or more data messages include pairs of data messages collected at each step of traversal as the funds transaction electronically traverses across the one or more computing systems in the payment chain. A first data message from an earlier computing system in the payment chain (e.g., as the payment messages are transferred in each step of a SWIFT transaction), and a corresponding second data message from a subsequent computing system in the payment chain can be collected and a subset of the information from both messages can be added to the distributed ledger.

For example, data messages can be received from both sides of each step in the point-to-point network (e.g., each financial institution). The data structure storing the distributed ledger 108 is configured to record state transitions as the funds transaction electronically traverses across the one or more computing systems in the payment chain (e.g., extracting information from the SWIFT message).

One or more logical operators are applied to the data structure to determine whether one or more transaction events has occurred; and responsive to a determination that the one or more transaction events has occurred, a system triggers an alert or sending control signals to modify an amount of reserve funds held for maintaining liquidity to account for foreign exchange fluctuations.

Accordingly, the distributed ledger 108 stores a persisted view that can be traversed, indicative of a "world state. A query mechanism 110 is provided in some embodiments, supporting complex queries and report generation and analytics through exploring or otherwise retrieving information stored on the distributed ledger 108 to identify state transitions and current states of transactions recorded thereon. For example, reports may be generated to identify situations wherein payments are delayed, issues are encountered, or payments are proceeding in accordance with the due course of a regular payment process. Statuses can include, for example, sent, sent failed, pending, completed, cancelled, awaiting additional information, delayed, among others. In another aspect, the one or more transaction events include at least one of irregular holds, sanctions-holds, incorrect field entries, returned payments, or routing delays.

In another aspect, the query mechanism 110 is configured to process the distributed ledger 108 to determine an estimated probability of success and an estimated time to completion of the funds transaction. These reports may be generated and provided to downstream mechanisms which, for example, may include liquidity float determination mechanism 112, which may utilize the report to generate update signals to manage and/or otherwise modify a total amount of liquidity reserve stored in one or more financial accounts. The amount of liquidity reserve modification may result, for example, based on an expected time of transaction, and a potential foreign exchange rate corresponding to the expected time. Accordingly, a float size of a modification can be based on an expected time of transaction completion (or steps thereof being completed).

Accordingly, the total amount of liquidity reserve can be modified representative of clarity obtained from the report in relation to when the transaction steps may actually occur and require reconciliation between accounts of the financial institutions in the payment chain. A potential improvement may occur as a result of improved liquidity analysis, reducing an overall amount of liquidity reserve while avoiding non-sufficient fund charges.

In another aspect, a subset of the one or more computing systems in the payment chain are assigned a role of endorser peer, in which a corresponding digital signature is required from at least one endorser peer before an incoming data message is incorporated into the data structure, the digital signature requirement expressed through a consensus mechanism governing whether the data message will be incorporated into the data structure. The endorser peers control propagation of new information in the distributed ledger.

In another aspect, the query mechanism 110 is publicly accessible and responsive to an information request data message, any one of the one or more computing systems outputs with a response data message encapsulating the current status of the funds transaction, such that third parties are able to conveniently access transaction status.

In another aspect, the query mechanism 110 is privately accessible and responsive to an information request data message by a financial institution in the point-to-point network, any one of the one or more computing systems outputs with a response data message encapsulating the current status of the funds transaction, such that third parties are able to conveniently access transaction status.

In some embodiments, the devices are special purpose machines that operate as mechanisms that are configured for interoperation with the point-to-point network of the financial institutions, capturing data messages and encapsulating them for addition onto a backend blockchain data structure that is stored and synchronized as a distributed ledger across a set of computing nodes. The special purpose machines, for example, could represent specific computing nodes that maintain and modify the distributed ledgers stored thereon in accordance with one or more propagation and consensus rules.

Figure 2:
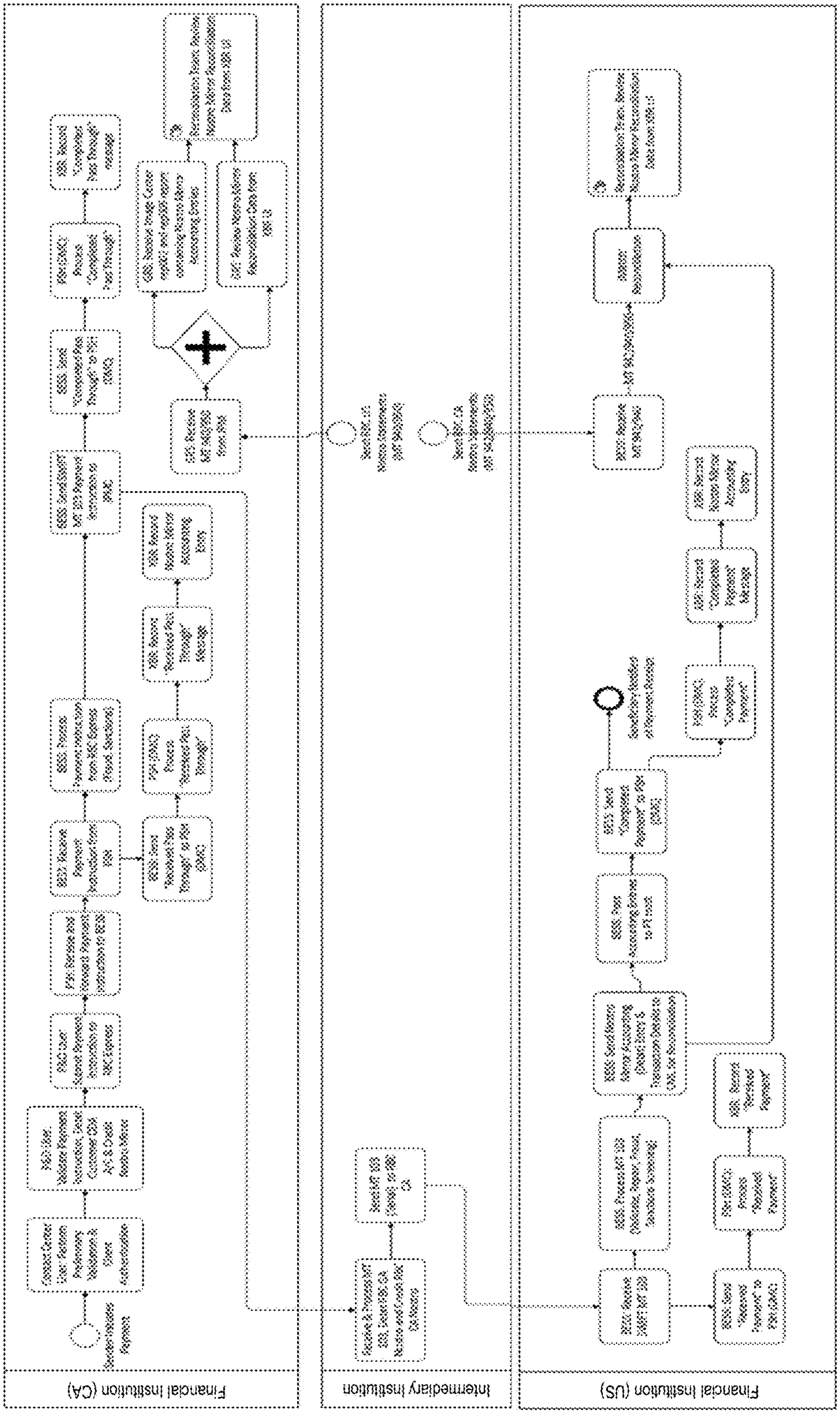
FIG. 2 is a data flow chart of an example method, according to some embodiments.

FIG. 2 is a data flow chart of an example method, according to some embodiments.

The method 200 is adapted for providing payment state transparency and Nostro mirror tracking. This is achieved through recording relevant data in the blockchain data structure at appropriate steps of a financial transaction process and providing interfaces to payment and operations (P&O) and reconciliation users with visibility to payment data and relevant Nostro mirror accounting entries. The method augments other approaches, whose steps continue to be performed.

Financial Institution US: The outbound payment instruction to Intermediary Financial Institution is recorded at both the entry into a payments hub (e.g., BESS) and when it is sent from the payments hub to SWIFT network (after an acknowledgement signal (ACK)/negative acknowledgement signal (NAK) is received). This approach enables the system to notify operations of both successful transmission of message or error scenarios (e.g., NAK, or payment being held for Fraud/Sanctions check).

Financial Institution CA: Similar to Financial Institution US, the payment instruction is recorded both at entry point to the payments hub (indicating the payment has been received for processing) and when the payment process is completed by the payments hub (indicating whether the payment was successfully processed or not).

In addition, payments and operations users, in some embodiments, are provided an interface to review end to end payments state for servicing and investigation purposes.

Nostra Mirror tracking on the platform is provided by the system tracking Nostro mirror balances and debit/credit entries posted to Nostra mirror account for payments between Financial Institution CA and Financial Institution US. Mirror entries tracked on the blockchain data structure can include a subset of transactions that are processed from Financial Institution US Nostro account held at the INTERMEDIARY INSTITUTION.

The tracking of Nostra mirror entries enables the system to, in some embodiments, enable tracking of Nostro accounts in on the blockchain data structure. In addition, in some embodiments, there is an opportunity to perform reconciling in real time (through smart contracts on the blockchain data structure).

Broadly, the design for Nostro Mirror Tracking is explained below:

Nostro Account Modelling: Model the Nostro Mirror account as an asset within XBR blockchain platform. This means modelling the account with relevant data elements such as account number, owning party, balance, transaction details, debit/credit indicator etc. In accordance with some embodiments, the solution can be initialized with two Nostro Mirror accounts: one each for Financial Institution US and Financial Institution CA.

Initialization sets up the Nostro mirror accounts with real account numbers (as they exist in Financial Institution US DDA and Financial Institution CA BESS). Currently, the payments hub holds the Nostro mirror account details as reference data for Financial Institution CA and with Financial Institution US. The Nostra Mirror Accounts are managed through the a PD Teller application. Embodiments of the XBR blockchain platform provides the same for the Financial Institution US and Financial Institution CA mirror accounts.

Financial Institution US Reconciliation: In some embodiments, a reporting mechanism is included to provide real time view of intra-day and end of day Nostro Mirror Account entries, and a report similar to rep 002 and rep 005 so that Nostro Mirror entries recorded in the XBR ledger can be used as an additional source when reconciling the intermediary bank statements. These can be provided through the UI or a data feed.

When the payments hub sends the "Originator Received Message to the XBR blockchain platform, the XBR blockchain platform is configured to record the payment instruction and post a credit entry to Financial Institution GA Nostra Mirror account held in XBR ledger with relevant transaction details. Since the payments user posts credit to Nostro Mirror account (via PD Teller) prior to initiating the wire instruction through Financial Institution Express, this may be consistent with alternate processes.

Since Nostro mirror balances are not tracked in XBR ledger, the XBR blockchain platform can initialize opening balance to zero each day with each credit/debit entry adjusting such a balance. In long term, the balances will reflect the real balances on Nostro account (not mirror account) held at correspondents. With this approach, the XBR blockchain platform will able to provide the key elements contained in rep 002 and rep 005 report to a validation team (through an UI) allowing them to validate that the information contained within XBR ledger is correct and consistent with information received from existing source (PD Teller).

The rep 002 report, for example, can have the following fields: Account, Cost Ctr, Description, User ID, Sequence, Debits, Credits, Net.

Financial Institution CA Reconciliation: In some embodiments, the XBR blockchain platform is adapted to provide Financial Institution CA Reconciliation team with a real time view of intra-day and end of day Nostra Mirror Account entries similar to the real time feed provided by the payments hub so that Nostro Mirror entries recorded in XBR ledger can be used as an additional source when reconciling the intermediary financial institution statements with the current feed received from the payments hub. These will be provided through the UI.

When payment is received by Financial Institution CA from Intermediary Financial Institution, the payments hub processes the incoming wire instruction and posts the completed payment details to the XBR blockchain platform. This message is referred to in this document as "Completed Beneficiary Message" in this document.

The XBR blockchain platform then commits the payment instruction details to the ledger and posts a debit entry to Financial Institution CA Nostro Mirror account with relevant transaction details.

The Financial Institution CA Nostro Mirror account will be defined with a default account number. This approach is consistent with current process in the payments hub since as part of the inbound payment processing, the payments hub sends a real time feed with Nostro mirror account entry and associated transaction details.

Since Nostro mirror balances are not tracked in XBR ledger, the XBR blockchain platform initializes opening balance to zero each day with each credit/debit entry adjusting such a balance. In long term, the balances will reflect the real balances on Nostro account (not mirror account) held at correspondents.

With this approach the XBR blockchain platform will able to provide the same information as contained in real time feed provided by the payments hub to CML allowing the Reconciliation team to validate that the information contained within XBR ledger is correct and consistent with information received from existing sources (e.g., BESS/CML).

In current process, Key assumption with the above approach are following:

- Information outlined above are sufficient for modelling Nostro mirror account in XBR
- Other than the reference data pertaining to the Nostra Mirror account number, details pertaining to posting of debit/credit entries to Nostro mirror are available in the payment instruction (e.g. amount, value date, counterparty details etc.)
- Resetting of Nostra mirror balances at specific time intervals (e.g. beginning of day/end of day) is sufficient for MVP.

Use Cases

The following are list of use cases based on example embodiments, and are not meant to be limiting.

As a Financial Institution US P&O user, a user wishes to record on the XBR ledger, the South North payment instruction received by BESS (from Financial Institution Express) along with associated Nostro mirror account credit entry and balance adjustments. For future stories, this document will refer to this as "Originator Received Message"

As a Financial Institution US P&O user, the user wishes to know the results of account number validation (i.e. checking if account number is 12 digits) and holiday calendar validation on the Originator Received Message.

As a Financial Institution US P&O user, the user wishes to record on the XBR ledger, the South North payment instruction when BESS has completed processing so that I can record the state (e.g. SWIFT ACK/NAK) of the payment instruction. For future stories, will refer to this as "Originator Completed Message"

As a Financial Institution CA P&O user, the user wishes to record on the XBR ledger, the South North payment instruction as received by BESS (from Intermediary Financial Institution). For future stories, this document will refer to this as "Beneficiary Received Message"

As a Financial Institution CA P&O user, the user wishes to record on the XBR ledger, the South North payment instruction when it has completed processing in BESS so that I can record final state of the payment instruction and the Nostro mirror debit entry and balance adjustments. For future use cases, this document will refer to this as "Beneficiary Completed Message".

As a Financial Institution P&O super user, the user needs access to summary and detailed information pertaining to all states of payment instructions pertaining to both the originator (Financial Institution US) and beneficiary (Financial Institution CA) institutions so that the user can perform servicing and investigations. This includes "Originator Received & Completed message" and "Beneficiary Received & Completed message".

As a Financial Institution P&O US or CA user, the user needs a dashboard that provides a quick view of initiated, processed/settled, pending, exception payment transactions, average settlement time/time of credit, average transit time and number of transactions processed based on business date.

As a Financial Institution P&O US user, the user needs a summary comparison view that shows Transaction reference numbers, timestamps, value dates, statuses, amount, originator name & account, beneficiary name and account for "Originator Completed Message" (Financial Institution US) and "Beneficiary Completed Payment" (Financial Institution CA). Since ICNs on originating and beneficiary side payment instructions will be different, transactions will be correlated based on Ordering Customer Name, Ordering Customer Account, Currency and Amount.

As a Financial Institution P&O US user, the user needs a detailed view of payment data pertaining to Originator Received & Completed messages.

As a Financial Institution P&O US user, in the detailed view, the user should only have limited access to fields contained within "Beneficiary Received & Completed" messages. Fields include: transaction reference number, payment status, time of credit, value date, amount and fees by participant (if available).

As a Financial Institution P&O CA user, the user needs a summary comparison view that shows Transaction reference numbers, amount, originator name & account, beneficiary name and account for "Originator Received & Completed Message" (Financial Institution US) and "Beneficiary Completed Payment" (Financial Institution CA). Since ICNs on originating and beneficiary side payment instructions will be different, transactions will be correlated based on Ordering Customer Name, Ordering Customer Account, Currency and Amount.

As a Financial Institution P&O CA user, the user needs a detailed view of payment data pertaining to Beneficiary Received & Completed messages.

As a Financial Institution P&O CA user, in the detailed view, the user should only have access to limited fields contained within "Originator Received & Completed" messages. The field include: transaction reference number, value date, amount and fees by participant (if available).

As a Financial Institution US P&O User, the user needs to receive UI notifications sorted by client when:

a. Payment is pending in BESS by end of day (i.e. Originator Received Message is recorded in ledger but Originator Completed Message is not yet recorded)
b. Originator completed message has a SWIFT NAK status As a Financial Institution CA P&O user, the user needs to receive UI notifications sorted by client when a Received Payment message has not been successfully processed by end of day.

As a Financial Institution CA reconciliation team user, the user needs an intraday view of Nostro Mirror account transactions, relevant debit/credit entries and balances for Financial Institution CA based on Beneficiary Completed Message so that I can validate the correctness and consistency of data in XBR Blockchain solution with the real time accounting entries received from BESS into CML and Nostro statements received from Intermediary Financial Institution.

As a Financial Institution CA reconciliation team user, the user needs historical view of Nostro Mirror account transactions, relevant debit/credit entries and balances for Financial Institution CA based on Beneficiary Completed Message so that I can validate the correctness and consistency of data in XBR Blockchain solution with the real time accounting entries received from BESS into CML and Nostro statements received from Intermediary Financial Institution.

As a Financial Institution CA reconciliation team user, the user needs an ability to access payment details pertaining to transactions within the intra-day view As a Financial Institution CA reconciliation team user, the user needs the system to initialize the Nostro Mirror balance to zero at close of business each day As a Financial Institution US reconciliation team user, the user needs an intraday view of Nostro Mirror account transactions, relevant debit/credit entries and balances for Financial Institution US based on Originator Received Message so that the user can validate the correctness and consistency of data in XBR Blockchain solution with the real time accounting entries received from FIS report (rep002).

As a Financial Institution US reconciliation team user, the user needs historical view of Nostro Mirror account transactions, relevant debit/credit entries and balances for Financial Institution US based on Originator Received Message so that the user can validate the correctness and consistency of data in XBR Blockchain solution with the real time accounting entries received from FIS report (rep002)

As a Financial Institution US reconciliation team user, the user needs ability to access payment details pertaining to transactions within the intra-day view As a Financial Institution US reconciliation team user, the user needs the system to initialize the Nostro Mirror balance to zero at close of business each day As a Financial Institution Reconciliation team user, the user can only access capabilities that match the user's role As a Financial Institution P&O user, the user needs be able to logon to XBR application As a Financial Institution P&O user, the user can access the capabilities that match the user's role.

XBR—Solution Design

Figure 3:
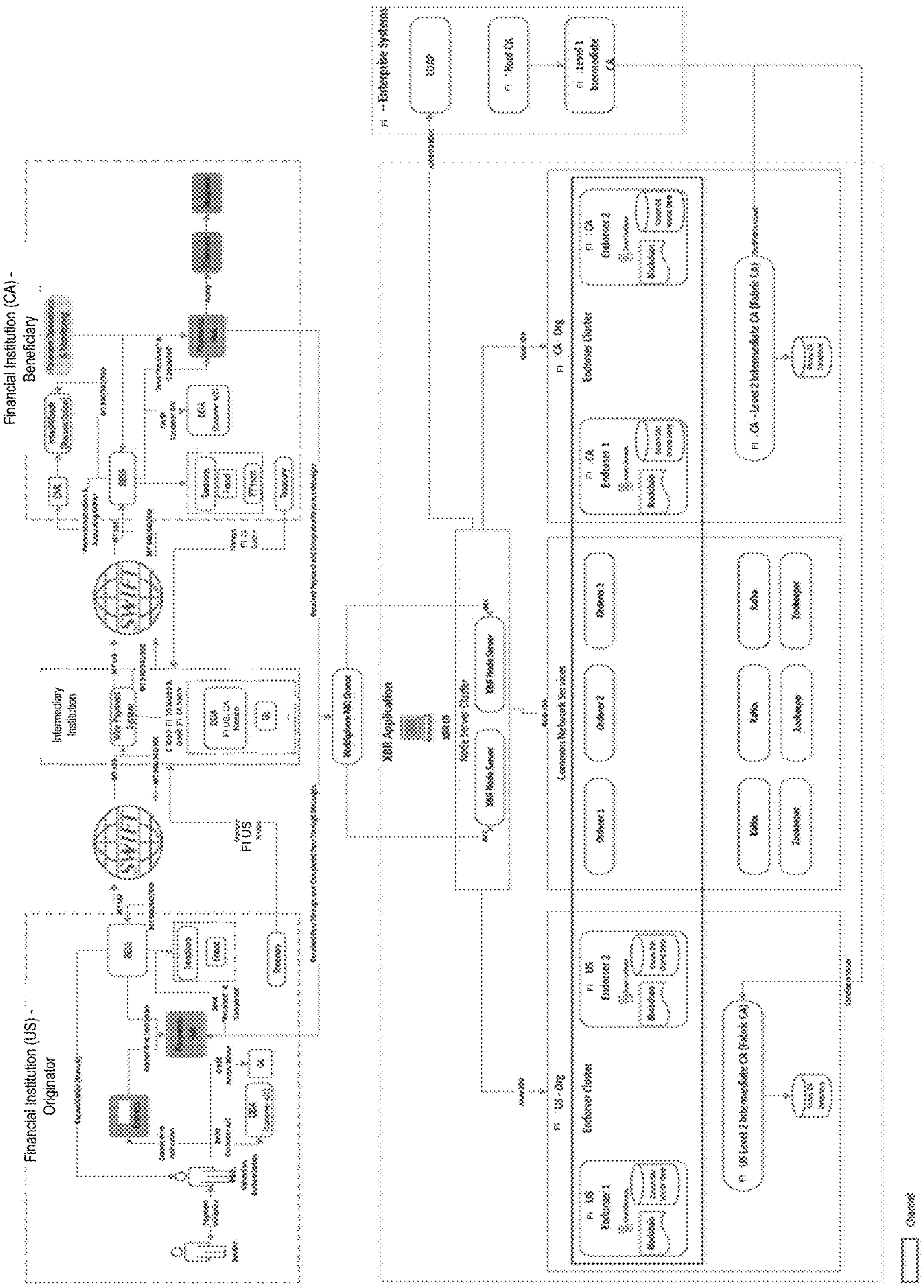
FIG. 3 is a block schematic providing a logical view of overall application and integration design, according to some embodiments.

FIG. 3 is a block schematic providing a logical view of overall application and integration design, according to some embodiments. The deployment topology is described in more detail later in the document.

A key perspective in driving architecture decisions is aligning the design for longer term vision of solution (with external participants being part of network) while addressing the near term scope.

The XBR blockchain platform components as shown in the above diagram are further described below.

XBR UI

A user Interface that enables P&O and Reconciliation teams to access the capabilities provided by the application.

XBR Node Server

XBR Node server is a server side application component that provides the following capabilities:

- Provides the primary interface to the Blockchain network (and underlying distributed ledger) through the invocation of user defined (i.e. XBR Application) and system chain codes using the Hyperledger Fabric provided Node SDK.
- Delivers a set of APIs for front end UI (to support UI capabilities),
- Supports the authentication and authorization of user through integration with Corporate LDAP server and user attributes (e.g. group membership) available in the LDAP
- Encapsulates the integration with external systems such as BESS, PSH and handles of relevant protocol and data transformations prior to the invocation of chain codes As shown in FIG. 3, above, the component can be deployed in a (minimum) 2 node cluster to provide high availability.

XBR Blockchain Network

A blockchain network consisting of Financial Institution, its correspondents and beneficiary banks that participate in a business network to provide cross border payments capability. Aligning with term vision, the network can include two organizations Financial Institution US and Financial Institution CA. Within a Blockchain network, channels are means to provide privacy of chaincodes and data across a set of participants.

In an embodiment, multiple channels are provided to provide privacy of chain codes and data (such as payment instruction details, Nostro accounts etc). For instance Financial Institution's Nostros held with correspondent A should not be visible to correspondent B. However, in near term for the MVP, with two internal participants (Financial Institution US and Financial Institution CA), a bilateral channel will be sufficient. This allows for flexibility to add/remove participants in future to same channel or create additional channels.

As shown in FIG. 3, a single channel will be created with peers in Financial Institution US and Financial Institution CA being part of the same channel. The channel consists of Peer nodes owned by each organization.

Endorser Nodes

In an embodiment, both Financial Institution US and Financial Institution CA run endorser nodes for endorsing the transaction through chaincode execution (simulation) and upon delivery of block from orderer validating the transactions and committing them to the ledger.

An endorser node will be deployed with a dedicated instance of ledger. In context of XBR use case, each organization can run a minimum of two nodes with both nodes acting as endorsers.

Ordering Service

The ordering service provides mechanism for provisioning and managing channels and provides total order guarantees for transactions that are delivered to members (peers) of the channel. In an example implementation, Kafka™ based ordering service can be used. In other embodiments, SOLO orderer™ can also be used. In addition, file based orderer ledger will be used to provide fault tolerance.

Trust Model and Security

A trust model can be provided that is federated in that each such participant bank will run its own Certification Authority (referred to as Intermediate CAs) that will be used to register and enroll its users and fabric components (such as peer nodes) that are owned and operated by such a participant.

In an embodiment, two intermediate CAs are run, one for Financial Institution US and one for Financial Institution CA. Both can be based on Fabric CA, Fabric CA is a Certificate Authority for Hyperledger Fabric. It provides features such as:

1) Registration of identities, or connects to LDAP as the user registry. In case of MVP, these will connect to the Financial Institution corporate LDAP
2) Issuance of Enrollment Certificates (ECerts) for users, nodes (peers, orderers etc.)
3) Certificate renewal and revocation.

In an embodiment, TCerts can be used to provide both anonymity and unlinkability when transacting on a Hyperledger Fabric Blockchain. Fabric CA consists of both a server and a client component as described later in this document.

Financial Institution Root CA (with self-signed certificate) issues certs to an internal Financial Institution Level 1 Intermediate CA. The Certs are based on RSA (2048 key size) and SHA 256. ECC Certs are not supported by Financial Institution CA. Applications such as XBR can then provision intermediate CAs referred to as Level 2 Intermediate CAs, the Level 2 CA certs are signed by Level 1 and Level 2 can then provision application specific certificates.

In line with this approach, the design for federating trust model within XBR will involve the following components:

An intermediate CA (fabric CA server) that will provision ECerts for members of Financial Institution US organization (users, peers etc.). The certificate for this intermediate CA will be provisioned and signed by Financial Institution Level 1 Intermediate CA.

An intermediate CA (fabric CA server) that will provision ECerts for members of Financial Institution CA organization (users, peers etc.). The certificate for this intermediate CA will be provisioned and signed by Financial Institution Level 1 Intermediate CA.

The Orderer certificates will be provisioned and signed by Financial Institution Level 1 intermediate CA.

A same approach can be taken across other environments: DEV, UAT and Prod.

Fabric CA intermediate CAs will use Corporate LDAP to perform user authentication during registration and enrollment process.

A few key design considerations need to be kept in mind with the above approach:

Fabric CA can generate X.509 certificates and keys that support both RSA and Elliptic Curve (ECC). Specifically, Fabric CA can support certificates based on RSA 2048 with SHA 256. Financial Institution Level 1 Intermediate CA and Root CA only support RSA certificates. However, the system can generate ECC based certificate signing requests from Fabric CA. These can be signed by Financial Institution Level 1 Intermediate CA and that Fabric can validate the resulting certificate chain.

When the solution is extended to external participants, certificates issued by Financial Institution Level 1 Intermediate CA will not be acceptable. The XBR Intermediate CAs will need to have certificates issued by external CA. Financial Institution uses Symantec and Verisign as external CAs (although currently external CAs are not used for issuing internal certificates). In this event, channel configuration will have to be changed to accommodate external CAs.

XBR application, specifically the nodejs component will authenticate users through integration with Corporate LDAP. User authorization will be at coarse grained level—controlling access to specific screens instead of at a field level.

Three user roles will be defined for P&O: P&O super user, Financial Institution GA P&O user, Financial Institution CA P&O user to provide access controls for various UI capabilities as described in use cases. LDAP groups will be created for these roles and users will be added to these groups. To provide access to the Financial Institution US Reconciliation screens, an LDAP group Financial Institution US GRS group will be created and users from GRS will be added to the group. To provide access to the Financial Institution CA Reconciliation screens, an LDAP group Financial Institution CA Reconciliation group will be created and users from this team will be added to the group.

In addition, a system user and an associated LDAP group also needs to be defined to enable Node server to invoke the Payment Instruction chaincode towards submitting payment transactions that are received from PSH to the XBR ledger. An ECert will be provisioned for such a system user; Node server will use this ECert when invoking the chaincode to perform this operation.

Role based authorization will occur at two levels.

The Nodejs application will rely on LDAP group membership (retrieved as part of user authentication) to authorize user access to specific UI components and screens.

Chaincode will also perform authorization to ensure that the chaincode operations (such as invokes/queries) etc. are only performed based on privileges available to user in a specific role. The Chaincode authorization prevents unauthorized access to chaincode operations For instance, a query that retrieves a summary view for Financial Institution US user will check if the user is part of Financial Institution US users' LDAP group. The Chaincode authorization will be based on LDAP group membership. Since TCert support and in turn attribute support will not be available in 1.0 GA, we will use the "transient data" field available in the chaincode interface to pass the LDAP group membership attributes (from the nodejs application). When TCert support is available, the authorization could be migrated so that it is based on attributes such as LDAP group membership that will be available in the TCert. Please refer to use cases for access control that will need to be enforced by chaincode for various capabilities.

Chain Code and Endorsement Policy

There may be two chaincodes: Payment Instruction Chaincode and Nostro Mirror Account chaincode.

Payment Instruction Chaincode

The Payment Instruction chaincode is adapted to manage the payment instruction lifecycle. This chaincode will encapsulate validation rules and will commit the four message types mentioned earlier (2 each for Financial Institution GA and Financial Institution CA). Since in the long term both parties (Financial Institution GA, Financial Institution CA) can act in both roles: originator and beneficiary, the chaincode needs to be installed at peers of both organizations.

Since submission of payment instructions by one organization say Financial Institution US does not require the other organization (Financial Institution CA) to validate the transaction (i.e. the underlying states pertaining to the state transition are only visible to organization making the state change in the ledger), the endorsement policy will only require endorsement from a member of either organization. Thus, from endorsement policy perspective, the system may require endorsement from a member of Financial Institution US OR a member of Financial Institution CA, in some embodiments.

In addition, to ensure that a payment transaction submitted by Financial Institution US is only endorsed by peer nodes owned by Financial Institution US, the node server will only request endorsement from a peer node of Financial Institution US organization. However, the transaction will be validated and committed (to ledgers) by all peer nodes of both Financial Institution US and Financial Institution CA organizations.

Similarly, to ensure that a payment transaction submitted by Financial Institution CA is only endorsed by peer nodes owned by Financial Institution CA, the node server will only request endorsement from a peer node of Financial Institution CA organization. However, the transaction will be validated and committed (to ledgers) by all peer nodes of both Financial Institution US and Financial Institution CA organizations.

In a further embodiment, the chaincode interface will be used by originator, beneficiaries and intermediaries to submit the payment instructions as the payment instruction traverses the correspondent bank network. Thus, all these parties need ability to submit payment instruction. Since the access control rules are different between various parties the payment instruction submission can be considered as two methods:

- Submit Originator Payment Instruction: This method that is called by originator FI (e.g. Financial Institution US) to submit the payment instruction. The interface will be based on ISO 20022 pacs 008
- Submit Completed Payment Instruction: This method is called by intermediaries, and beneficiary banks to submit completed payment instruction details. This include potentially any repairs that occurred, status, fees, delivery time etc. The interface will be based on ISO 20022 pacs 008

In addition, we will have a method for submission of payment instruction statuses.

- Submit Payment Instruction Status: A method to submit status of instruction including payment status, fees, delivery time etc. This method could be used to submit payment status details without need to submit entire payment instruction in cases such as parties want to notify of receipt of payment instruction, or just report on generation processing status, fees charged, delivery time etc. This interface will be based on ISO pacs 008. In an alternate embodiment, this could be based this on ISO 20022 pacs 002.

In context of an embodiment:

- Submit Originator Payment Instruction will be used for Originator Received Message and Beneficiary Received Message (taking SWIFT MT 103 as parameter and mapping ISO 20002 pacs 008).
- Submit Completed Payment Instruction will be used for Beneficiary Completed Payment Message (taking SPD as paramter and mapping to ISO 20022 pacs 008)
- Submit Payment Instruction Status will be used for Originator Completed Pass-thru message Nostro Mirror Account Chaincode This chaincode will also be responsible for managing the Nostro Mirror account. This includes tracking the mirror accounts for Financial Institution CA & Financial Institution US, balances and relevant debit/credit entries along with key transaction details. The endorsement policy will be similar to the Payment Instruction Management Chaincode.

This chaincode is not directly called by Node application. The chaincode will be invoked by Payment Instruction Chaincode to post the debit/credit entries to Nostro Mirror account.

The JSON data model for Nostro Mirror Account is described in the Appendix:

Integration with PSH

A key integration component in the solution is the receipt of payment instructions from both Financial Institution US and Financial Institution CA as these instructions are processed within BESS.

For payments originating from Financial Institution US, two key payment states are recorded: payments as they are received in BESS and payments as they are sent by BESS through SWIFT to Intermediary Financial Institution.

These are referred to as Pass Through messages in BESS since they are not processed as payments by BESS; BESS processing is restricted to Fraud and Sanctions scanning. Currently BESS sends these Received Pass Through messages and Completed Pass Through messages to PSH DMC application.

Similarly, as incoming South North payments (from Intermediary Financial Institution) are processed by Financial Institution CA, two states are recorded: payments when they are received by BESS from Intermediary Financial Institution and payments state once BESS has completed processing.

These are referred to as “Received Payments” and “Completed Payments”. Currently BESS sends these Received Payment messages and Completed Payment messages to PSH DMC application.

Currently BESS sends the above messages to a WebSphere MQ queue from where the messages are consumed by PSH DMC application.

In an embodiment, a copy of the above messages can be sent to XBR to record the relevant payment states. WebSphere MQ™ provides a pub sub scheme wherein a queue alias can be set up to be of type Topic with multiple queues set up as subscribers for the topic. Then, when a producer publishes to the topic, the message is copied by WebSphere MQ to subscriber queues. Thus, if BESS publishes to such alias queue then multiple subscribers who subscribe to such a topic (e.g. PSH, XBR) would get the copy of the message.

However, there are a few key tradeoffs with this approach.

- BESS must be modified to write to alias queue
- The message descriptor put on the message which ends up on subscriber queues has new Msglds generated and does not match either the originating one (put to QALIAS by BESS). In addition, the Msglds on subscriber queues do not match.
- The message descriptor origin context of the messages put to Q1 and Q2 represents publish happening in the queue manager and not the original putting application The above could have a larger impact to BESS and PSH and thus this approach will not be taken in the solution.

A solution approach will be to have the PSH DMC application provide a copy of the above messages as it consumes these messages from existing WebSphere MQ queue (used by BESS to publish these messages), PSH DMC will provide the copy of messages onto a new queue that will be used by XBR to consume such messages.

Figure 4:
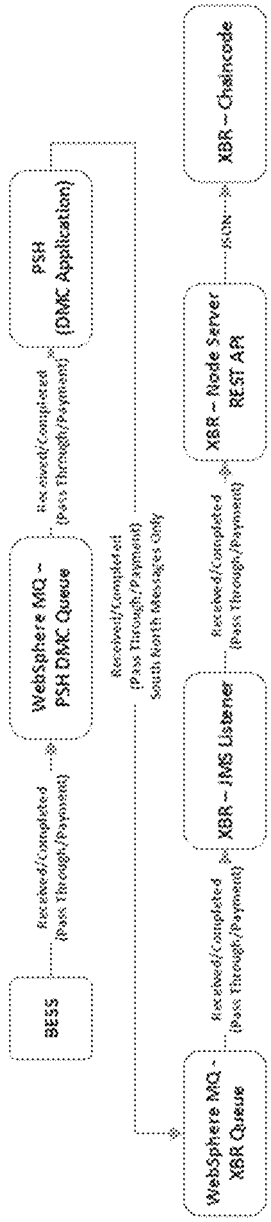
FIG. 4 is a diagram showing a message flow between components, according to some embodiments.

In an embodiment, PSH DMC will filter the messages so that only South North payments are delivered to XBR. This is to avoid XBR having to process the high volume of messages (>200K at present) when only South North payments are relevant for some embodiments. FIG. 4 is a diagram showing a message flow between components, according to some embodiments.

As shown in FIG. 4, a new WebSphere MQ™ will be used for XBR to receive the filtered Received and Completed payment messages from PSH DMC. The Node application will include a JMS listener component that will listen for messages from this queue and invoke the REST API offered by the node application.

The API in turn will perform the parsing of incoming message into a JSON data model and invoke the chaincode to persist the payment data into the Blockchain ledger. The API will return once the transaction has been endorsed by peers and submitted to orderer.

Since the orderer (backed up by Kafka) provides message durability and delivery guarantees, the API does not need to wait until the data has been committed to the ledger (which will occur eventually when blocks are delivered by orderer to peer nodes and peers validate the transaction and commit transaction to ledger).

The messages on XBR Queue will be persistent messages. A Backout threshold and Backout queue needs to be specified on XBR queue so that messages are backed out gracefully in event of that the JMS listener runs into exceptionsierrors when consuming messages and cannot consume messages successfully.

Figure 5:
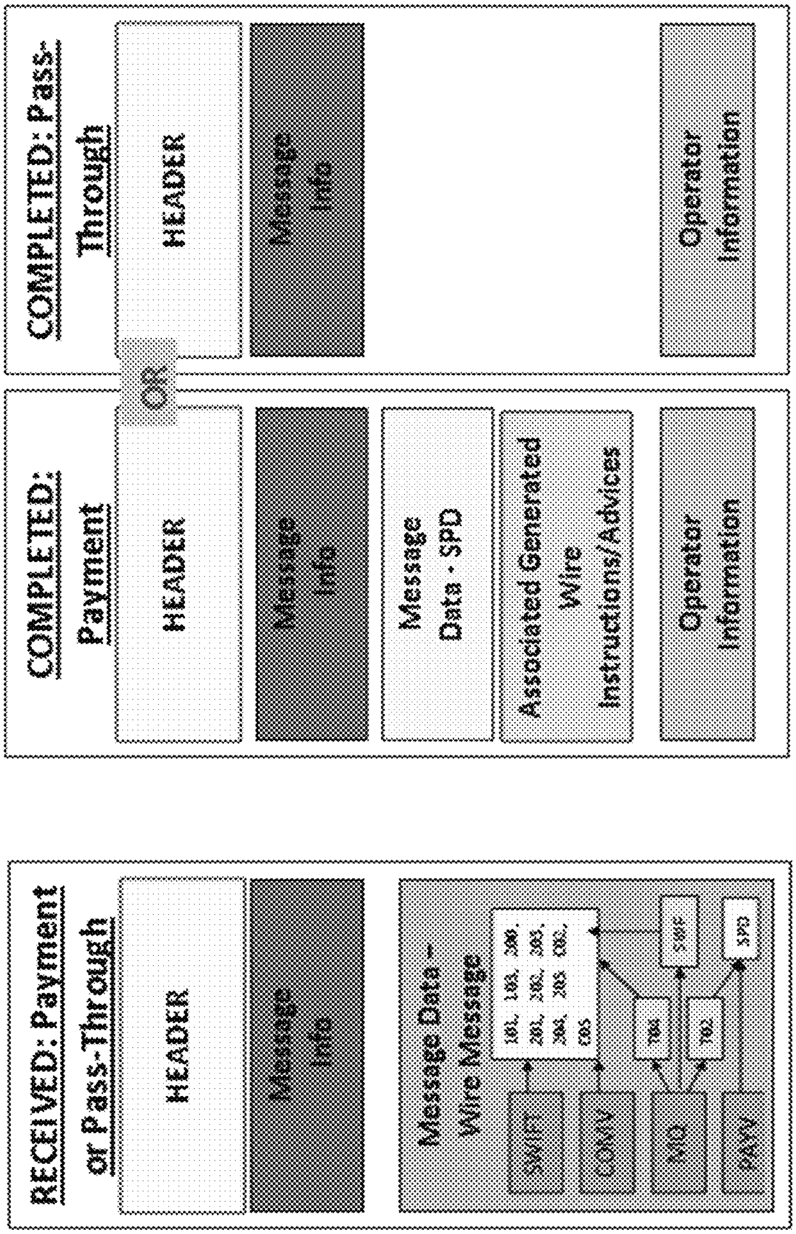
FIG. 5 shows an example message structure, according to some embodiments.

FIG. 5 shows an example message structure, according to some embodiments. FIG. 5 summarizes the structure of Received and Completed Pass Through/Payment messages.

As shown, for payments originating from Financial Institution US, XBR will receive the following messages from PSH:

Received Pass-Through with SWIFT MT 103

Completed Pass-Through

These will be parsed by the Node application and stored as JSON in the Blockchain ledger. This will include the parsing of header, message info and SWIFT MT 103 messages.

For the same payments that are received and processed within BESS, XBR will receive the following messages from PSH Received Pass-Through Completed Payment The structure of Received Payment is similar to Received Pass-Through message. The Completed Payment differs from Received Payment in following ways: the payment data is provided in a "SPD" format; SPD stands for Structured Payment Detail which is BESS internal format, XBR will parse the SPD and persist the payment details as JSON.

The JSON data model will be same for both Received Payment and Completed Payment. The JSON data model is further described in later sections of this document.

Ledger Data Model & Data Store

Couch DB will be used as the data store for the persistence of world state. Couch DB is a key value data store that provides capability to represent data as JSON documents. It provides richer support for complex queries and provides better support for reporting and analytics than the default LevelDB database.

Two key data entities will be modeled: Payment Instruction and Nostro Mirror Account.

The JSON data model for payment instruction will be based on ISO 20022 pacs 008 (pacs.008.001.06) message. Since ISO 20022 has emerged as global industry standard for payments messaging, this will enable us to extend the solution more easily in future to consume ISO 20022 messages. Please refer to Appendix for payment instruction JSON data model.

As discussed earlier, XBR will employ parsers for PSH DMC Message, specifically the Received Passthru/Payment messages and Completed Pass thru and Completed Payment messages.

Since XBR uses Couch DB as the underlying data storage, the messages will be parsed by Node application (that receives the WebSphere MQ messages from JMS Listener) into the payment instruction JSON data model and chaincode will be invoked with this JSON data as parameter.

- Received Passthru message will involve mapping of data elements contained within the Header, Message Info and SWIFT MT 103 sections to the payment instruction JSON model. The SWIFT MT 103 message will be mapped to the CdtTrfTxInf element (of type CreditTransferTransaction25within ISO pacs 008 schema). Key aspects of mapping are described below:
  - Header: All the Header elements will be mapped to Supplementary Data element within ISO pacs 008.
    - Feed Sent Date and Feed Sent Time will be set by XBR to date and time when XBR received message from PSH DMC.
    - ICN will be mapped to both the Msgld in Group Header element and EndToEndld element in the Credit Transfer Transaction Information
  - Message Info:
    - BESS Status will be mapped to a "Payment Status" field within Supplementary Data. For Payments, key statuses to track are DONE and CANCEL. These will be mapped to "Completed" and "Cancelled" statuses. For Wres/Pass Through, it is sufficient to track MSG SVC Accepted, MSG Cancelled by SVC which denote SWIFT ACK/NAK statuses. These will be mapped to "Sent" and "Sent Failed", In addition, when a Received Pass through messages is received by XBR from BESS for Financial Institution US, this (initial) status of payment will be set to "Pending".
    - Received/Sent Date and Time are critical since these indicate the date & time when BESS received/sent the incoming or outgoing payment instruction. These and will be mapped to a field within Supplementary Data element.
    - Subnumber will always default to "000"
    - Service Transport/Type will default to "SWIFT"
    - Rest of fields are not relevant at this point so will not be mapped but could be added in future.
    - SWIFT MT 103: Standard industry mapping of SWIFT MT 103 to ISO pacs 008 will be adopted to map MT 103 to JSON model. The mappings developed as part of the PSH DMC project for mapping MT 103 to ISF V2 will also be used as a reference although we realize that this mapping is on a back dated version of ISO spec.
- Completed Payments message will involve mapping of data elements contained within Header, Message Info and SPD, Instructions & Advise Info, Operator History & Specs. The Completed Pass Thru message (received from BESS for Financial Institution US) only consists of Header, Message Info, Operator History & Specs.

Header: We will map as described earlier

Message Info: We will map as described earlier.

SPD: We will map this to JSON model. The PSH DMC mappings will be used as reference. In addition, since several elements from SPD are not relevant to the use case, we are expecting P&O to provide guidance on subset of fields that will need to be mapped.

Instructions & Advise Info: We will not be mapping or storing this in XBR data model Operator History: We will not be mapping or storing this in XBR data model.

The Nostro Mirror Account can also be modeled as a JSON.

Deployment Topology

Figure 6:
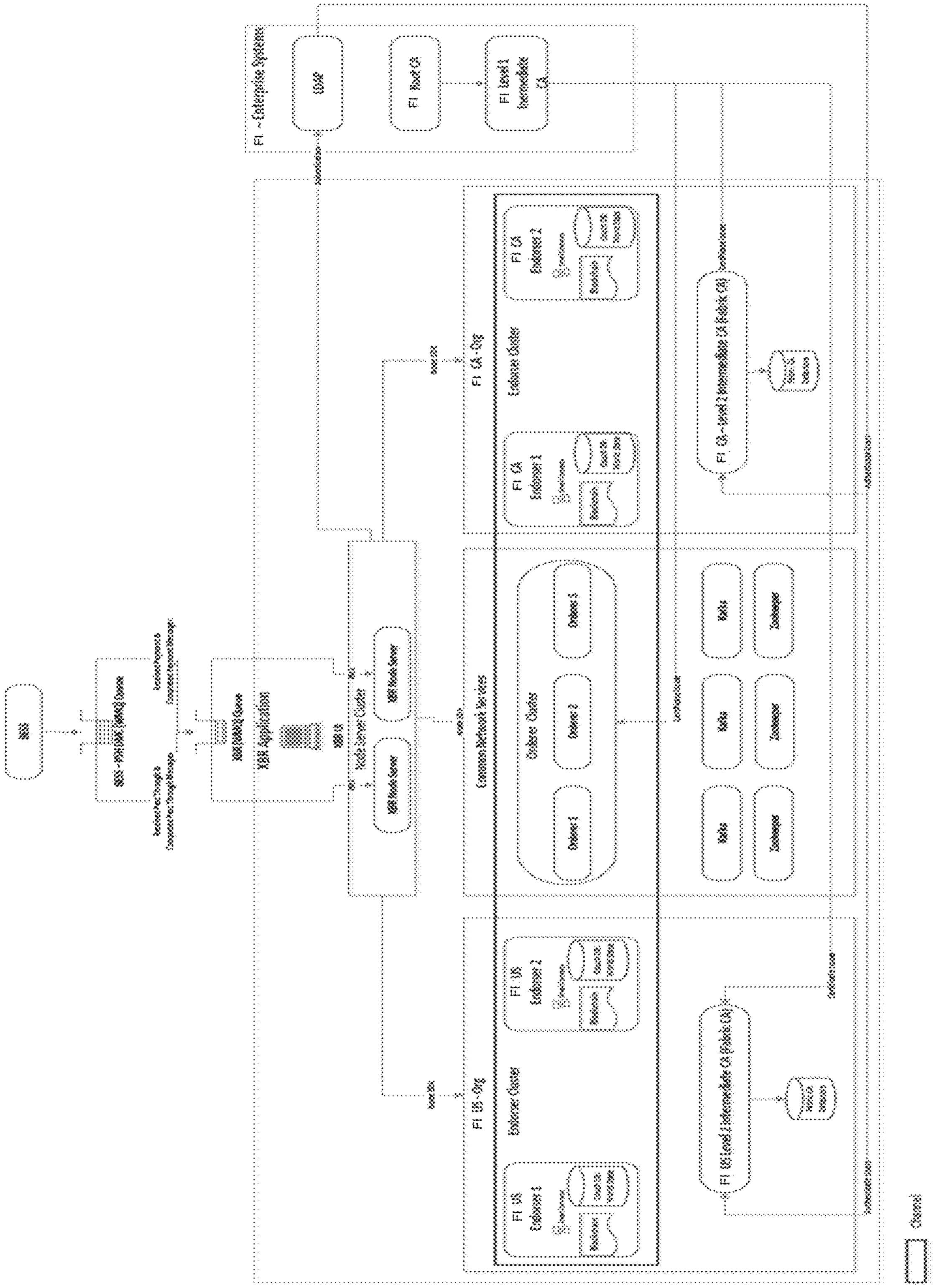
FIG. 6 is a topology diagram, according to some embodiments.

FIG. 6 is a topology diagram, according to some embodiments. As shown, the Financial Institution US and Financial Institution CA are considered distinct organizations within the topology, each with its own set of endorser nodes and Level 2 intermediate CAs (realized as Fabric CA implementations).

Figure 7:
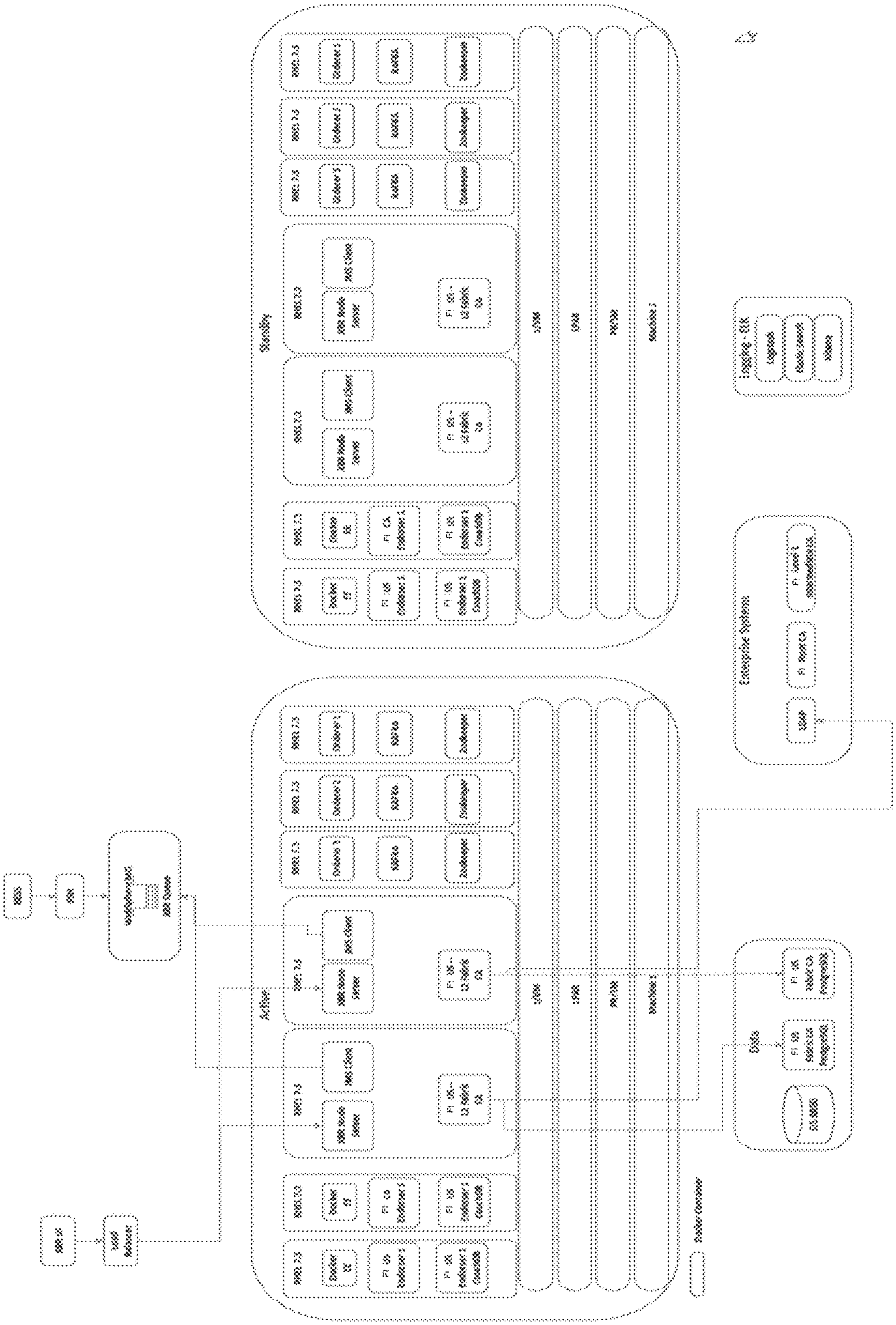
FIG. 7 is a topology diagram for high availability, according to some embodiments.

FIG. 7 is a topology diagram for high availability, according to some embodiments.

Financial Institution has two data centers: SCC (Stratford) and GCC (Guelph) with SCC as the Primary site and GCC as the DR site.

The XBR solution can be deployed in active-standby configuration across two physical mainframes at SCC (referred to as Machine 1 and Machine 2 in the diagram).

The Standby machine (Machine 2) can be a cold standby that will be used to bring up the same configuration as active machine in event of a machine failure. The cold standby configuration is chosen to simplify the topology and to mitigate risk arising out of using an early release of Fabric.

The runtime nodes required for the XBR solution will be deployed to a Single LPAR in both the active and standby machine. 2 IFLs will be assigned per LPAR. The LPARs run z/VM hypervisor and RHEL 7.3 Linux Guests will be deployed onto z/VM to host the various runtime nodes. The distribution of run time nodes to the Linux Guests VMs provides isolation and enable ease of maintenance supporting simpler failover/recovery procedures. A $3^{rd}$ machine (Tspare) is also available as a standby and can be used for failover if standby machine fails.

Endorser Configuration

Wthin each organization (Financial Institution US/CA), at least 2 redundant instances of endorser nodes are deployed for fault tolerance, HA and for workload balancing of transaction proposals received from node application.

Thus, Endorser Nodes for Financial Institution US can be deployed to two RHEL 7.3 Linux Guest, each running the node as a Docker container. Couch DB also runs in a Docker container collocated in same UM as endorser node.

A dedicated CouchDB instance can be deployed for each endorser node; redundancy provided by peer 'replicas' rather than database replicas. Data (logs, hashchain, couchdb) are not stored on the VM but externalized to disk storage system (DS 8880). The Keystore is persisted within the VM but will be backed up on disk. Similarly, Endorser nodes for Financial Institution CA are deployed to two RHEL 7.3 Guests.

Failover scenarios for Endorser node (Financial Institution CA/Financial Institution US):

VM Failure: Requests will be routed to endorser node on the surviving VM while failing VM is restarted on the same LPAR.

Failover is transparent to the client (Node application). When the endorser is brought back up either in a new VM, it will deliver blocks from orderer to get caught up on ledger state.

LPAR/Machine failure: Endorser nodes (with same identity and ip address) as in failing machine are bootstrapped in the machine 2. Downtime is expected to be in order of seconds.

Endorser nodes failure due to CouchDB instance: CouchDB instance will need to be monitored, and in event of failure, the relevant endorser node is marked as failed, the Endorser VM is shut down and restored with a new CouchDB container.

Orderer Configuration

Ordering Service is a shared service that is typically deployed in shared consortium model or hosted by $3^{rd}$ party.

Three RHEL Guests will be deployed for the Orderer Cluster, each running an instance of Orderer, Kafka broker and Zookeeper as collocated Docker containers within the guest VM.

This configuration provides HA of orderer nodes and load balancing of requests (broadcast and delivery requests) to the orderer.

Thus, the Orderer nodes are deployed with a Kafka cluster consisting of 3 brokers and Zookeeper ensemble consisting of 3 nodes. Data (orderer ledger, Kafka logs, Zoo Keeper data directories) are not stored on the VM but externalized to disk storage system (DS 8880). Keystore is persisted within the VM but will be backed up on disk.

The Kafka cluster is configured with topic partition per channel and will be set up with replication factor of 3 and minimum number of in sync replicas as two.

This provides durability of data through replication, provides failover of Kafka brokers and tolerates failure of at most one broker. The Zookeeper ensemble can tolerate failure of at most one node.

Failover scenarios for Orderer Cluster:

VM Failure: Failure of at most one of three VMs that host the Orderer, Kafka broker and Zookeeper nodes can be tolerated since all nodes are collocated in same VM. Requests will be routed to endorser node on the surviving VM while failing VM is restarted on the same LPAR. Failover is transparent to the Node server and Endorser nodes.

VM Failure: Failure of two VMs will render the orderer unavailable (due to Kafka and ZK quorum requirement). The VMs will be restored on the same LPAR (within a few seconds), however until the VMs are restored the orderer is unavailable. Note that while orderer is unavailable, transactions cannot be committed to the ledger, however ledger state can still be queried (i.e. R/O operations are supported).

LPAR/Machine failure: Orderer Nodes (with same identity and ip address), Kafka cluster (same ip address) with associated data volumes as in failing machine are bootstrapped in the machine 2. Downtime is expected to be a few seconds.

NODE, JMS and Fabric Ca Configuration

Two instances of RHEL Guest VMs deployed for Node server, JMS Client and Fabric CA as follows:

Instance 1 will consist of Node server, JMS Client and Fabric CA for Financial Institution US Instance 2 will consist of Node server, JMS Client and Fabric CA for Financial Institution CA.

Requests to the Node server (from XBR UI and JMS Client) are load balanced across the two instances.

Failover scenarios for Node Server:

VM Failure: Requests will be routed to Node server on the surviving VM while failing VM is restarted on the same LPAR. Failover is transparent to the client.

LPAR/Machine failure: Node server VMs are restarted in machine 2. Downtime is expected to be in order of few seconds.

JMS clients deployed to two instances will both consume messages in parallel from the XBR queue (that receives messages from PSH). The REST API calls from JMS client to Node server will be load balances across Node server instances.

The Financial Institution US and Financial Institution CA Intermediate CAs, in some embodiments, are not be deployed in HA configuration. A single instance of both CAs will be deployed with active monitoring in place to recover and resume service in case of failure. The rationale for this as follows:

The Level 2 Intermediate CAs are only used for provisioning of ECerts for user and endorser nodes and thus are not required to be operational at all times to support transaction processing.

The number of users expected to access the application is very low (<10)

Since the rest of topology (endorser nodes, orderers etc.) is being deployed in HA configuration, one can reduce operational complexity by making this architecture trade off.

However, some embodiments include deployment of Level 2 Intermediate CAs with PostgreSQL database. This is because the embedded SQLite database used by Fabric CA does not support HA. Fabric CA requires PostgreSQL or MySQL for HA support. Using SQLite now and migrating to Postgres or MySQL in future will be difficult, thus the application will use Postgres to support HA configuration in future. Postgres is a supported database platform at Financial Institution.

GTI will use existing monitoring tools to monitor the health of Fabric CA (Financial Institution US/Financial Institution CA) to trigger recovery procedures (restart of the Fabric CA container or VM). Since PostgreSQL is run on distributed platform, existing Linux monitoring tools will be used to monitor and restore availability in case of failure. In addition, existing backup and recovery processes will be leveraged for the PostgreSQL database.

Data Architecture

Storage system DS 8880 with RAID 10 is used to provide redundancy and fault tolerance of data volumes. The Guest VMs are stateless (except for keystore).

Data is persisted off Guest VM (hashchain files, couchDB, chaincode binaries, Orderer ledger, Kafka logs and Zookeeper data directories etc.). Currently 25 TB allocated for dev, test, production and DR. Although, data is not mirrored locally, GDPS syspelx can be used for data mirroring to GCC (global mirroring has time lag of few seconds)

In addition, container snapshots (endorser, couchdb, orderer etc.) can be periodically taken and stored on disk for backup and recovery. Logging can be based on ELK infrastructure.

Disaster Recovery

Currently, SCC and GCC configured in Active-Passive Mode. GCC (DR Site) will also have two machines configured in a similar (active-passive configuration) as the SCC site.

Controlled shutdown of Fabric deployment in primary with a recovery in DR site is possible through maintaining a cold standby at DR site.

Endorser nodes (with same identity and ip addresses) are restored from the container snapshots.

Orderer cluster (with same identity and ip addresses) restored with same set of partition log and data directories An assumption is that the RTO is 3 hrs. Cold standby solution can also be used for other DR scenarios (e.g. loss of site). GDPS sysplex can be used for data mirroring to GCC (with minimal time lag resulting in minimal RPO).

Logging and Monitoring

Application and system logging will be based on ELK stack.

Logging in fabric uses go-logging library. Default log level is INFO, use DEBUG in DEV/TEST. Log level specified at bootstrap and can be dynamically altered. All logs are currently directed at stderr.

Since peers, orderers and chaincodes execute within docker containers, the primary source for these logs are docker logs. Docker by default uses the JSON logging driver to write logs to json file /var/lib/docker/containers/<containerid>. Logging options can be controlled by specifying –log-opt max-size and –log-opt max-file=[0–9+] in docker-compose.yaml The docker logs can then be forwarded to ELK sta Syslog server for log aggregation, analysis and visualization.

Dynatrace will be used for application and system monitoring.

Figure 8:
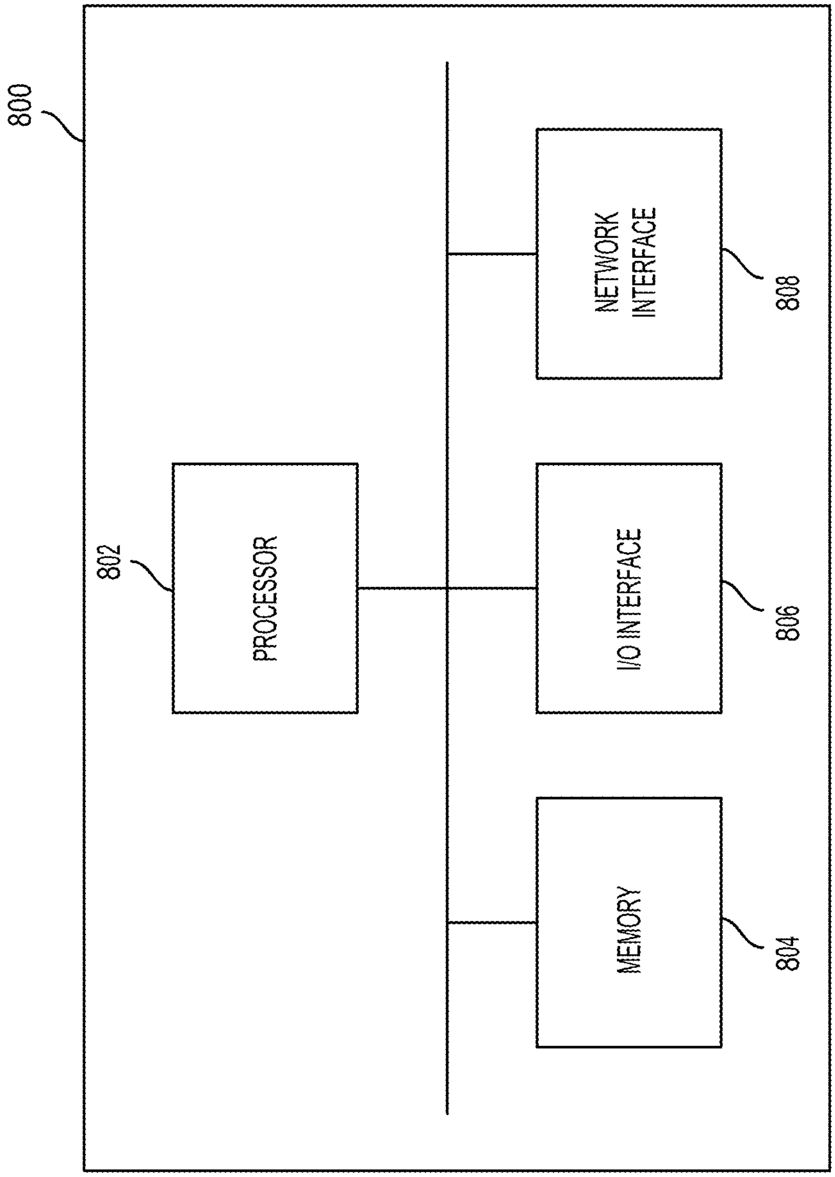
FIG. 8 is a schematic diagram of a computing device such as a server, according to some embodiments.

FIG. 8 is a schematic diagram of a computing device 800 such as a server. As depicted, the computing device includes at least one processor 802, memory 808, at least one I/O interface 806, and at least one network interface 808.

Processor 802 may be an Intel or AMD x86 or x64, PowerPC, ARM processor, or the like. Memory 804 may include a suitable combination of computer memory that is located either internally or externally such as, for example, random-access memory (RAM), read-only memory (ROM), compact disc read-only memory (CDROM).

Each I/O interface 806 enables computing device 800 to interconnect with one or more input devices, such as a keyboard, mouse, camera, touch screen and a microphone, or with one or more output devices such as a display screen and a speaker.

Each network interface 808 enables computing device 800 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others.

Computing device 800 is operable to register and authenticate users (using a login, unique identifier, and password for example) prior to providing access to applications, a local network, network resources, other networks and network security devices. Computing devices 800 may serve one user or multiple users.

The term “connected” or “coupled to” may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

APPENDIX

*1.1 Chaincode Interfaces*

*1.1.1 Payment instruction chaincode*

```
package main

import "github.com/hyperledger/fabric/core/chaincode/shim"

/**
 * RecordPaymentInstruction records a new payment instruction
 * @param stub The chaincode interface to interact with the ledger
 * @param args The string array of arguments of the form:
 *          [0] The JSON representation of the pacs.008 payment instruction to be recorded
 */
func RecordPaymentInstruction(stub shim.ChaincodeStubInterface, args []string) ([]byte, error) {
        return nil, nil
}
```

```
/**
 * QueryPaymentInstructions returns the set of payment instructions visible to the calling user
 * based on the pagination / filter parameters provided.  The identity of the calling user will be
 * determined from the certificate signing the request.
 * @param stub The chaincode interface to interact with the ledger
 * @param args The string array of arguments of the form:
 *           [0] (int) The index of the first message to return
 *           [1] (int) The number of messages to return starting from the start index
 *                          [2] (string) The parameter defining the sorting criteria to be applied before pagination.
 *              Possible values are: TXN_TIMESTAMP, and TXN_VALUEDATE
 * @return A subset of the pacs.008 payment instruction that includes:
 *       - transaction reference number
 *  - transaction timestamp
 *  - value date
 *  - status
 *  - amount
 *  - originator name
```

```
 *  - originator account

 *  - beneficiary name

 *  - beneficiary account

 */

func QueryPaymentInstructions(stub shim.ChaincodeStubInterface, args []string) ([]byte, error) {

        return nil, nil

}


/**

 * QueryPaymentInstructionDetails returns the detailed payment instruction, including the fields that

 * are visible to the calling user.  The identity of the calling user will be determined from the

 * certificate signing the request.

 * @param stub The chaincode interface to interact with the ledger

 * @param args The string array of arguments of the form:

 *          [0] (int) The transaction reference number to use to identify the payment

 *            [1] (boolean) An indicator as to whether to include related payment instructions. For example, if the transaction

 *                              reference number identifies a Beneficiary Received message, a value of TRUE will also return the payment instruction
```

```
*                                  details for the Originator Recieved and Originator completed messages.  The messages will returned in an array
*                                  in descending order of the transaction timestamp
* @return An array of JSON pacs.008 objects.  If args[1] is FALSE and the payment can be located according to the provided
*              reference number, the return array will include a single payment instruction. Otherwise, it will include all related
*              payment instructions, sorted in descending order according ot the transaction timestamp
*/
func QueryPaymentInstructionDetails(stub shim.ChaincodeStubInterface, args []string) ([]byte, error) {
        return nil, nil
}
```

*1.1.2 account entries chaincode*

```
package main

import "github.com/hyperledger/fabric/core/chaincode/shim"
```

```
/**
 * RecordAccountEntry records a new debit / credit entry for a nostro mirror account.
 * @param stub The chaincode interface to interact with the ledger
 * @param args The string array of arguments of the form:
 *          [0] The JSON representation of the debit/credit entry to be recorded
 */
func RecordAccountEntry(stub shim.ChaincodeStubInterface, args []string) ([]byte, error) {
        return nil, nil
}

/**
 * QueryAccountDetails returns the detailed definition of the specified account. The identity of the calling user will be
 * determined from the certificate signing the request, and will be used to determine if the given user has access
 * to the given account.
 * @param stub The chaincode interface to interact with the ledger
 * @param args The string array of arguments of the form:
 *          [0] The account number to retrieve the details of
```

```
*                         [1] The number of mirror account entries to return
*/
func QueryAccountDetails(stub shim.ChaincodeStubInterface, args []string) ([]byte, error) {
        return nil, nil
}


/**
* QueryAccountEntriesByDate returns the set of nostro mirror account entries for the given account
* based on the pagination / filter parameters provided.  The identity of the calling user will be
* determined from the certificate signing the request, and will be used to determine if the given user has access
* to the given account.  Note that entries will be returned in DESCENDING order of timestamp,
* @param stub The chaincode interface to interact with the ledger
* @param args The string array of arguments of the form:
*         [0] (string) The account number to query for account entries
*         [2] (int) The beginning timestamp, specified as MS (GMT) from 1970-01-01
*         [3] (int - option) The ending timestamp, specified as MS (GMT) from 1970-01-01. It not present, the
```

```
*                              ending timestamp will be assumed to be the current date/time
 * @return A JSON array of account entries matching the filtering criteria
 */
func QueryAccountEntriesByDate(stub shim.ChaincodeStubInterface, args []string) ([]byte, error) {
        return nil, nil
}


/**
 * QueryAccountEntriesByIndex returns the set of nostro mirror account entries for the given account
 * based on the index in the list of entries.  The identity of the calling user will be
 * determined from the certificate signing the request, and will be used to determine if the given user has access
 * to the given account.
 * @param stub The chaincode interface to interact with the ledger
 * @param args The string array of arguments of the form:
 *          [0] (string) The account number to query for account entries
 *          [1] (int) The starting index
 *          [2] (int) The number of entries to return starting from the start index
```

```
 * @return A JSON array of account entries matching the filtering criteria
 */
func QueryAccountEntriesByIndex(stub shim.ChaincodeStubInterface, args []string) ([]byte, error) {
	return nil, nil
}
```

1.1.3 dashboard chaincode

```
package main

import "github.com/hyperledger/fabric/core/chaincode/shim"

/**
 * QueryDashboardStatistics returns a set of statistics based on information captured in the XBR ledger
 * All statistics relate to the messages received or oustanding on the current business date, and will be
 * filtered according to the identity of the caller. (i.e. FI-US users will only see transactions related to FI-US)
 * The possible set of statistics returned include:
```

```
* - INITIATED_COUNT - The count of payment instructions in initiated state

* - PROCESSED_COUNT - The count of payment instructions in processed/settled state

* - PENDING_COUNT - The count of payment instructions in pending state

* - EXCEPTION_COUNT - The count of payment instructions in exception state

* - TXN_COUNT - The number of transactions processed (in all states)

* - SETTLEMENT_TIME - The average settlement time/time of credit

* - TRANSIT_TIME - The average transit time


* @param stub The chaincode interface to interact with the ledger

* @param args The string array of arguments of the form:

*           [...] The set of query statistics to return, according to the constants specified above

* @return A JSON array of statistics returned in the order specified in args[0]. Data types will returned as integers

*        Duration statistics indicate a number of milliseconds

*/

func QueryDashboardStatistics(stub shim.ChaincodeStubInterface, args []string) ([]byte, error) {

        return nil, nil

}
```

```
/**
 * QueryDashboardGraph returns a time-based set of values based on information captured in the XBR ledger
 * All statistics relate to the messages received or oustanding on the current business date, and will be
 * filtered according to the identity of the caller. (i.e. FI-US users will only see transactions related to FI-US)
 * The granularity / aggregation of the result data will be based on the time window requested according to the following
 * rules:
 * 0 days   <  window  <= 90 days  - Results returned per day (datestamp is noon GMT per day)
 * 90 days  <  window  <= 180 days - Results returned per week (datestamp is noon GMT on Sunday)
 * 180 days <  window              - Results returned per month (datestamp is noon GMT on first day of the month)
 *
 * @param stub The chaincode interface to interact with the ledger
 * @param args The string array of arguments of the form:
 *                 [0] (string) The data set to return.  Possible values are NOSTRO_MIRROR_ACCOUNT_BALANCE
 *       [1] (int) The start time (as MS from the epoch in GMT) to used to filter the data
```

```
*                [2] (int - optional) The end time (as MS from the epoch in GMT) to use to filter the data.

*          If not provided, the current data/time is used as the upper bound

* @return A JSON array of statistic objects. The format is {"datestamp": <ms from the epoch in GMT>, "value": decimal value for the given date}.

*/

func QueryDashboardGraph(stub shim.ChaincodeStubInterface, args []string) ([]byte, error) {



}
```

*1.1.4 subscriptions chaincode*

```
package main


import "github.com/hyperledger/fabric/core/chaincode/shim"


// QuerySubscriptions returns the list of subscriptions for the given user.  Permission to retrieve

// the list will be based on the certificate of the caller.

// @param stub The chaincode interface to interact with the ledger

// @param args The string array of arguments of the form:

//        <none>
```

```
// @return A JSON array of strings representing notification type identifiers subscribed to. Possible values are:
//      - PAYMENT_NAK
//                  - PAYMENT_OUTSANDING
//      - <IDs of payment instructions (and related chains) to listen to status changes on>
func QuerySubscriptions(stub shim.ChaincodeStubInterface, args []string) ([]byte, error) {
        return nil, nil
}


// CreateSubscription creates a new notification subcription for the calling user of the type specified.
// The type can be either a predefined constant [PAYMENT_NAK, PAYMENT_OUTSTANDING] or the ID of a payment
// instruction to listen to status changes on (including any payment instructions in the relatec chain)
// Permission to retrieve the notification will be based on the certificate of the caller.
// @param stub The chaincode interface to interact with the ledger
// @param args The string array of arguments of the form:
//         [0] (string) The id of the subscription (or payment instruction) to subscribe to
// @return A JSON boolean value indicating the success of the operation
func CreateSubscription(stub shim.ChaincodeStubInterface, args []string) ([]byte, error) {
```

```
        return nil, nil
}

// DeleteSubscription removes the subscription from the set of subscriptions for the calling user
// Permission to update the notification will be based on the certificate of the caller.
// @param stub The chaincode interface to interact with the ledger
// @param args The string array of arguments of the form:
//          [0] (string) The id of the subscription to delete
// @return A JSON boolean value indicating the success of the operation
func DeleteSubscription(stub shim.ChaincodeStubInterface, args []string) ([]byte, error) {
        return nil, nil
}
```

*1.1.5 Notifications chaincode*

```
package main

import "github.com/hyperledger/fabric/core/chaincode/shim"
```

```
/**
 * QueryNotifications returns the list of notifications for the given user.  Permission to retrieve
 * the notification will be based on the certificate of the caller.  The filter criteria determines
the
 * number of notifications to return.  Notifications are sorted by descending received date
 * @param stub The chaincode interface to interact with the ledger
 * @param args The string array of arguments of the form:
 *          [0] (int) The starting index
 *          [1] (int) The number of entries to return starting from the start index
 * @return A JSON boolean value indicating the success of the operation
 */
func QueryNotifications(stub shim.ChaincodeStubInterface, args []string) ([]byte, error) {
        return nil, nil
}


/**
 * QueryNotificationDetails returns the full notification object for the notification identified by
 * the given notification id.  Permission to retrieve the notification will be based on the
certificate
 * of the caller.
```

```
 * @param stub The chaincode interface to interact with the ledger
 * @param args The string array of arguments of the form:
 *          [0] (string) The id of the notification to retrieve the details for.
 * @return A JSON boolean value indicating the success of the operation
 */
func QueryNotificationDetails(stub shim.ChaincodeStubInterface, args []string) ([]byte, error)
{
        return nil, nil
}


/**
 * MarkNotificationAsRead updates an existing notification to indicate that it has been read.
 * Permission to update the notification will be based on the certificate of the caller.
 * @param stub The chaincode interface to interact with the ledger
 * @param args The string array of arguments of the form:
 *          [0] (string) The id of the notification to mark as read
 * @return A JSON boolean value indicating the success of the operation
 */
func MarkNotificationAsRead(stub shim.ChaincodeStubInterface, args []string) ([]byte, error)
{
```

```
        return nil, nil
}


/**
 * DeleteNotification removes the notification for the calling user.
 * Permission to delete the notification will be based on the certificate of the caller.
 * @param stub The chaincode interface to interact with the ledger
 * @param args The string array of arguments of the form:
 *          [0] (string) The notification id to delete
 * @return A JSON boolean value indicating the success of the operation
 */
func DeleteNotification(stub shim.ChaincodeStubInterface, args []string) ([]byte, error) {
        return nil, nil
}


/**
 * ComputeNotifications processes all notification subscription requests and creates
 * the corresponding notifications based on the state of the payment instruction, since the
 * last time ComputNotification was called.
 * @param stub The chaincode interface to interact with the ledger
```

```
 * @param args The string array of arguments of the form:
 *           <none>
 * @return A JSON integer representing the number of notifications created via this request
 */
func ComputeNotifications(stub shim.ChaincodeStubInterface, args []string) ([]byte, error) {
        return nil, nil
}
```

*1.2 Payment Instruction json Data Model*

The golang code illustrates the JSON based data model for Payment Instruction. The payment instruction is mapped to the element FIToFICstmrCdtTrf.

```
package models

// AccountIdentification4Choice ...
type AccountIdentification4Choice struct {
	IBAN string                     `json:"IBAN"`
	Othr GenericAccountIdentification1 `json:"Othr"`
}

// AccountSchemeName1Choice ...
type AccountSchemeName1Choice struct {
	Cd    string `json:"Cd"`
	Prtry string `json:"Prtry"`
}

// ActiveCurrencyAndAmount ...
```

```
type ActiveCurrencyAndAmount struct {
	Value float64 `json:"Value"`
	Ccy   string  `json:"Ccy"`
}

// ActiveOrHistoricCurrencyAndAmount ...
type ActiveOrHistoricCurrencyAndAmount struct {
	Value float64 `json:"Value"`
	Ccy   string  `json:"Ccy"`
}

// BranchAndFinancialInstitutionIdentification5 ...
type BranchAndFinancialInstitutionIdentification5 struct {
	FinInstnId FinancialInstitutionIdentification8 `json:"FinInstnId"`
	BrnchId    BranchData2                         `json:"BrnchId"`
}

// BranchData2 ...
type BranchData2 struct {
	Id     string       `json:"Id"`
```

```
        Nm      string       `json:"Nm"`
        PstlAdr PostalAddress6 `json:"PstlAdr"`
}

// CashAccount24 ...
type CashAccount24 struct {
        Id  AccountIdentification4Choice `json:"Id"`
        Tp  CashAccountType2Choice      `json:"Tp"`
        Ccy string                      `json:"Ccy"`
        Nm  string                      `json:"Nm"`
}

// CashAccountType2Choice ...
type CashAccountType2Choice struct {
        Cd    string `json:"Cd"`
        Prtry string `json:"Prtry"`
}

// CategoryPurpose1Choice ...
type CategoryPurpose1Choice struct {
```

```
        Cd    string `json:"Cd"`
        Prtry string `json:"Prtry"`
}

// Charges2 ...
type Charges2 struct {
        Amt ActiveOrHistoricCurrencyAndAmount          `json:"Amt"`
        Agt BranchAndFinancialInstitutionIdentification5 `json:"Agt"`
}

// ClearingSystemIdentification2Choice ...
type ClearingSystemIdentification2Choice struct {
        Cd    string `json:"Cd"`
        Prtry string `json:"Prtry"`
}

// ClearingSystemIdentification3Choice ...
type ClearingSystemIdentification3Choice struct {
        Cd    string `json:"Cd"`
        Prtry string `json:"Prtry"`
```

```
}

// ClearingSystemMemberIdentification2 ...
type ClearingSystemMemberIdentification2 struct {
	ClrSysId ClearingSystemIdentification2Choice `json:"ClrSysId"`
	MmbId    string                              `json:"MmbId"`
}

// ContactDetails2 ...
type ContactDetails2 struct {
	NmPrfx   string `json:"NmPrfx"`
	Nm       string `json:"Nm"`
	PhneNb   string `json:"PhneNb"`
	MobNb    string `json:"MobNb"`
	FaxNb    string `json:"FaxNb"`
	EmailAdr string `json:"EmailAdr"`
	Othr     string `json:"Othr"`
}

// CreditTransferTransaction25 ...
```

```
type CreditTransferTransaction25 struct {
    PmtId            PaymentIdentification3                    `json:"PmtId"`
    PmtTpInf         PaymentTypeInformation21                  `json:"PmtTpInf"`
    IntrBkSttlmAmt   ActiveCurrencyAndAmount                   `json:"IntrBkSttlmAmt"`
    IntrBkSttlmDt    string                                    `json:"IntrBkSttlmDt"`
    SttlmPrty        string                                    `json:"SttlmPrty"`
    SttlmTmIndctn    SettlementDateTimeIndication1             `json:"SttlmTmIndctn"`
    SttlmTmReq       SettlementTimeRequest2                    `json:"SttlmTmReq"`
    AccptncDtTm      string                                    `json:"AccptncDtTm"`
    PoolgAdjstmntDt  string                                    `json:"PoolgAdjstmntDt"`
    InstdAmt         ActiveOrHistoricCurrencyAndAmount         `json:"InstdAmt"`
    XchgRate         float64                                   `json:"XchgRate"`
    ChrgBr           string                                    `json:"ChrgBr"`
    ChrgsInf         Charges2                                  `json:"ChrgsInf"`
    PrvsInstgAgt     BranchAndFinancialInstitutionIdentification5 `json:"PrvsInstgAgt"`
    PrvsInstgAgtAcct CashAccount24                             `json:"PrvsInstgAgtAcct"`
    InstgAgt         BranchAndFinancialInstitutionIdentification5 `json:"InstgAgt"`
    InstdAgt         BranchAndFinancialInstitutionIdentification5 `json:"InstdAgt"`
    IntrmyAgt1       BranchAndFinancialInstitutionIdentification5 `json:"IntrmyAgt1"`
    IntrmyAgt1Acct   CashAccount24                             `json:"IntrmyAgt1Acct"`
```

```
IntrmyAgt2      BranchAndFinancialInstitutionIdentification5 `json:"IntrmyAgt2"`
IntrmyAgt2Acct  CashAccount24                                `json:"IntrmyAgt2Acct"`
IntrmyAgt3      BranchAndFinancialInstitutionIdentification5 `json:"IntrmyAgt3"`
IntrmyAgt3Acct  CashAccount24                                `json:"IntrmyAgt3Acct"`
UltmtDbtr       PartyIdentification43                        `json:"UltmtDbtr"`
InitgPty        PartyIdentification43                        `json:"InitgPty"`
Dbtr            PartyIdentification43                        `json:"Dbtr"`
DbtrAcct        CashAccount24                                `json:"DbtrAcct"`
DbtrAgt         BranchAndFinancialInstitutionIdentification5 `json:"DbtrAgt"`
DbtrAgtAcct     CashAccount24                                `json:"DbtrAgtAcct"`
CdtrAgt         BranchAndFinancialInstitutionIdentification5 `json:"CdtrAgt"`
CdtrAgtAcct     CashAccount24                                `json:"CdtrAgtAcct"`
Cdtr            PartyIdentification43                        `json:"Cdtr"`
CdtrAcct        CashAccount24                                `json:"CdtrAcct"`
UltmtCdtr       PartyIdentification43                        `json:"UltmtCdtr"`
InstrForCdtrAgt InstructionForCreditorAgent1                 `json:"InstrForCdtrAgt"`
InstrForNxtAgt  InstructionForNextAgent1                     `json:"InstrForNxtAgt"`
Purp            Purpose2Choice                               `json:"Purp"`
RgltryRptg      []RegulatoryReporting3                       `json:"RgltryRptg"`
Tax             TaxInformation3                              `json:"Tax"`
```

```
        RltdRmtInf      []RemittanceLocation4              `json:"RltdRmtInf"`
        RmtInf          RemittanceInformation11            `json:"RmtInf"`
        SplmtryData     SupplementaryData1                 `json:"SplmtryData"`
}

// CreditorReferenceInformation2 ...
type CreditorReferenceInformation2 struct {
        Tp  CreditorReferenceType2 `json:"Tp"`
        Ref string                 `json:"Ref"`
}

// CreditorReferenceType1Choice ...
type CreditorReferenceType1Choice struct {
        Cd    string `json:"Cd"`
        Prtry string `json:"Prtry"`
}

// CreditorReferenceType2 ...
type CreditorReferenceType2 struct {
        CdOrPrtry CreditorReferenceType1Choice `json:"CdOrPrtry"`
```

```
        Issr    string              `json:"Issr"`
}

// DateAndPlaceOfBirth ...
type DateAndPlaceOfBirth struct {
        BirthDt    string `json:"BirthDt"`
        PrvcOfBirth string `json:"PrvcOfBirth"`
        CityOfBirth string `json:"CityOfBirth"`
        CtryOfBirth string `json:"CtryOfBirth"`
}

// DatePeriodDetails ...
type DatePeriodDetails struct {
        FrDt string `json:"FrDt"`
        ToDt string `json:"ToDt"`
}

// DiscountAmountAndType1 ...
type DiscountAmountAndType1 struct {
        Tp  DiscountAmountType1Choice      `json:"Tp"`
```

```
	Amt ActiveOrHistoricCurrencyAndAmount `json:"Amt"`
}


// DiscountAmountType1Choice ...
type DiscountAmountType1Choice struct {
	Cd    string `json:"Cd"`
	Prtry string `json:"Prtry"`
}


// Document ...
type Document struct {
	FIToFICstmrCdtTrf FIToFICustomerCreditTransferV06 `json:"FIToFICstmrCdtTrf"`
}


// DocumentAdjustment1 ...
type DocumentAdjustment1 struct {
	Amt       ActiveOrHistoricCurrencyAndAmount `json:"Amt"`
	CdtDbtInd string                            `json:"CdtDbtInd"`
	Rsn       string                            `json:"Rsn"`
	AddtlInf  string                            `json:"AddtlInf"`
```

```
}

// DocumentLineIdentification1 ...
type DocumentLineIdentification1 struct {
	Tp     DocumentLineType1 `json:"Tp"`
	Nb     string            `json:"Nb"`
	RltdDt string            `json:"RltdDt"`
}

// DocumentLineInformation1 ...
type DocumentLineInformation1 struct {
	Id   DocumentLineIdentification1 `json:"Id"`
	Desc string                      `json:"Desc"`
	Amt  RemittanceAmount3           `json:"Amt"`
}

// DocumentLineType1 ...
type DocumentLineType1 struct {
	CdOrPrtry DocumentLineType1Choice `json:"CdOrPrtry"`
	Issr      string                  `json:"Issr"`
```

```
}

// DocumentLineType1Choice ...
type DocumentLineType1Choice struct {
        Cd    string `json:"Cd"`
        Prtry string `json:"Prtry"`
}

// FIToFICustomerCreditTransferV06 ...
type FIToFICustomerCreditTransferV06 struct {
        GrpHdr      GroupHeader70               `json:"GrpHdr"`
        CdtTrfTxInf CreditTransferTransaction25 `json:"CdtTrfTxInf"`
        SplmtryData SupplementaryData1          `json:"SplmtryData"`
}

// FinancialIdentificationSchemeName1Choice ...
type FinancialIdentificationSchemeName1Choice struct {
        Cd    string `json:"Cd"`
        Prtry string `json:"Prtry"`
}
```

```
// FinancialInstitutionIdentification8 ...

type FinancialInstitutionIdentification8 struct {

    BICFI      string                          `json:"BICFI"`

    ClrSysMmbId ClearingSystemMemberIdentification2 `json:"ClrSysMmbId"`

    Nm         string                          `json:"Nm"`

    PstlAdr    PostalAddress6                  `json:"PstlAdr"`

    Othr       GenericFinancialIdentification1 `json:"Othr"`

}


// Garnishment1 ...

type Garnishment1 struct {

    Tp              GarnishmentType1             `json:"Tp"`

    Grnshee         PartyIdentification43        `json:"Grnshee"`

    GrnshmtAdmstr   PartyIdentification43        `json:"GrnshmtAdmstr"`

    RefNb           string                       `json:"RefNb"`

    Dt              string                       `json:"Dt"`

    RmtdAmt         ActiveOrHistoricCurrencyAndAmount `json:"RmtdAmt"`

    FmlyMdclInsrncInd bool                       `json:"FmlyMdclInsrncInd"`

    MplyeeTermntnInd  bool                       `json:"MplyeeTermntnInd"`
```

```
}

// GarnishmentType1 ...
type GarnishmentType1 struct {
	CdOrPrtry GarnishmentType1Choice `json:"CdOrPrtry"`
	Issr      string                 `json:"Issr"`
}

// GarnishmentType1Choice ...
type GarnishmentType1Choice struct {
	Cd    string `json:"Cd"`
	Prtry string `json:"Prtry"`
}

// GenericAccountIdentification1 ...
type GenericAccountIdentification1 struct {
	Id      string                      `json:"Id"`
	SchmeNm AccountSchemeName1Choice    `json:"SchmeNm"`
	Issr    string                      `json:"Issr"`
}
```

```
// GenericFinancialIdentification1 ...
type GenericFinancialIdentification1 struct {
    Id      string                                  `json:"Id"`
    SchmeNm FinancialIdentificationSchemeName1Choice `json:"SchmeNm"`
    Issr    string                                  `json:"Issr"`
}

// GenericOrganisationIdentification1 ...
type GenericOrganisationIdentification1 struct {
    Id      string                                     `json:"Id"`
    SchmeNm OrganisationIdentificationSchemeName1Choice `json:"SchmeNm"`
    Issr    string                                     `json:"Issr"`
}

// GenericPersonIdentification1 ...
type GenericPersonIdentification1 struct {
    Id      string                               `json:"Id"`
    SchmeNm PersonIdentificationSchemeName1Choice `json:"SchmeNm"`
    Issr    string                               `json:"Issr"`
```

```
}

// GroupHeader70 ...
type GroupHeader70 struct {
        MsgId           string                          `json:"MsgId"`
        CreDtTm         string                          `json:"CreDtTm"`
        BtchBookg       bool                            `json:"BtchBookg"`
        NbOfTxs         string                          `json:"NbOfTxs"`
        CtrlSum         float64                         `json:"CtrlSum"`
        TtlIntrBkSttlmAmt ActiveCurrencyAndAmount               `json:"TtlIntrBkSttlmAmt"`
        IntrBkSttlmDt   string                          `json:"IntrBkSttlmDt"`
        SttlmInf        SettlementInstruction4                  `json:"SttlmInf"`
        PmtTpInf        PaymentTypeInformation21                `json:"PmtTpInf"`
        InstgAgt        BranchAndFinancialInstitutionIdentification5 `json:"InstgAgt"`
        InstdAgt        BranchAndFinancialInstitutionIdentification5 `json:"InstdAgt"`
}

// InstructionForCreditorAgent1 ...
type InstructionForCreditorAgent1 struct {
        Cd      string `json:"Cd"`
```

```
        InstrInf string `json:"InstrInf"`
}

// InstructionForNextAgent1 ...
type InstructionForNextAgent1 struct {
        Cd       string `json:"Cd"`
        InstrInf string `json:"InstrInf"`
}

// LocalInstrument2Choice ...
type LocalInstrument2Choice struct {
        Cd    string `json:"Cd"`
        Prtry string `json:"Prtry"`
}

// NameAndAddress10 ...
type NameAndAddress10 struct {
        Nm  string          `json:"Nm"`
        Adr PostalAddress6 `json:"Adr"`
}
```

```
// OrganisationIdentification8 ...

type OrganisationIdentification8 struct {

        AnyBIC string                        `json:"AnyBIC"`

        Othr   GenericOrganisationIdentification1 `json:"Othr"`

}


// OrganisationIdentificationSchemeName1Choice ...

type OrganisationIdentificationSchemeName1Choice struct {

        Cd    string `json:"Cd"`

        Prtry string `json:"Prtry"`

}


// Party11Choice ...

type Party11Choice struct {

        OrgId  OrganisationIdentification8 `json:"OrgId"`

        PrvtId PersonIdentification5       `json:"PrvtId"`

}


// PartyIdentification43 ...
```

```
type PartyIdentification43 struct {
	Nm        string          `json:"Nm"`
	PstlAdr   PostalAddress6  `json:"PstlAdr"`
	Id        Party11Choice   `json:"Id"`
	CtryOfRes string          `json:"CtryOfRes"`
	CtctDtls  ContactDetails2 `json:"CtctDtls"`
}

// PaymentIdentification3 ...
type PaymentIdentification3 struct {
	InstrId    string `json:"InstrId"`
	EndToEndId string `json:"EndToEndId"`
	TxId       string `json:"TxId"`
	ClrSysRef  string `json:"ClrSysRef"`
}

// PaymentTypeInformation21 ...
type PaymentTypeInformation21 struct {
	InstrPrty string          `json:"InstrPrty"`
	ClrChanl  string          `json:"ClrChanl"`
```

```
    SvcLvl    ServiceLevel8Choice    `json:"SvcLvl"`
    LclInstrm LocalInstrument2Choice `json:"LclInstrm"`
    CtgyPurp  CategoryPurpose1Choice `json:"CtgyPurp"`
}

// PersonIdentification5 ...
type PersonIdentification5 struct {
    DtAndPlcOfBirth DateAndPlaceOfBirth         `json:"DtAndPlcOfBirth"`
    Othr            GenericPersonIdentification1 `json:"Othr"`
}

// PersonIdentificationSchemeName1Choice ...
type PersonIdentificationSchemeName1Choice struct {
    Cd    string `json:"Cd"`
    Prtry string `json:"Prtry"`
}

// PostalAddress6 ...
type PostalAddress6 struct {
    AdrTp      string   `json:"AdrTp"`
```

```
        Dept        string   `json:"Dept"`
        SubDept     string   `json:"SubDept"`
        StrtNm      string   `json:"StrtNm"`
        BldgNb      string   `json:"BldgNb"`
        PstCd       string   `json:"PstCd"`
        TwnNm       string   `json:"TwnNm"`
        CtrySubDvsn string   `json:"CtrySubDvsn"`
        Ctry        string   `json:"Ctry"`
        AdrLine     []string `json:"AdrLine"`
}

// Purpose2Choice ...
type Purpose2Choice struct {
        Cd    string `json:"Cd"`
        Prtry string `json:"Prtry"`
}

// ReferredDocumentInformation7 ...
type ReferredDocumentInformation7 struct {
        Tp      ReferredDocumentType4    `json:"Tp"`
```

```
        Nb       string                 `json:"Nb"`

        RltdDt   string                 `json:"RltdDt"`

        LineDtls DocumentLineInformation1 `json:"LineDtls"`

}



// ReferredDocumentType3Choice ...

type ReferredDocumentType3Choice struct {

        Cd    string `json:"Cd"`

        Prtry string `json:"Prtry"`

}



// ReferredDocumentType4 ...

type ReferredDocumentType4 struct {

        CdOrPrtry ReferredDocumentType3Choice `json:"CdOrPrtry"`

        Issr      string                      `json:"Issr"`

}



// RegulatoryAuthority2 ...

type RegulatoryAuthority2 struct {

        Nm   string `json:"Nm"`
```

```
        Ctry string `json:"Ctry"`
}


// RegulatoryReporting3 ...
type RegulatoryReporting3 struct {
        DbtCdtRptgInd string                    `json:"DbtCdtRptgInd"`
        Authrty      RegulatoryAuthority2         `json:"Authrty"`
        Dtls         StructuredRegulatoryReporting3 `json:"Dtls"`
}


// RemittanceAmount2 ...
type RemittanceAmount2 struct {
        DuePyblAmt       ActiveOrHistoricCurrencyAndAmount `json:"DuePyblAmt"`
        DscntApldAmt      DiscountAmountAndType1          `json:"DscntApldAmt"`
        CdtNoteAmt       ActiveOrHistoricCurrencyAndAmount `json:"CdtNoteAmt"`
        TaxAmt           TaxAmountAndType1               `json:"TaxAmt"`
        AdjstmntAmtAndRsn DocumentAdjustment1             `json:"AdjstmntAmtAndRsn"`
        RmtdAmt          ActiveOrHistoricCurrencyAndAmount `json:"RmtdAmt"`
}
```

```
// RemittanceAmount3 ...
type RemittanceAmount3 struct {
	DuePyblAmt        ActiveOrHistoricCurrencyAndAmount `json:"DuePyblAmt"`
	DscntApldAmt      DiscountAmountAndType1           `json:"DscntApldAmt"`
	CdtNoteAmt        ActiveOrHistoricCurrencyAndAmount `json:"CdtNoteAmt"`
	TaxAmt            TaxAmountAndType1                `json:"TaxAmt"`
	AdjstmntAmtAndRsn DocumentAdjustment1              `json:"AdjstmntAmtAndRsn"`
	RmtdAmt           ActiveOrHistoricCurrencyAndAmount `json:"RmtdAmt"`
}

// RemittanceInformation11 ...
type RemittanceInformation11 struct {
	Ustrd string                              `json:"Ustrd"`
	Strd  StructuredRemittanceInformation13 `json:"Strd"`
}

// RemittanceLocation4 ...
type RemittanceLocation4 struct {
	RmtId       string                     `json:"RmtId"`
	RmtLctnDtls RemittanceLocationDetails1 `json:"RmtLctnDtls"`
```

```
}

// RemittanceLocationDetails1 ...
type RemittanceLocationDetails1 struct {
	Mtd        string         `json:"Mtd"`
	ElctrncAdr string         `json:"ElctrncAdr"`
	PstlAdr    NameAndAddress10 `json:"PstlAdr"`
}

// ServiceLevel8Choice ...
type ServiceLevel8Choice struct {
	Cd    string `json:"Cd"`
	Prtry string `json:"Prtry"`
}

// SettlementDateTimeIndication1 ...
type SettlementDateTimeIndication1 struct {
	DbtDtTm string `json:"DbtDtTm"`
	CdtDtTm string `json:"CdtDtTm"`
}
```

```
// SettlementInstruction4 ...

type SettlementInstruction4 struct {

	SttlmMtd	string	`json:"SttlmMtd"`

	SttlmAcct	CashAccount24	`json:"SttlmAcct"`

	ClrSys	ClearingSystemIdentification3Choice	`json:"ClrSys"`

	InstgRmbrsmntAgt	BranchAndFinancialInstitutionIdentification5
`json:"InstgRmbrsmntAgt"`

	InstgRmbrsmntAgtAcct	CashAccount24
`json:"InstgRmbrsmntAgtAcct"`

	InstdRmbrsmntAgt	BranchAndFinancialInstitutionIdentification5
`json:"InstdRmbrsmntAgt"`

	InstdRmbrsmntAgtAcct	CashAccount24
`json:"InstdRmbrsmntAgtAcct"`

	ThrdRmbrsmntAgt	BranchAndFinancialInstitutionIdentification5
`json:"ThrdRmbrsmntAgt"`

	ThrdRmbrsmntAgtAcct	CashAccount24
`json:"ThrdRmbrsmntAgtAcct"`

}


// SettlementTimeRequest2 ...

type SettlementTimeRequest2 struct {
```

```
        CLSTm  string `json:"CLSTm"`

        TillTm string `json:"TillTm"`

        FrTm   string `json:"FrTm"`

        RjctTm string `json:"RjctTm"`

}


// StructuredRegulatoryReporting3 ...

type StructuredRegulatoryReporting3 struct {

        Tp   string                            `json:"Tp"`

        Dt   string                            `json:"Dt"`

        Ctry string                            `json:"Ctry"`

        Cd   string                            `json:"Cd"`

        Amt  ActiveOrHistoricCurrencyAndAmount `json:"Amt"`

        Inf  string                            `json:"Inf"`

}


// StructuredRemittanceInformation13 ...

type StructuredRemittanceInformation13 struct {

        RfrdDocInf  ReferredDocumentInformation7  `json:"RfrdDocInf"`

        RfrdDocAmt  RemittanceAmount2             `json:"RfrdDocAmt"`
```

```
        CdtrRefInf  CreditorReferenceInformation2 `json:"CdtrRefInf"`
        Invcr       PartyIdentification43         `json:"Invcr"`
        Invcee      PartyIdentification43         `json:"Invcee"`
        TaxRmt      TaxInformation4               `json:"TaxRmt"`
        GrnshmtRmt  Garnishment1                  `json:"GrnshmtRmt"`
        AddtlRmtInf []string                      `json:"AddtlRmtInf"`
}

// SupplementaryData1 ...
type SupplementaryData1 struct {
        PlcAndNm string                   `json:"PlcAndNm"`
        Envlp    SupplementaryDataEnvelope1 `json:"Envlp"`
}

// SupplementaryDataEnvelope1 ...
type SupplementaryDataEnvelope1 struct {
}

// TaxAmount1 ...
type TaxAmount1 struct {
```

```
	Rate	float64	`json:"Rate"`

	TaxblBaseAmt ActiveOrHistoricCurrencyAndAmount `json:"TaxblBaseAmt"`

	TtlAmt	ActiveOrHistoricCurrencyAndAmount `json:"TtlAmt"`

	Dtls	TaxRecordDetails1	`json:"Dtls"`

}


// TaxAmountAndType1 ...

type TaxAmountAndType1 struct {

	Tp  TaxAmountType1Choice	`json:"Tp"`

	Amt ActiveOrHistoricCurrencyAndAmount `json:"Amt"`

}


// TaxAmountType1Choice ...

type TaxAmountType1Choice struct {

	Cd    string `json:"Cd"`

	Prtry string `json:"Prtry"`

}


// TaxAuthorisation1 ...

type TaxAuthorisation1 struct {
```

```
    Titl string `json:"Titl"`

    Nm   string `json:"Nm"`

}


// TaxInformation3 ...

type TaxInformation3 struct {

    Cdtr         TaxParty1                    `json:"Cdtr"`

    Dbtr         TaxParty2                    `json:"Dbtr"`

    AdmstnZn       string                       `json:"AdmstnZn"`

    RefNb          string                       `json:"RefNb"`

    Mtd           string                        `json:"Mtd"`

    TtlTaxblBaseAmt ActiveOrHistoricCurrencyAndAmount `json:"TtlTaxblBaseAmt"`

    TtlTaxAmt      ActiveOrHistoricCurrencyAndAmount `json:"TtlTaxAmt"`

    Dt            string                        `json:"Dt"`

    SeqNb          float64                      `json:"SeqNb"`

    Rcrd          TaxRecord1                    `json:"Rcrd"`

}


// TaxInformation4 ...

type TaxInformation4 struct {
```

```
    Cdtr         TaxParty1                    `json:"Cdtr"`
    Dbtr         TaxParty2                    `json:"Dbtr"`
    UltmtDbtr      TaxParty2                    `json:"UltmtDbtr"`
    AdmstnZone     string                       `json:"AdmstnZone"`
    RefNb          string                       `json:"RefNb"`
    Mtd          string                       `json:"Mtd"`
    TtlTaxblBaseAmt ActiveOrHistoricCurrencyAndAmount `json:"TtlTaxblBaseAmt"`
    TtlTaxAmt      ActiveOrHistoricCurrencyAndAmount `json:"TtlTaxAmt"`
    Dt           string                       `json:"Dt"`
    SeqNb          float64                      `json:"SeqNb"`
    Rcrd          TaxRecord1                    `json:"Rcrd"`
}

// TaxParty1 ...
type TaxParty1 struct {
    TaxId  string `json:"TaxId"`
    RegnId string `json:"RegnId"`
    TaxTp  string `json:"TaxTp"`
}
```

```
// TaxParty2 ...
type TaxParty2 struct {
        TaxId   string          `json:"TaxId"`
        RegnId  string          `json:"RegnId"`
        TaxTp   string          `json:"TaxTp"`
        Authstn TaxAuthorisation1 `json:"Authstn"`
}


// TaxPeriod1 ...
type TaxPeriod1 struct {
        Yr     string          `json:"Yr"`
        Tp     string          `json:"Tp"`
        FrToDt DatePeriodDetails `json:"FrToDt"`
}


// TaxRecord1 ...
type TaxRecord1 struct {
        Tp       string    `json:"Tp"`
        Ctgy     string    `json:"Ctgy"`
        CtgyDtls string    `json:"CtgyDtls"`
```

```
    DbtrSts  string    `json:"DbtrSts"`

    CertId   string    `json:"CertId"`

    FrmsCd   string    `json:"FrmsCd"`

    Prd      TaxPeriod1 `json:"Prd"`

    TaxAmt   TaxAmount1 `json:"TaxAmt"`

    AddtlInf string    `json:"AddtlInf"`

}


// TaxRecordDetails1 ...

type TaxRecordDetails1 struct {

    Prd TaxPeriod1                     `json:"Prd"`

    Amt ActiveOrHistoricCurrencyAndAmount `json:"Amt"`

}
```

*1.3 Payment Instruction json Data Model*

Account:

{"AccountNumber":"","AccountType":"","Currency":"","OwningFI":"","Transit":"","Balance":0,"ActivityIDs":null}

Payment:

{"ActivityID":"","DebitCreditIndicator":"","Timestamp":"0001-01-01T00:00:00Z","BeneficiaryName":"","OrderingCustomer":"","OrderingBank":"","Amount":0,"ValueDate":"0001-01-01T00:00:00Z"}

BalanceAdjustment: {"ActivityID":"","DebitCreditIndicator":"","Timestamp":"0001-01-01T00:00:00Z","BalanceAmount":0,"ValueDate":"0001-01-01T00:00:00Z"}

1.4 XBR Feed to CML

The following table shows the mapping of data elements for future feed from XBR Blockchain ledger to CML (similar to current feed from BESS to CML). It demonstrates the data elements in XBR ledger can be used to post accounting entries to CML.

| FX/LD CASH FLOW FIELD | FT BESS XML FIELD | Value Assigned | XBR Mapping |
|---|---|---|---|
| system_name | SYSTEM-NAME-001 | "BESS" | Set to "BESS" |
| app_code | APP-CODE-0001 | "C901" for "FB" accounts "LVTS" for "OI" accounts "VOST" for "vostro" accounts. Such information is assigned to the list accounts found in CMLMGTDT data file. | NULL |
| transaction_ref | TRANSACTION-REF-0001 | "NULL" | NULL |
| leg_number | LEG-NUMBER-0001 | "NULL" | NULL |
| amendment_number | AMENDMENT-NUMBER-0001 | "NULL" | NULL |
| ledger_ref | LEDGER-REF-0001 | Set as PII-IN-TRN of PII (Transaction reference tag 20) If it is blank, set as "NULL" | Set based on Tag 20 of payment (i.e Sender's reference #) |
| debit_credit_ind | DEBIT-CREDIT-IND-0001 | Set as "D" if account found in CMLMGTDT is the payment's debit account. Set as "C" if account found in CMLMGTDT is the payment's credit account. | "D" (for South North Payments) |
| post_date | POST-DATE-0001 | Format "YYYYMMDD". Set as PTI-VDATE of PH (Value Date) with leading "20". If the payment is back valued, set as BUSINESS-DATE of OFCINFO (Office date). | Set based on noted values in the SPD |
| value_date | VALUE-DATE-0001 | Format "YYYYMMDD". Set as PTI-VDATE of PTI (Value Date) with leading "20". | Set based on relevant data in the payment |
| amount | AMOUNT-0001 | Set as PMI-AMOUNT of PMI (Amount) | Set based on relevant data in the payment |
| FX-LD_rate | FX-RATE-0001 | "NULL" | NULL |
| currency | CURRENCY-0001 | Set as PMI-SWF-CURR-ID of PMI (Currency). | Set based on relevant data in the payment |
| operation_type | OPERATION-TYPE-0001 | "NEW" | NEW |
| ledger_account | LEDGER-ACCOUNT-0001 | Set as ACCOUNT-ID of PMI-ACCOUNT-ID of PMI. (Assigned debit/credit account) From position 19, insert the account name for 35 characters. | 007624003885 |
| account_book_transit | ACCOUNT-BOOK-TRANSIT-0001 | "NULL" | NULL |
| account_book_global_id | ACCOUNT-BOOK-GLOBAL-ID-0001 | "NULL" | NULL |
| trade_counterparty | TRADE-COUNTERAPARTY-0001 | "NULL" | NULL |
| trade_counterparty_global_id | TRADE-COUNTERPARTY-GLOBAL-0001 | "NULL" | NULL |
| trade_counterparty_transit | TRADE-COUNTERPARTY-TRANSI-0001 | "NULL" | NULL |
| trading_book | TRADING-BOOK-0001 | "NULL" | NULL |

-continued

| FX/LD CASH FLOW FIELD | FT BESS XML FIELD | Value Assigned | XBR Mapping |
|---|---|---|---|
| trading_book_global_id | TRADING-BOOK-GLOBAL-ID-0001 | "NULL" | NULL |
| trading_book_transit | TRADING-BOOK-TRANSIT-0001 | "NULL" | NULL |
| country_of_book | COUNTRY-OF-BOOK-0001 | "NULL" | NULL |
| matching_reference | MATCHING-REFERENCE-0001 | Format "yymmddnnnnnnsss" Set as ICN of ICN-PLUS of QUEUE-REC (Transaction ICN). | Set based on ICN |
| capture_operator | CAPTURE-OPERATOR-0001 | "BESS" | "BESS" |
| UTC_capture_timestamp | UTC-CAPTURE-TIMESTAMP-0001 | Set as PTI-UPDATE-TIMESTAMP of PTI (after conversion). (The date/time assigned by the PFTMDRV process when the payment is queued to the EODP process). | Set based on noted field in SPD |
| product_type | PRODUCT-TYPE-0001 | "NA" | NA |
| nostro_code | NOSTRO-CODE-0001 | "NULL" | NULL |
| time_critical | TIME-CRITICAL-0001 | "NULL" as default Set as "TSPTIME hrmn" where "hrmn" is from PTI-TSP-TIME of PTI if not blank. | NULL |
| CDR_id | CDR-ID-0001 | "NULL" | NULL |
| BDR_id | BDR-ID-0001 | "NULL" | NULL |
| SDR_id | SDR-ID-0001 | "NULL" | NULL |
| trans_ref_match | TRANS-REF-MATCH-0001 | "NULL" as default. If the captured account is defined as part of a layered account, move in the layered account and layered account name (starting in position 19) found in the corresponding CMLMGTDT record. | NULL |
| Item_type | ITEM-TYPE-0001 | "NULL" | NULL |
| deal_date | DEAL-DATE-0001 | "NULL" | NULL |
| maturity_—date | MATURITY-DATE-0001 | "NULL" | NULL |
| beneficiary_name | BENEFICIARY-NAME-0001 | Set as PPI-PARTY-NAME of PPI (bene). If there is a problem, set as "NULL". | Set based on relevant filed in the payment |
| ordering_customer | ORDERING-CUSTOMER-0001 | Set as PPI-PARTY-NAME of PPI (ord-cust). If there is a problem, set as "NULL". | Set based on relevant filed in the payment |
| ordering_bank | ORDERING-BANK-0001 | Set as PPI-PARTY-NAME of PPI (ord-bank). If there is a problem, set as "NULL". | Set based on relevant filed in the payment |

Figure 10:
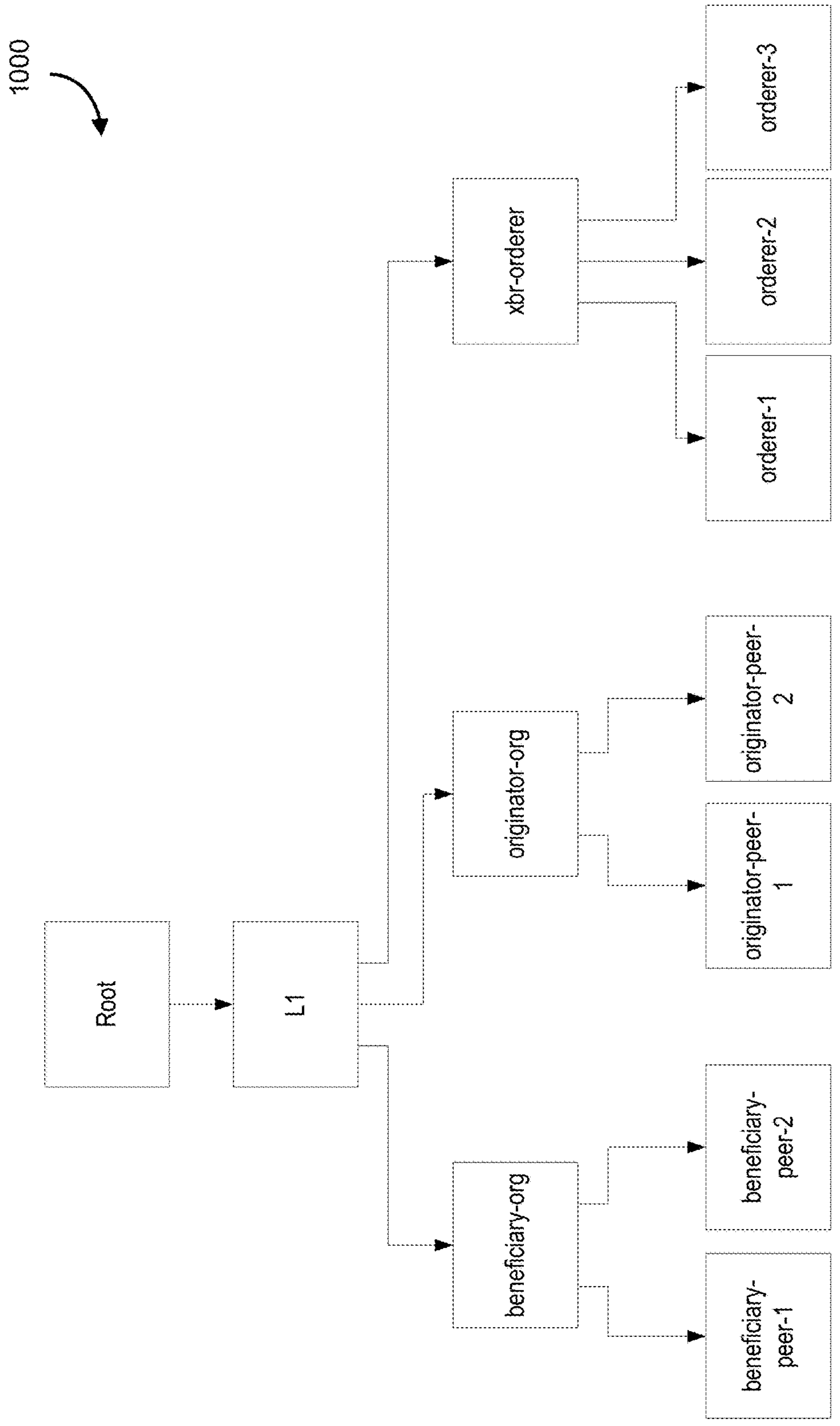
FIG. 10 is an example block schematic of a certificate structure, according to some embodiments.

FIG. 10 is an example block schematic of a certificate structure 1000, according to some embodiments.

In FIG. 10, Root refers to Root CA and L1 refers to Intermediate Level 1 CA. XBR is deploying three Level 2 CAs (Fabric CAs) referred to as beneficiary-org, originator-org and xbr-orderer.

The certificates for these level 2 CAs are issued by L1 CA. The beneficiary-org Level 2 CA issues certs for peer nodes from beneficiary organization. The originator-org Level 2 CA issues certs for peer nodes from originator organization. The xbr-orderer issues certs for the three orderer nodes.

An example MSP configuration is described below.

```
Crypto config folders:
/crypto/
ordererOrganizations
peerOrganizations
Peers cert folders:
/crypto/peerOrganizations/beneficiary
    /msp
        /admincerts
            beneficiary-org.pem (this is the beneficiary-org Level 2 Certificate)
        /cacerts
            Root CA Certificate
        /intermediatecerts
L1 CA Certificate and beneficiary-org Level 2 Certificate
/signcerts
            beneficiary-org.pem (this is the beneficiary-org Level 2 Certificate)
    /peers
        /beneficiary-peer-1
            /admincerts
                beneficiary-peer-1.pem (Peer 1 Cert issued by beneficiary-org
Level 2 CA)
            /cacerts
                Root CA Certificate
            /intermediatecerts
                Level 1 CA Certificate and beneficiary-org Level 2 Certificate
/signcerts
                beneficiary-peer-1.pem (Peer 1 Cert issued by beneficiary-org
Level 2 CA)
            /keystore
                beneficiary-peer-1-key.pem (private key)
        beneficiary-peer-2
            /admincerts
                beneficiary-peer-2.pem (Peer 2 Cert issued by beneficiary-org
Level 2 CA)
            /cacerts
                Root CA Certificate
            /intermediatecerts
                Level 1 CA Certificate and beneficiary-org Level 2 Certificate
            /signcerts
                beneficiary-peer-2.pem (Peer 2 Cert issued by beneficiary-org
Level 2 CA)
            /keystore
                beneficiary-peer-2-key.pem (private key)
Orderers cert folders:
/crypto/ordererOrganizations/xbr-orderer/
    /msp
/admincerts
            xbr-orderer.pem (this is the rbc-orderer-L2 Level 2 Certificate)
        /cacerts
            Root CA Certificate
        /intermediatecerts
L1 CA Certificate and orderer-L2 Level 2 Certificate
/signcerts
            xbr-orderer.pem (orderer-L2 Level 2 Certificate)
    /orderers
        /xbr-orderer-1
            /admincerts
                orderer-1.pem (Orderer 1 Cert issued by xbr-orderer Level 2
CA)
            /cacerts
                Root CA Certificate
            /intermediatecerts
                Level 1 CA Certificate and xbr-orderer.pem Level 2 Certificate
/signcerts
                orderer-1.pem (Orderer 1 Cert issued by xbr-orderer Level 2
CA)
            /keystore
                orderer-1-key.pem (private key)
        ...
```

Fabric CA intermediate CAs can be configured to use LDAP to perform user authentication enrollment process.

When the user logs in the user ECerts are requested from Fabric CA (for respective organization) if not already present in the Nodejs server cache.

A number of considerations need to be kept in mind with the above approach:

Fabric CA can generate X.509 certificates and keys that support both RSA and Elliptic Curve (ECC). Specifically, Fabric CA can support certificates based on RSA 2048 with SHA 256. Level 1 Intermediate CA and Root CA only support RSA certificates. However, the system can generate ECC based certificate signing requests from Fabric CA.

Applicants have validated that these can be signed by Level 1 Intermediate CA and that Fabric can validate the resulting certificate chain.

XBR application, specifically the Nodejs component authenticates users through integration with LDAP. User authorization is at coarse grained level-controlling access to specific screens via LDAP user groups.

Three user roles are defined: super user, originator user, and beneficiary user to provide access controls for various UI capabilities as described in user stories. LDAP groups are created for these roles and users are added to these groups.

In addition, a system user and an associated LDAP group also needs to be defined to enable Nodejs server to invoke the Payment Instruction chaincode towards submitting payment transactions that are received from the payment instructions messaging legacy system to the XBR ledger. An ECert is provisioned for such a system user; Nodejs server uses this ECert when invoking the chaincode to perform this operation.

Role based authorization occurs at two levels:

- The Nodejs application relies on LDAP group membership (retrieved as part of user authentication) to authorize user access to specific UI components and screens.
- Chaincode also perform authorization to ensure that the chaincode operations (such as invokes/queries) etc. are only performed based on privileges available to user in a specific role. The Chaincode authorization prevents unauthorized access to chaincode operations. For instance, a query that retrieves a summary view for the Originator user will check if the user is part of the originator users' LDAP group. The Chaincode authorization will be based on LDAP group membership.

Cryptographic Technologies Used by XBR

The system can utilize the following cryptographic technologies:

Cryprographic Algorithms

Elliptic Curve Digital Signature Algorithm (ECDSA). ECDSA also offers the following key size options:

| Size | ASN1 OID | Signature Algorithm |
|---|---|---|
| 256 | prime256v1 | ecdsa-with-SHA256 |
| 384 | secp384r1 | ecdsa-with-SHA384 |
| 521 | secp521r1 | ecdsa-with-SHA512 |

RSA

| Size | Module (bits) | Signature Algorithm |
|---|---|---|
| 2048 | 2048 | sha256WithRSAEncryption |
| 4096 | 4096 | sha512WithRSAEncryption |

Digital Certificates (e.g., X509 Certificates)

Figure 11:
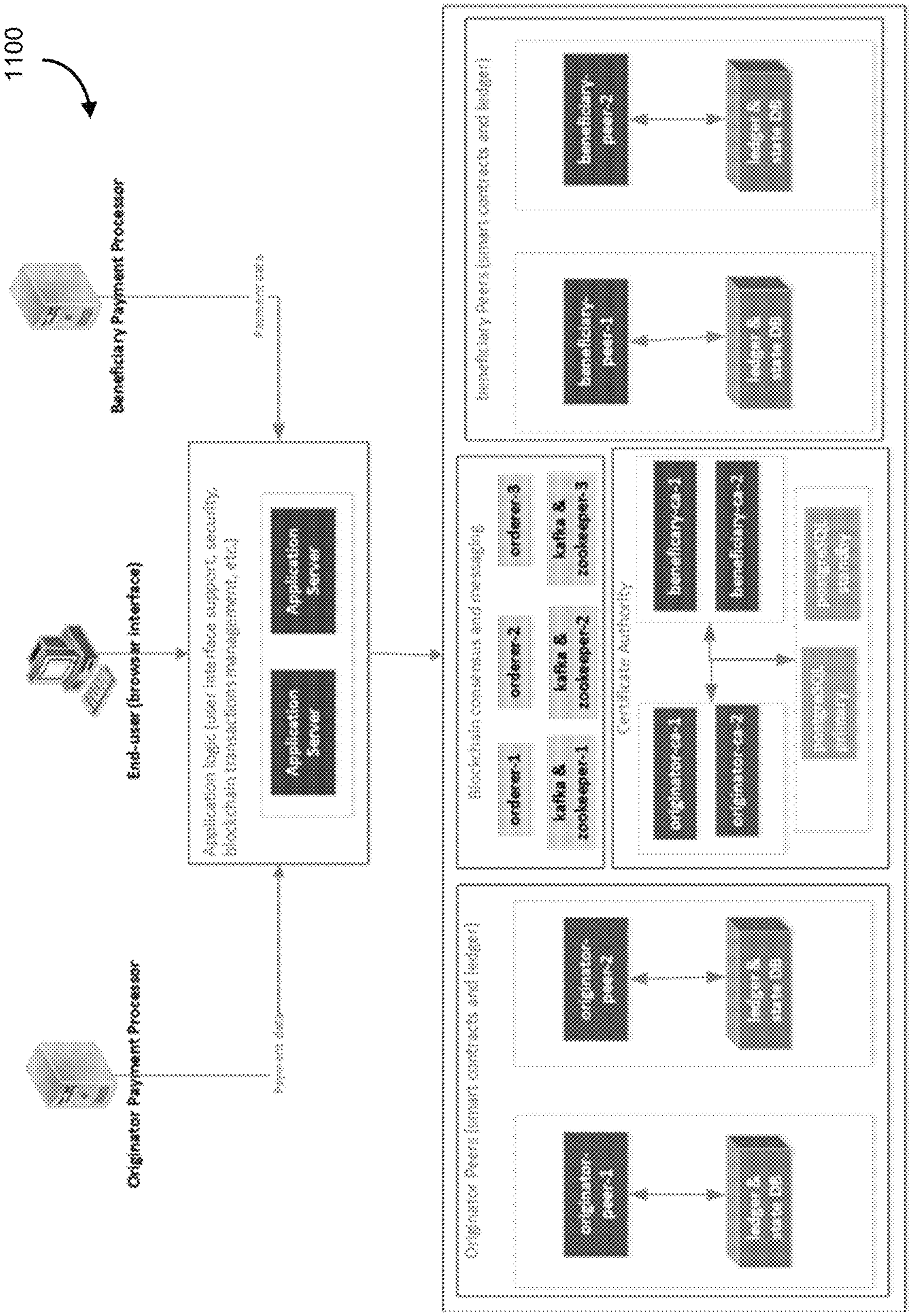
FIG. 11 is a block schematic diagram of an example cross border payment system, according to some embodiments.

FIG. 11 is a block schematic diagram of an example cross border payment system, according to some embodiments. In the block schematic 1100, a system is shown later in processes, and user browser cases and beneficiary processors operate together to communicate data messages to a blockchain based platform for smart contracts and conducting cross-border payment transfers. As shown in FIG. 11, the system includes a set of computing nodes which are configured to maintain a coordinated distributor ledger. These nodes can include originating peers, beneficiary peers, among others, and certificate authorities can be used to generate and otherwise maintain certificates that are used for the various cryptographic functions provided by the system.

Figure 12:
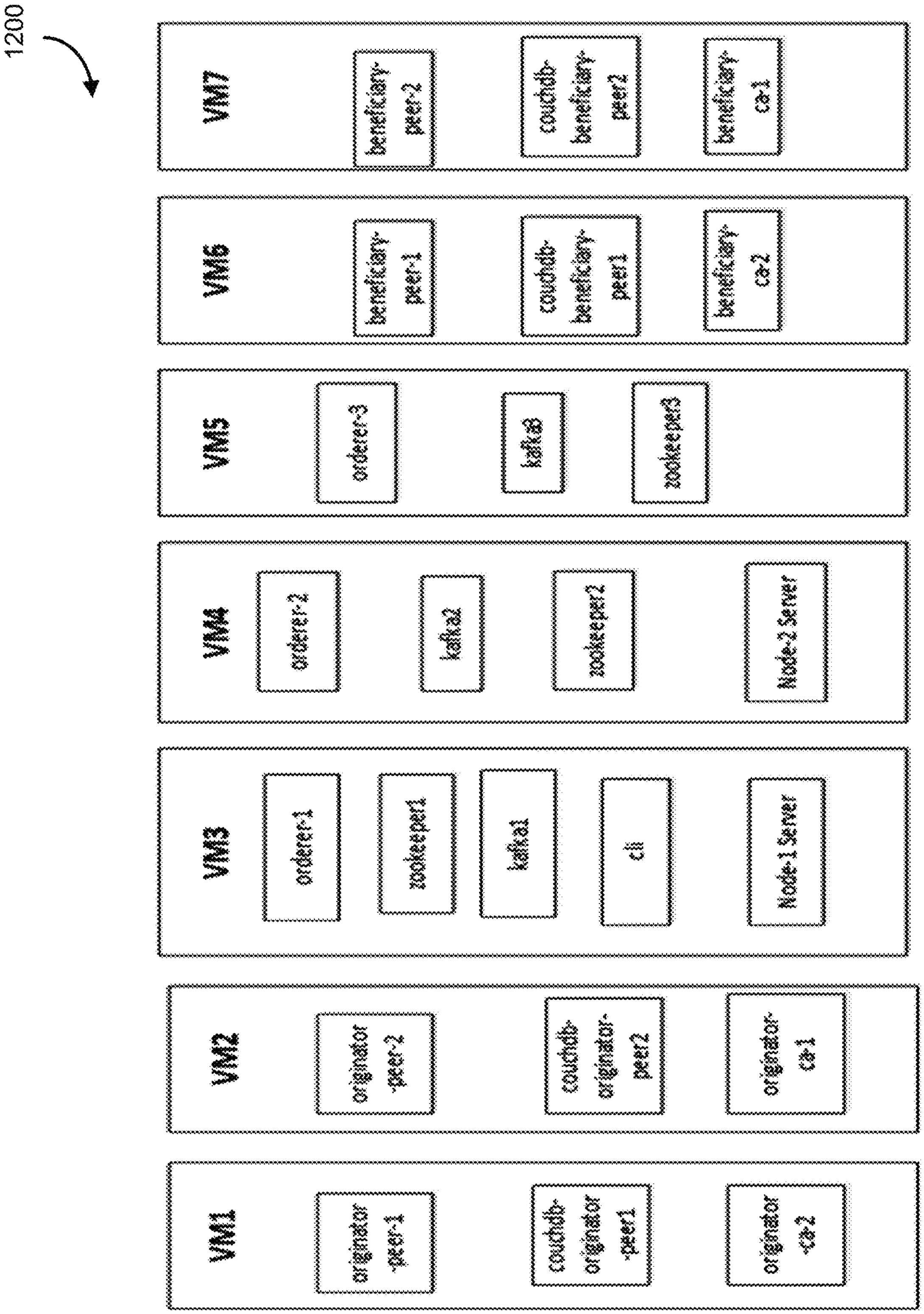
FIG. 12 is a block schematic of a deployment environment, according to some embodiments.

FIG. 12 is a block schematic of a deployment environment, according to some embodiments. The blocks schematic diagram 1200, a set of virtual machines are shown that provide a balance loading resilient infrastructure. There are seven different virtual machines shown in FIG. 12, and these include virtual machines that are adapted as originators, beneficiaries, and orderers.

The machines are used to deploy an embodiment of the XBR blockchain system on seven VMs based on Applicant's experimentation with different deployment topologies. The Nodejs servers have the highest CPU utilization followed by the endorsing peers, so evenly distributing these components across the underlying infrastructure is crucial. With two Nodejs application servers the throughput can reach close to 1,000 TPS with this specific topology that aligns with FIG. 12 what matches current legacy payment performance for large FI entities. This kind of throughput can be reached on a low-to-mid-end hardware such as 8 vCPUs and 12 GB of memory per VM.

Besides the specific deployment topology from FIG. 12, the XBR application and Hyperledger Fabric components were tuned in order to reach the high throughput. The tuning included:

- transactions block size configurations (e.g., Hyperledger Fabric specific parameters such as number of transactions in the block, block batch timeout, etc.),
- Nodejs application configuration tuning for the separation of peers with endorser and source event roles and worker threads for increased concurrent processing of transactions,
- peers tuning for the concurrent transactions validations, and
- CouchDB database low level tuning (e.g., monotonic ID generation what improves insertion and retrieval operations, B+ tree chunk size tuning, etc.).

Figure 9:
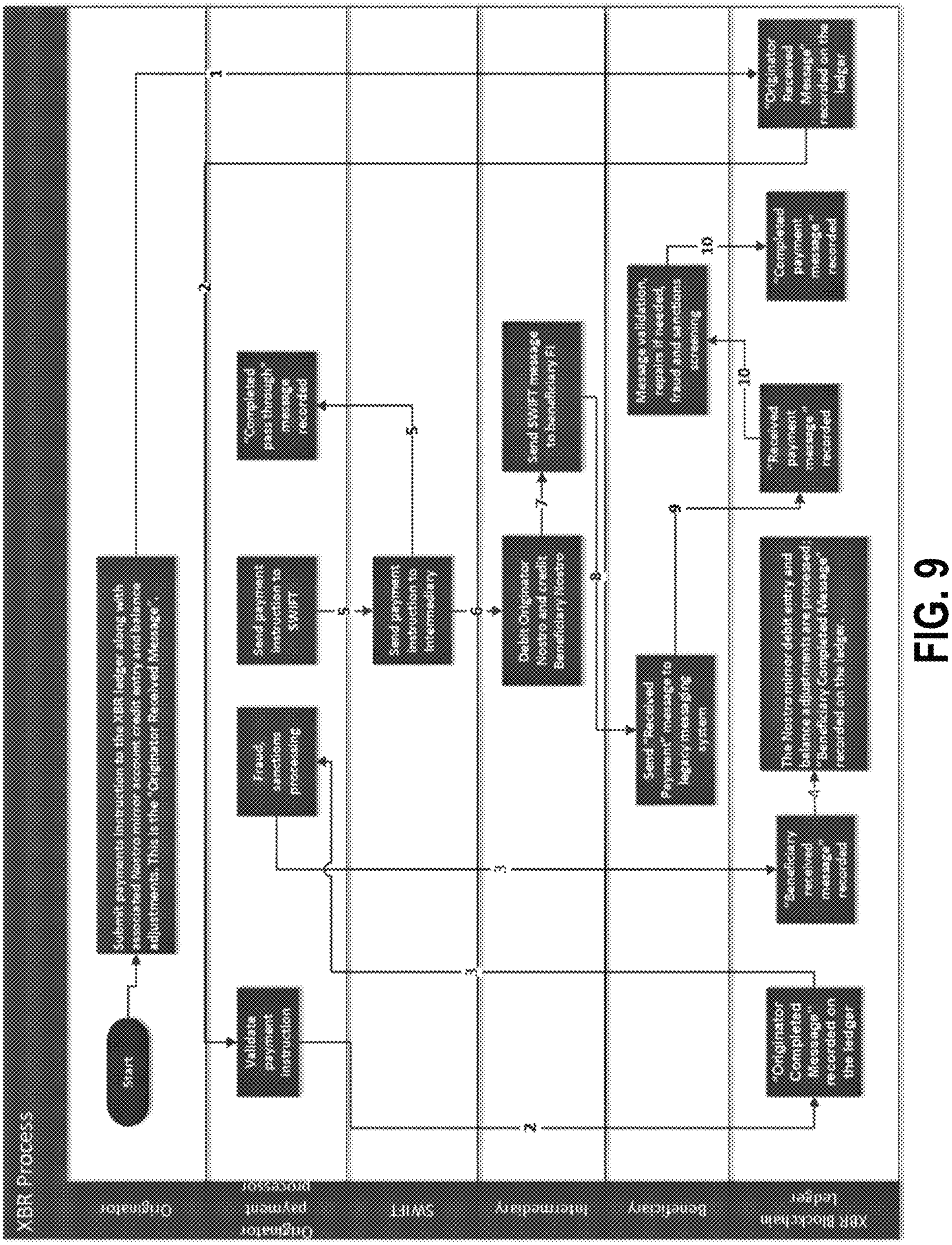
FIG. 9 is a flowchart showing aspects of an example method, according to some embodiments.

The XBR solution has a high availability capability that is engineered using the following deployment configuration reflected in FIG. 9. This high availability capability differentiates the system of some embodiments, from alternate permissioned ledgers that can be built using Hyperledger Fabric, and is an improved engineering solution for high reliability systems of record in a mission critical environment.

Each organization has a pair of peers what provides high availability support in a case that any of the peers fails. Three orderers running on separate machines guarantee orderer service high availability. The same stands for the two Nodejs servers cluster. If any of the Nodejs servers fails the cluster provides a failover to another running server.

VM1, VM2, VM3, VM4, VM5, VM6, and VM7 are Red Hat Enterprise Linux (RHEL) 7.5 VM guests (deployed to Z/VM hypervisor on z/OS) and they run the following components:

VM1:

Originator peer (endorser) 1 (originator-peer-1)

CouchDB for Originator peer 1 (couchdb-originator-peer-1)

Originator Fabric Certificate Authority second instance (originator-ca-2)

VM2:

Originator peer (endorser) 2 (originator-peer-2)

CouchDB for Originator peer 2 (couchdb-originator-peer-2)

Originator Fabric Certificate Authority first instance (originator-ca-1)

VM3:

First orderer instance (orderer-1)

First Zookeeper instance (zookeeper1)

First Kafka broker (kafka1)

CLI (cli)

First Node server instance (Node-1 Server)

VM4:

Second orderer instance (orderer-2)

Second Zookeeper instance (zookeeper2)

Second Kafka broker (kafka2)

Second Node server instance (Node-2 Server)

VM5:

Third orderer instance (orderer-3)

Third Zookeeper instance (zookeeper3)

Third Kafka broker (kafka3)

VM6:

Beneficiary peer (endorser) 1 (beneficiary-peer-1)

CouchDB for Beneficiary peer 1 (couchdb-beneficiary-peer-1)

Beneficiary Fabric Certificate Authority second instance (beneficiary-ca-2)

VM7:

Beneficiary peer (endorser) 2 (beneficiary-peer-2)

CouchDB for Beneficiary peer 2 (couchdb-beneficiary-peer-2)

Beneficiary Fabric Certificate Authority first instance (beneficiary-ca-1)

The system components as shown in the above diagram are further described below.

XBR UI

A User Interface that enables clients to access the capabilities provided by the application.

XBR Nodejs Server

XBR Nodejs server is a server side application component that provides the following capabilities:

- Provides the primary interface to the Blockchain network (and underlying distributed ledger) through the invocation of user defined (i.e., XBR Application) and system chain codes using the Hyperledger Fabric provided Node SDK.
- Delivers a set of APIs for front end UI (to support UI capabilities),
- Supports the authentication and authorization of user through integration with Corporate LDAP server and user attributes (e.g. group membership) available in the LDAP
- Encapsulates the integration with external systems and handles of relevant protocol and data transformations prior to the invocation of chain codes Endorser Nodes (Peers)

Both originator and beneficiary organization will run endorser nodes for endorsing the transactions through chaincode execution and upon delivery of block from orderer validating the transactions and committing them to the ledger. An endorser node will be deployed with a dedicated instance of ledger. In context of the system of some embodiments, each organization can run a minimum of two nodes for high availability.

Ordering Service (Orderer)

The ordering service provides mechanism for provisioning and managing channels and provides total order guarantees for transactions that are delivered to members (peers) of the channel. Ordering Service is a shared service that is typically deployed in shared consortium model or hosted by 3rd party.

Figure 13:
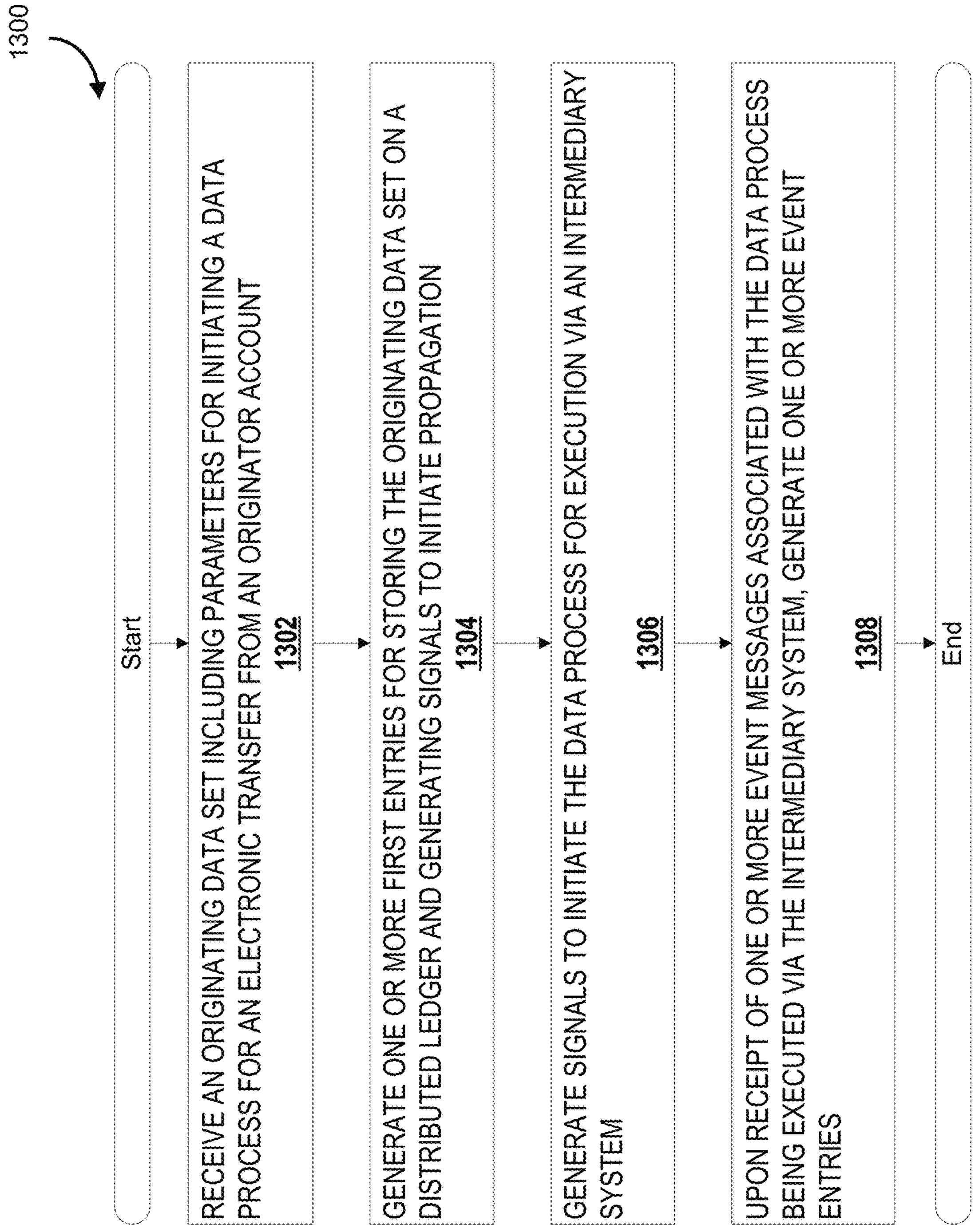
FIG. 13 is a method diagram showing an example computer implemented process for utilizing a blockchain based distributed ledger system for cross-border transactions, according to some embodiments.

FIG. 13 is a method diagram showing an example computer implemented process for utilizing a blockchain based distributed ledger system for cross-border transactions, according to some embodiments. In the method 1300, steps 1302-1308 are provided.

The method 1300 is implemented on a computer system for managing data processing states utilizing distributed ledgers on a plurality of nodes, and the system can include a memory device for storing distributed ledger data, and at least one processor. The computer processor is coupled to one or more of the plurality of computer nodes, and can be configured to execute steps of a method.

At 1302, the processor receives an originating data set including parameters for initiating a data process for an electronic transfer from an originator account, managed by a first centralized ledger system associated with a first entity, to a beneficiary account managed by a second centralized ledger system associated with a second entity.

For example, the processor can receive a data set including parameters for initiating an electronic transfer of funds from an originator account managed by financial institution A two beneficiary account managed by financial institution B. In some situations, financial institution A and financial institution B may operate in different jurisdictions and/or may require data processes to be initiated via an intermediary system such as the SWIFT system. In some embodiments, the parameters can include account numbers, financial institution identifiers, amounts to be transferred, and/or any other parameters described herein or otherwise and/or any combination thereof. In some embodiments the originator account and/or the beneficiary account are managed by a centralized ledger system associated with the respective financial institutions. It should be understood that centralized ledger system can include systems which have more than one ledger such as backup ledgers, etc.; however, a centralized ledger system can in some embodiments refer to a system where a single entity controls and validates account balances and transactions.

In some embodiments, the originating data set can comprise and/or can be included in an originator received message.

At 1304, the processor generates one or more first entries for storing the originating data set on a distributed ledger and generating signals to initiate propagation of the one or more first entries to the plurality of nodes.

For example, the processor can generate one or more entries including the originating data set (i.e, the data in the original data set in in the same or a different format). In some embodiments, the originating data set has been converted, translated or otherwise normalized or storage in the distributed ledger.

In some embodiments, the first entries are stored after the payment instruction has been validated as described herein or otherwise.

In some embodiments, the first entries can include/comprise/delete related to a master payment object and/or an originator completed message.

In some embodiments generating signals to initiate the propagation of the first entry includes signing the entries with the appropriate encryption keys associated with the originator account and/or the first entity. In some embodiments, generating the signals includes generating signals to initiate or execute a smart contract for ing to the distributed ledger.

At 1306, the processor generates signals to initiate the data process for execution via an intermediary system. For example, generating signals to initiate an electronic transaction for example the SWIFT network.

In some embodiments, the first centralized ledger system associated with the first entity can be configured to conduct validation activities before initiating the data process via the intermediary system. For example, in some embodiments, validation activities can include verifying one or more parameters in the originating data set do not violate fraud and/or sanctions rules. In some embodiments, this includes comparing or otherwise verifying the parameters do not satisfy any fraud or sanction conditions such as matching blacklists, exhibiting fraudulent data processing activity patterns, etc.

In some embodiments, the processor may generate one or more entries for storage in the distributed ledger in association with the first entries once validation activities have been completed.

Upon receipt of one or more event messages associated with the data process being executed via the intermediary system, at 1308, the processor generates one or more event entries for storing in association with the one or more first entries on the distributed ledger and generating signals to initiate propagation of the one or more event entries to the plurality of nodes.

For example, the event messages can include intermediary and/or beneficiary received payment messages, completed payment messages, exception messages, and the like. In some embodiments, the event messages can indicate that a subsequent data process has been triggered by the intermediary system via a third centralized ledger system. For example, a multi-hop SWIFT transaction which involves additional transactions with one or more intermediate financial institutions. For example the example scenario above, the transaction may require electronic funds to be transferred from financial institution A to financial institution C which then transfers funds to financial institution B. In some scenarios, the distributed ledger system can provide greater transparency into the state of data processing transactions. This may be especially true in multi-hop SWIFT transactions where an originating entity has limited visibility and communication with intermediary financial institutions.

In some embodiments, the processor is configured to identify one or more first entries to which a received event message is associated. In some embodiment, one or more key fields in the event entry corresponds to more fields in the first entry. In some embodiments, determining whether fields correspond between the event messages and the first entries involves hashing one or more fields in the event messages and comparing them with hashed fields in the first entries.

In some embodiments, the processor is configured to generate an orphan event entry for storing in an orphan list on the distributed ledger. In some embodiments, the orphan list is a separate data structure from the first entries. In some embodiments, the orphan list is configured to store event message data which does not correspond first entries stored on the distributed ledger.

In some embodiments, the orphan list is additionally or alternatively configured to store event message data which is inconsistent with the state of the data process executing electronic transfer. In some embodiments, the state of the data process is based on the entries in the distributed ledger associated with the transaction. For example, a transaction request which has been received submitted for execution via the intermediary system but has yet to be completed can have a first entry and a subsequent event entry corresponding to the "received payment message" in FIG. 9 stored on the distributed ledger. The processor can track or otherwise determine the state of this transaction based on these entries. In some embodiments, the processor determines the state by explicitly storing a state value based on the received event entries. In some embodiments, the processor can understand or otherwise determine the state by checking the last event entry associated with the transaction (e.g, stored in association with the first entry).

In some embodiments, the state define whether a subsequently received event message is a valid next event (e.g. after a received payment message, the next message can be a completed payment message or an exception message). In some situations, the state can define whether a subsequently received event message is inconsistent with the current state of the transaction data process (e.g. a completed payment message received before a received payment message, or a second received payment message).

In some embodiments, upon generating one or more additional event entries for storing association with the transaction ledger, the processor figured to traverse the orphan list or otherwise identify any orphan event entries which are now consistent with the state of the transaction. For example, if a completed payment message is stored in the orphan list and a corresponding received payment message recorded in association with the transaction the processor can identify the related completed payment message from the orphan list store are otherwise associated with the transaction. In some situations, this can ensure the state of the transaction is up to date and can ensure any out of order messages are properly processed.

Out of order messages can occur when multiple computing systems are involved due to network or processing latencies and the like. In some scenarios, some embodiments may enable proper handling of out of order messages which may cause errors or may simply be dropped by conventional distributed ledger architectures.

In some embodiments, the processor is configured to identify duplicate events based on one or more fields and received event messages or new originating data sets. The environment, the processor is configured to drop, flag, and/or prevent the duplicate events from being stored on the distributed ledger.

In some embodiments, identifying duplicate events can include comparing originating accounts, beneficiary accounts, amounts, relative timing of the events, and the like. In some embodiments, comparing these fields can include comparing hashes of the one or more fields.

Duplicate messages can occur when communication messages are resent for example when acknowledgement is not received or is delayed. Duplicate messages can also occur due to user error, for example when a user clicks submit on a transaction more than once. In some scenarios, some embodiments may enable proper handling of duplicate messages (e.g. by not processing a second message or flagging a second message as being a possible duplicate in the distributed ledger). In contrast, other distributed ledger architectures may simply process second messages as additional events can be incorrect or cause problems.

As described herein or otherwise, in some embodiments the processor is configured to cryptographically sign the original data set certificate associated with the originator account. In some embodiments the certificate is stored in a key store of the computing system associate with the first entity which manages the originator account. In some embodiments, signed originating data set is submitted to one or more pure endorsers associated with the first entity. The pure endorsers can be configured to validate signed data set and/or the first certificate and send an endorsement response. In some embodiments, upon receipt of the endorsement response which may include a cryptographic signature generated with a private key of the endorser processor is configured to generate a first entry/or a subsequent event entry including this endorsement response.

In some embodiments, the processors are configured to manage a mirror account for tracking electronic funds associated with a originator and/or beneficiary account. In some embodiments the mirror account is a mirror of a Nostro or originator-intermediary account which represents funds held by the intermediary system on behalf of the originator's financial institution. In some embodiments, the processor generates credit entries in this mirror account when the originating data set is received, and generates debit entries when the data process is initiated. In some embodiments, the mirror account can help track an entity's near real time electronic fund situation across many transactions currently being processed.

In some embodiments, the processors are similarly configured to manage mirror accounts tracking funds received in the beneficiary accounts. responsive to a determination that the one or more transaction events has occurred, trigger an alert or sending control signals to modify an amount of reserve funds held for maintaining liquidity to account for foreign exchange fluctuations.

In some embodiments, as described herein or otherwise, read and write access to the distributed ledger can be controlled and executed using smart contracts. In some embodiments, the smart contracts are configured to allow read and/or write access based on a cryptographic key associated with a requester associated with the requesting device. In some embodiments, the processor is configured to generate reports based on the requestor's role (e.g. originator, beneficiary, financial institution, auditor, etc.). The data available to these requesters can differ and can be enabled for access by the smart contracts when a cryptographic key associated with the corresponding transactions is presented.

FIG. 9 is a flowchart showing aspects of an example method. In some embodiments, the aspects illustrated in FIG. 9 and described below can be applied to, can provide additional implementation detail, and/or alternative features to the example method 1300 illustrated in FIG. 13.

Similarly, all features described or suggested herein can be applied to, can provide additional implementation detail, and/or alternative features to the example method 1300 illustrated in FIG. 13.

The following list provides a description of non-limiting example actions performed by one or more processors in the corresponding numbered steps of FIG. 9.

1. Payment originator records on the XBR ledger a payment instruction along with associated Nostro mirror account credit entry and balance adjustments. This is the "Originator Received Message".
2. When the payment instruction is validated the state of the payment instruction is recorded on the ledger. This is the "Originator Completed Message".
3. After additional processing of the payment instruction (e.g., fraud, sanctions, etc.), the updated instruction is recorded on the ledger as "Beneficiary Received Message".
4. The Nostro mirror debit entry and balance adjustments are processed and the new state of the payment instruction is recorded as "Beneficiary Completed Message" on the ledger.
5. Source originator system sends the wire instruction (SWIFT MT 103) to an intermediary over the SWIFT network. The "Completed Pass Through" message is recorded on the ledger when the source system receives the ACK/NAK from SWIFT network.
6. An intermediary receives the SWIFT MT 103 (sent by RBC US) and processes the wire instruction by debiting Originator Nostro and crediting Beneficiary Nostro.
7. The intermediary sends SWIFT MT 103 (Serial Method) to beneficiary FI.
8. The beneficiary legacy payment processor receives the SWIFT MT 103 wire payment instruction sent by the intermediary and sends the "Received Payment" message to legacy messaging system.
9. As per the processing outline above, XBR persists the payment instruction to the ledger. The instruction is persisted with unique key that includes the PID and Feed Type. The Feed Type in this case is "Received".
10. The legacy payment processor will validate received payment instruction (e.g., validation, fraud, sanctions, etc.) and after the successful validation, the instruction will be stored in the payment processor messaging database, which XBR will pick it from and store it as "Completed" payment instruction in the XBR ledger.

Cryptographic Operations (Data Insertion)

For each step of the process flow above, the following non-limiting list describes example cryptographically significant operations which can be used by the application per Hyperledger Fabric's transaction lifecycle:

1. A client (e.g., originator operator accessing application via Angular UI or a payment message picked up from a message queue) submits a transaction request to the XBR Nodejs application server. The Nodejs application server maps the clients/users to their cryptographic certificates (enrolment certificates). Each transaction is signed by the Nodejs server that uses client's enrolment certificate to sign it. The certificates are stored in the client's organization Hyperledger Fabric Certificate Authority Membership Service Provider keystore (disk or Hardware Security Module (HSM)).
2. The Nodejs server submits the signed client's transaction to a set (one or more) of the peer endorsers in the organization for the transaction endorsement.
3. The peers cryptographically verify if the signature on the transaction belongs to the client that has submitted it. The peers perform this verification using the client's public key which it obtains from the organization's MSP. In order for the verification to succeed the client has to belong to the same organization as the peer.
4. Peers simulate the transaction and return the endorsement result to the Nodejs server signed by its own private key which it obtains from its organization's MSP.
5. Nodejs verifies two aspects of peer endorser response: peer's response signature by using peer's public key obtained from peer's organization MSP, and if the endorsement response return code is valid.
6. Nodejs server submits endorser response to an orderer that puts the endorser response including the transaction in a block. During this step orderer also verifies client's signature. The orderer performs this verification using the client's public key which it obtains from the organization's MSP.

7. When the block is filled or the block batch timeout is reached, the orderer will cut the block and broadcast it to all peers for transactions validation and committing to the ledger.
8. The peers first validate orderer's signature on the block and then validate and commit each transaction in the block.

Cryptographic Operations (Data Retrieval)

In some embodiments, the application can be configured to execute the following cryptographically significant operations for data retrievals:

1. A client (e.g., originator operator accessing application via Angular UI or a payment message picked up from a message queue) submits a query transaction request to the XBR Nodejs application server. The Nodejs application server maps the clients/users to their cryptographic certificates (enrolment certificates). Each transaction is signed by the Nodejs server that uses client's enrolment certificate to sign it. The certificates are stored in the client's organization Hyperledger Fabric Certificate Autrhority Membership Service Provider keystore (disk or Hardware Security Module (HSM)).
2. The Nodejs server submits the signed client's query transaction to a same organization peer that will execute the query against its own local copy of the ledger.
3. The peers cryptographically verify if the signature on the query transaction belongs to the client that has submitted it. The peers perform this verification using the client's public key which it obtains from the organization's MSP. In order for the verification to succeed the client has to belong to the same organization as the peer,
4. Peer returns the query results to Nodejs server after signing it with its own private key.
5. Nodejs verifies two aspects of peer's query response: peer's query response signature by using peer's public key obtained from peer's organization MSP, and if the query response code was valid.
6. Nodejs sends the query results to the client.

Payment Instructions Data Model Design

To manage the payment instruction life cycle (process flow from the previous section) as the payment instruction traverses the path from originator through intermediaries onto beneficiary, an example embodiment can include three data entities that are managed on the XBR Blockchain (distributed) ledger:

Master Payment: An asset that provides a single view of a payment, its status and key fields and maintains a relationship with underlying payment instruction assets. The key fields include Amount, Ordering Customer, Ordering Customer Account, Beneficiary Name. The key of Master Payment is the (Originating) Payment Instruction ID (PID). The Master Payment also contains a "Payments Index" that consist of an index of keys to payment instruction assets that are related to the same payment (at either participants). The Master payment can be looked up using both the PID of originating message (i.e. Originator Received message) and key fields.

Payment Instruction: This asset represents the payment instruction either the full instruction or status of instruction (as submitted) by participating financial institutions (FI)s. The asset is keyed on PID and Feed Type (e.g. "PID+Received" or "PID+Completed"). PID can be unique at each participant (originator/beneficiary) and can be used to correlate the Received at Completed Messages at each participant.

Orphan List: An asset that represents a list of orphan payments that have not been associated with a master payment (e.g. out of order messages). Distributed systems have an in-built problem dealing with out of order messages. This concept has been created and implemented by us to solve this fundamental problem in distributed systems in a context of this payment process. The Orphan List holds a set of keys to the payment instruction that are "orphans". Orphans are payments that have not been associated with any Master Payment. The Orphan List contains a set of key value pairs, where key is either the PID or the PID concatenated with a set of key fields from the payment instruction and value is the set of keys to the actual payment instruction asset. The value is a set of keys since we can have 2 messages pertaining to a beneficiary that both have same set of key fields.

This approach for processing payment instructions is based on following principles and assumptions. In XBR we implemented all of these principles by creating a blockchain-based protocol for decentralized peer-to-peer payments:

Only a "Received" message from the originator initiates creation of Master Payment. This makes sense since this message represents the originating payment instruction.

To identify the "Received" message from the originator (and distinguish it from the "Received" message on the beneficiary side), the originating message is determined based on comparing the Sender BIC in the SWIFT Application Header Block (block 2) with the Ordering Institution BIC (field 52A).

Because the field 52A is critical for the payment instructions processing, and it may not be available in some messages (e.g., Sender BIC is not in the ISO pacs 008), the XBR implementation of the protocol contains a capability that is able to derive missing attributes' values and populate them in incomplete messages. They will be added as extension elements to SpIMtryData/Envlp/SenderBIC during parsing of MT 103 messages (by the node application server).

Since no common payment identifier exists between originator and beneficiary, messages are correlated based on specific key fields: Amount, Ordering Customer Name, Ordering Customer Account, Beneficiary Name. While this will work in context of small number of messages exchanged between these two participants, the approach cannot work well in long term. It is advised that in long term, a common payment identifier be carried in messages (as in SWIFT GPII) to enable such payment tracking.

XBR Patent Unique Capabilities

As described herein or otherwise, in some embodiments, the system can provide a state machine-based payments processing engine. In some embodiments, the engine is based on a state machine implemented via a smart contract.

In some embodiments, the system provides or acts as a duplicate Message Handler. A problem in distributed systems is receipt of duplicate messages.

In some embodiments, the system integrates a blockchain platform with an enterprise user entitlement system. In some embodiments, the system is designed and engineered to have capabilities that link enterprise entitlements to blockchain protocol security controls across the following aspects of the application: users, roles, digital certificates, infrastructure, and UI screens. In some situations, this may improved regulatory compliance.

In some embodiments, the system may provide reporting capability. For example, in some embodiments, the system may enable users to be able to query the ledger and receive information required to make decisions. In some embodiments, reports are implemented via a smart contract and presented to users through Angular UI. The smart contract for each report is may be invoke according to the steps described in the reporting steps section or otherwise.

In some embodiments, the system can provide synthetic business day capability: This capability may, in some situations, provide that the XBR application has the notion of a business day with an explicit open and close state. The synthetic business day is implemented via a smart contract that is triggered at a particular time each day. This is the basis for critical operations such as re-setting balances of Nostro accounts.

Nostro Mirror Modelling and Design

The tracking of Nostro mirror entries provides foundation for tracking of Nostro accounts in Blockchain.

An example design of the Nostro Mirror Tracking is explained below.

Nostro Account Modelling: Nostro Mirror account is modelled as an asset within XBR Blockchain solution. This means modelling the account with relevant data elements such as account number, owning party, balance, transaction details, debit/credit indicator etc. The solution is initialized with two Nostro Mirror accounts: one each for originator and beneficiary. Initialization will set up the Nostro mirror accounts with real account numbers (as they exist in the legacy systems).

Originator Reconciliation: When the originator legacy payment processor sends the "Originator Received Message" to XBR, XBR will record the payment instruction on the blockchain ledger and post a credit entry to the Originator Nostro Mirror account held in XBR ledger with relevant transaction details.

Since Nostro mirror balances are not tracked in XBR ledger, we simply initialize opening balance to zero each day with each credit/debit entry adjusting such a balance. In long term, the balances will reflect the real balances on Nostro account (not mirror account) held at correspondents. With this approach, we were able to provide the key elements contained in legacy reports allowing validation of the information contained within XBR ledger is correct and consistent with information received from existing source.

XBR records the following properties as part of the Nostro Mirror Account: Account, Description, Debits, Credits, Net (balance). In addition, payment transaction details pertaining to the account entry such as ordering customer, beneficiary name, value date, amount, transaction reference are recorded to aid in reconciliation.

Beneficary Reconciliation: The beneficiary Reconciliation is provided with real time view of intra-day and end of day Nostro Mirror Account entries so that Nostro Mirror entries recorded in XBR ledger can be used as an additional source when reconciling the intermediary statements with the current feed received from the payment processor. These entries are provided through the UI. When payment is received by the beneficiary from the intermediary, the beneficiary payment processor processes the incoming wire instruction and posts the completed payment details to the XBR blockchain ledger through the legacy payment messaging system. This message is referred to in this document as "Completed Beneficiary Message". XBR commits the payment instruction details to the ledger and post a debit entry to the beneficiary Nostro Mirror account with relevant transaction details.

Since Nostro mirror balances are not tracked in XBR ledger, we will simply initialize opening balance to zero each day with each credit/debit entry adjusting such a balance. In long term, the balances will reflect the real balances on Nostro account (not mirror account) held at correspondents. With this approach, we were able to provide the key elements contained in legacy reports allowing validation of the information contained within XBR ledger is correct and consistent with information received from existing source.

In current process, Key assumption with the above approach are following:

Information outlined above are sufficient for modelling Nostro mirror account in XBR Other than the reference data pertaining to the Nostra Mirror account number, details pertaining to posting of debit/credit entries to Nostro mirror are available in the payment instruction (e.g. amount, value date, counterparty details etc.)

Resetting of Nostra mirror balances at specific time inte als e.g. beginning of day/end of day) is sufficient.

Payment Instruction Processing Overview

All payment instructions are processed using XBR custom built state machine. This capability is not available out of the box in Hyperledger Fabric.

In a normal course of events, the first message that is received by XBR for a payment is the payment instruction from an originator. In this event, the processing is as follows:

The Java Messaging Services (JMS) client receives the message from the message queue. The message is delivered to the message queue by a legacy system. JMS client invokes the REST API provided by the Nodejs application server (node server), Node server invokes the Payment Instruction chaincode (smart contract). The terms "chaincode" and "smart contract" are used interchangeably. They mean the same thing in this document.

The chaincode will perform the following:

Persist the payment instruction to the ledger. The instruction is persisted with unique key that includes the PID and Feed Type. The Feed Type in this case is "Received". The feed type is required in order to differentiate between received and completed messages.

Check if the feed type is "Received" and Sender BIC=Ordering Institution BIC, This condition will evaluate to true for the originator Received message. In this case, the chaincode will create and persist a Master Payment to the ledger. The key of Master Payment is the Payment Instruction's PID. The Master Payment status is set to "Pending". A "Payments Index" is created in Master Payment consisting of key to payment instruction (which is the PID+Feed Type as outlined earlier).

Orphan List: Perform a lookup against the Orphan list for any payments with same PID or key fields (amount, ordering customer, beneficiary name etc.). If a matching payment key is found, add that key to the "Payments Index" in Master Payment and remove from Orphan List.

Following this process, an originator Completed Message is received by XBR. In this case, the following processing occurs:

As per the processing outline above, we will persist the payment instruction to the ledger. The instruction is persisted with unique key that includes the PID and Feed Type. The Feed Type in this case is "Completed".

Check if the feed type is "Received" and Sender BIC=Ordering Institution BIC. This condition will evaluate to false since feed type is "Completed" for the originator Completed message. In this case, the chaincode will look up Master Payment by PID. The Master Payment status is updated as appropriate. The key to the "Completed" message will be added to the "Payment Index" property of Master Payment.

Following this the Beneficiary Received message is received by XBR.

As per the processing outline above, we will persist the payment instruction to the ledger. The instruction is persisted with unique key that includes the PID and Feed Type. The Feed Type in this case is "Received".

Check if the feed type is "Received" and Sender BIC=Ordering Institution BIC. This condition will evaluate to false since Sender BIC < > Ordering Institution BIC. In this case, the chaincode will look up Master Payment by key fields (Amount, ordering customer name, Ordering customer account and beneficiary name). The Master Payment status is updated as appropriate. The key to the "Received" message will be added to the "Payment Index" property of Master Payment.

Following this, the beneficiary Completed message is received by XBR.

As per the processing outline above, we will persist the payment instruction to the ledger. The instruction is persisted with unique key that includes the PID and Feed Type. The Feed Type in this case is "Completed".

Check if the feed type is "Received" and Sender BIC=Ordering Institution BIC. This condition will evaluate to false since message is "Completed". In this case, chaincode will look up Master Payment by key fields (Amount, ordering customer name, Ordering customer account and beneficiary name). The Master Payment status is updated as appropriate. The key to the "Completed" message will be added to the "Payment Index" property of Master Payment Now let's consider a few exception scenarios that can occur when messages arrive out of order. Messages can arrive out of order when there is backup of messages on queue (e.g. when the legacy messaging system or the Nodejs application server is down for a period of time and begin consuming messages when they come back up). Messages can also be consumed out of order if they arrive in quick succession. JMS listeners are deployed to consume from queue in a concurrent fashion and scenarios outlined can cause message processing to thus occur out of sequence.

In all scenarios below, the payment instruction is always persisted to the ledger first (as described in happy path earlier), Thus, this step is not repeated in description below, Scenario 1: A "Completed" message is received for the originator before a "Received" message for the originator has been processed. In this case, processing is as follows:

The look up of Master Payment by PID will fail. In this case, add the following to the Orphan List: <PID, payment instruction key> where payment instruction key represents the key to the "Completed" message that is persisted in the ledger.

Scenario 2: A "Received" message is received for RBC CA before a "Received" message for RBC US has been processed. In this case, processing is as follows:

The look up of Master Payment by PID will fail. In this case, lookup the orphan list by key fields. Key fields represents a composite key consisting of Amount, Ordering Customer Name, Ordering Customer Account, Beneficiary name. If found, add the Payment Instruction key of the "Received" message to the value. As described earlier, the value is set of keys to the actual payment (PID+Feed Type), If Key fields are not found, create a key, value pair with the key being the key fields and value consisting of the payment instruction key.

Scenario 3: A "Completed" message is received for RBC CA before a "Received" message for RBC US has been processed. In this case, processing is as follows:

The look up of Master Payment by PID will fail. In this case, lookup the orphan list by key fields. Key fields represents a composite key consisting of Amount, Ordering Customer Name, Ordering Customer Account, Beneficiary name. If found, add the Payment Instruction key of the "Received" message to the value. As described earlier, the value is set of keys to the actual payment (PID+Feed Type). If Key fields are not found, create a key, value pair with the key being the key fields and value consisting of the payment instruction key.

When the Originator "Received" message is eventually received, the processing of Orphan List will occur as outlined earlier.

The XBR protocol implementation has a capability that addresses duplicate message input. In addition to the above, we can have scenarios where chaincode may be invoked to persist the same payment instruction twice. This kind of duplicate message processing can occur when JMS client does not receive acknowledgement from Node application that payment instruction has been processed. To address this scenario, before a payment instruction is persisted (for any of above scenarios), a look up will be performed against database to determine if key already exists. If key is not found, then the data will be persisted. This is implemented via the duplicate message handler capability listed above.

Trust Model and Security

We run one intermediate Certificate Authority (CA) per organization. In this model, the beneficiary organization will have its own CA and originator organization will also have its own CA. For the XBR implementation, the CAs are based on the Hyperledger Fabric CA that provides features such as:

- Registration of identities, or connects to LDAP as the user registry for enterprise users.
- Issuance of Enrollment Certificates (ECerts) for users, nodes (peers, orderers etc.)
- Certificate Renewal and Revocation.

A Root CA issues certs to a Level 1 Intermediate CA. The Certs are based on RSA (2048 key size) and SHA 256. XBR can then provision intermediate CAs referred to as Level 2 Intermediate CAs, the Level 2 CA certs are signed by Level 1 and Level 2 can then provision application specific certificates. In line with this approach, the design for federating trust model within XBR will involve the following components:

An intermediate CA (fabric CA server) that will provision ECerts for members of originator or beneficiary organization (users, peers etc.). The certificate for this intermediate CA will be provisioned and signed by Level 1 Intermediate CA.

The XBR Orderer L2 certificate that is provisioned and signed by the Level 1 intermediate CA. XBR Orderer L2 will then provision certificates for the orderer nodes.

The detailed configuration of MSP required for peers and orderers based on this design is described below.

The configuration of certification authority for originator and beneficiary CA and by implication the MSP configuration required for peers and orderers is described below.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A monitoring system for monitoring a series of point-to-point centralized ledger electronic transactions between a series of centralized ledger systems, the monitoring system managing data processing states utilizing distributed ledgers on a plurality of nodes, the system comprising:

a memory device for storing distributed ledger data, and at least one processor of one or more of the plurality of nodes configured for:

receiving an originating data set including parameters for a data process executed over a network between a first centralized ledger system and a second centralized ledger system, the data process for an electronic transfer from an originator account on the first centralized ledger system and associated with a first entity, to a beneficiary account on the second centralized ledger system and associated with a second entity;

generating one or more first entries for storing the originating data set on a distributed ledger of the monitoring system and generating signals to initiate propagation of the one or more first entries to the plurality of nodes;

communicating data messages between the first centralized ledger system and an intermediary centralized ledger system to execute a first hop of the data process, wherein the first hop is a first of a series of intermediate point-to-point centralized ledger transactions between the first centralized ledger system and the second centralized ledger system; and upon receipt of one or more event messages associated with the data process being executed via the intermediary centralized ledger system, generating one or more event entries for storing in association with the one or more first entries on the distributed ledger of the monitoring system and propagating the one or more event entries to the plurality of nodes; and invoking a chain implementing a state machine to monitor a data processing state of the data process, wherein the chaincode is configured for:

persisting each event entry to the distributed ledger with a unique key comprising a data process identifier and a feed type indicator, the feed type indicator differentiating between a received message and a completed message for a same data process;

upon initial receipt of the originating data set, creating a master payment object on the distributed ledger keyed by the data process identifier and associating the originating data set with the master payment object, the master payment object maintaining a payments index comprising an index of keys to data process entries associated with the electronic transfer;

for each subsequently received event entry, associating the event entry with the master payment object by: evaluating whether a sender institution identifier in the event entry corresponds to the ordering institution identifier in the originating data set, and when the sender institution identifier corresponds to the ordering institution identifier, associating the event entry with the master payment object by the data process identifier, and when the sender institution identifier does not correspond to the ordering institution identifier, performing a composite-key lookup against the distributed ledger using a plurality of payment fields extracted from the event entry to identify and associate the event entry with the corresponding master payment object;

updating the data processing state of the electronic transfer when traversal of the distributed ledger of the monitoring system indicates that a pair of related event entries for a particular hop of the data process are on the ledger, the pair of event entries comprising:

a transmission event entry including information from an event message received from one of the first centralized ledger system, the intermediary centralized ledger system, or the second centralized ledger system which is a first point in the particular hop of the data process in the series of intermediate centralized ledger point-to-point transactions, and a corresponding receipt event entry including information from an event message received from another of the first centralized ledger system, the intermediary centralized ledger system, or the second centralized ledger system which is a corresponding second point in the particular hop; and adding a key to the transmission event entry and a key to the corresponding receipt event entry to the payments index of the corresponding master payment object.

2. The system of claim 1, wherein the at least one processor of the one or more of the plurality of nodes are configured for: identifying event entry associated with the one or more first entries based on at least one key field in the corresponding event entry and at least one key field in the one or more first entries, wherein identifying the event entry comprises hashing the at least one key field in the event entry and comparing the hashed at least one key field with corresponding hashed key fields in the one or more first entries stored on the distributed ledger.

3. The system of claim 1 wherein the at least one processor of the one or more of the plurality of nodes are configured for: generating an orphan event entry for storing in an orphan list on the distributed ledger when at least one key field in the associated one or more event messages do not correspond to any first entries stored on the distributed ledger, wherein the orphan list is keyed by a composite key comprising a plurality of payment fields including an amount, an ordering customer identifier, an ordering customer account, and a beneficiary identifier; and upon receipt of a subsequent originating data set, performing a lookup against the orphan list using the composite key and, when a matching orphan event entry is found, adding a key to the matching orphan event entry to the payments index of a corresponding master payment object and removing the matching orphan event entry from the orphan list.

4. The system of claim 1 wherein the at least one processor of the one or more of the plurality of nodes are configured for: generating an orphan event entry for storing one or more orphan event entries in an orphan list on the distributed ledger when the one or more event messages are inconsistent with a state of the corresponding data process for the electronic transfer, the state being determined by the state machine based on the feed type indicator of the most recent event entry associated with the master payment object; wherein the state of the corresponding data process for the electronic transfer is based on the one or more first entries and any associated event messages on the distributed ledger.

5. The system of claim 4 wherein the at least one processor of the one or more of the plurality of nodes are configured for:

upon generating one or more additional event entries for storing in association with the one or more first entries on the distributed ledger, performing a lookup against the orphan list by data process identifier or by the composite key comprising the plurality of payment fields to identify one or more orphan event entries that are consistent with the state of the corresponding data process based on the one or more additional event entries, and storing the identified one or more orphan event entries from the orphan list in association with the one or more first entries and adding corresponding keys to the payments index of the master payment object.

6. The system of claim 1 wherein the at least one processor of the one or more of the plurality of nodes are configured for:

upon determining that at least one key field in the one or more event messages or in a new originating data set are indicative of a duplicate event, generating signals for processing the one or more event messages or in a new originating data set without storing corresponding data in the distributed ledger, wherein determining that the at least one key field is indicative of a duplicate event comprises comparing hashes of one or more fields in the event entry with hashes of corresponding fields in existing entries on the distributed ledger.

7. The system of claim 1 wherein the at least one processor is configured for:

cryptographically signing the originating data set with a first certificate associated with the originator account, the first certificate stored in a keystore of the first entity;

submitting the signed originating data set to one or more peer endorsers associated with the first entity; and upon receipt of an endorsement response including a cryptographic signature generated with a private key of the one or more peer endorsers, generating the one or more first entries including the endorsement response.

8. The system of claim 1 wherein the at least one processor is configured for:

when the originating data set is received, generating signals for storing a credit entry for a mirror originator-intermediary account, the mirror originator account mirroring an originator account managed by the intermediary centralized ledger system; and generating signals for storing a debit entry for the mirror originator-intermediary account based on the signals to initiate the data process for execution via the intermediary centralized ledger system.

9. The system of claim 1 wherein when the intermediary centralized ledger ‘system generates signals for execution of the data process via a third centralized ledger system associated with a third entity; the at least one processor of one or more of the plurality of nodes is configured for generating one or more event entries based on event messages associated with the data process being executed via the third centralized ledger system.

10. The system of claim 1 wherein the at least one processor of the one or more of the plurality of nodes are configured for:

upon receipt of a request for data regarding at least one data process for an electronic transfer from a requesting device, invoking a smart contract to access one or more entries on the distributed ledger based on a cryptographic key associated with a requestor associated with the requesting device; and generating signals for communicating data based on the accessible one or more entries.

11. The system of claim 1, wherein the at least one processor of the one or more of the plurality of nodes are configured for: responsive to a determination that the one or more transaction events has occurred, trigger an alert or sending control signals to modify an amount of reserve funds held for maintaining liquidity to account for foreign exchange fluctuations.

12. A computer-implemented method for monitoring a series of point-to-point centralized ledger electronic transactions between a series of centralized ledger systems and for managing data processing states utilizing distributed ledgers on a plurality of nodes, the method comprising:

receiving an originating data set including parameters for a data process executed over a network between a first centralized ledger system and a second centralized ledger system, the data process for an electronic transfer from an originator account, managed by the first centralized ledger system associated with a first entity, to a beneficiary account managed by the second centralized ledger system associated with a second entity;

generating one or more first entries for storing the originating data set on a distributed ledger of the monitoring system and generating signals to initiate propagation of the one or more first entries to the plurality of nodes;

communicating data messages between the first centralized ledger system and an intermediary centralized ledger system to execute a first hop of the data process, wherein the first hop is a first of a series of intermediate point-to-point centralized ledger transactions between the first centralized ledger system and the second centralized ledger system; and upon receipt of one or more event messages associated with the data process being executed via the intermediary centralized ledger system, generating one or more event entries for storing in association with the one or more first entries on the distributed ledger of the monitoring system and propagating the one or more event entries to the plurality of nodes; and invoking a chaincode implementing a machine to monitor a data processing state of the data process, wherein invoking the chaincode comprises:

persisting each event entry to the distributed ledger with a unique key comprising a data process identifier and a feed type indicator, the feed type indicator differentiating between a received message and a completed message for a same data process;

upon initial receipt of the originating data set, creating a master payment object on the distributed ledger keyed by the data process identifier and associating the originating data set with the master payment object, the master payment object maintaining a payments index comprising an index of keys to data process entries associated with the electronic transfer;

for each subsequently received event entry, associating the event entry with the master payment object by: evaluating whether a sender institution identifier in the event entry corresponds to the ordering institution identifier in the originating data set, and when the sender institution identifier corresponds to the ordering institution identifier, associating the event entry with the master payment object by the data process identifier, and when the sender institution identifier does not correspond to the ordering institution identifier, performing a composite-key lookup against the distributed ledger using a plurality of payment fields extracted from the event entry to identify and associate the event entry with the corresponding master payment object;

updating the data processing state of the electronic transfer when traversal of the distributed ledger of the monitoring system indicates that a pair of related event entries for a particular hop of the data process are on the ledger, the pair of event entries comprising:

a transmission event entry including information from an event entry received from one of the first centralized ledger system, the intermediary centralized ledger system, or the second centralized ledger system which is a first point in the particular point-to-point transaction in the series of intermediate centralized ledger point-to-point transactions, and a corresponding receipt event entry including information from an event entry received from another of the first centralized ledger system, the intermediary centralized ledger system, or the second centralized ledger system which is a corresponding second point in the particular point-to-point transaction; and adding a key to the transmission event entry and a key to the corresponding receipt event entry to the payments index of the corresponding master payment object.

13. The method of claim 12, comprising: identifying event entry associated with the one or more first entries based on at least one key field in the corresponding event entry and at least one key field in the one or more first entries, wherein identifying the event entry comprises hashing the at least one key field in the event entry and comparing the hashed at least one key field with corresponding hashed key fields in the one or more first entries stored on the distributed ledger.

14. The method of claim 12, comprising: generating an orphan event entry for storing in an orphan list on the distributed ledger when at least one key field in the associated one or more event messages do not correspond to any first entries stored on the distributed ledger, wherein the orphan list is keyed by a composite key comprising a plurality of payment fields including an amount, an ordering customer identifier, an ordering customer account, and a beneficiary identifier; and upon receipt of a subsequent originating data set, performing a lookup against the orphan list using the composite key and, when a matching orphan event entry is found, adding a key to the matching orphan event entry to the payments index of a corresponding master payment object and removing the matching orphan event entry from the orphan list.

15. The method of claim 12, comprising: generating an orphan event entry for storing one or more orphan event entries in an orphan list on the distributed ledger when the one or more event messages are inconsistent with a state of the corresponding data process for the electronic transfer, the state being determined by the state machine based on the feed type indicator of the most recent event entry associated with the master payment object; wherein the state of the corresponding data process for the electronic transfer is based on the one or more first entries and any associated event messages on the distributed ledger.

16. The method of claim 15, comprising: upon generating one or more additional event entries for storing in association with the one or more first entries on the distributed ledger, performing a lookup against the orphan list by data process identifier or by the composite key comprising the plurality of payment fields to identify one or more orphan event entries that are consistent with the state of the corresponding data process based on the one or more additional event entries, and storing the identified one or more orphan event entries from the orphan list in association with the one or more first entries and adding corresponding keys to the payments index of the master payment object.

17. The method of claim 12, comprising: upon determining that at least one key field in the one or more event messages or in a new originating data set are indicative of a duplicate event, generating signals for processing the one or more event messages or in a new originating data set without storing corresponding data in the distributed ledger, wherein determining that the at least one key field is indicative of a duplicate event comprises comparing hashes of one or more fields in the event entry with hashes of corresponding fields in existing entries on the distributed ledger.

18. The method of claim 12, comprising:

cryptographically signing the originating data set with a first certificate associated with the originator account, the first certificate stored in a keystore of the first entity;

submitting the signed originating data set to one or more peer endorsers associated with the first entity; and upon receipt of an endorsement response including a cryptographic signature generated with a private key of the one or more peer endorsers, generating the one or more first entries including the endorsement response.

19. The method of claim 12, comprising:

when the originating data set is received, generating signals for storing a credit entry for a mirror originator-intermediary account, the mirror originator account mirroring an originator account managed by the intermediary centralized ledger system; and generating signals for storing a debit entry for the mirror originator-intermediary account based on the signals to initiate the data process for execution via the intermediary centralized ledger system.

20. The method of claim 12, comprising: when the intermediary centralized ledger system generates signals for execution of the data process via a third centralized ledger system associated with a third entity, generating one or more event entries based on event messages associated with the data process being executed via the third centralized ledger system.

21. The method of claim 12, comprising:

upon receipt of a request for data regarding at least one data process for an electronic transfer from a requesting device, invoking a smart contract to access one or more entries on the distributed ledger based on a cryptographic key associated with a requestor associated with the requesting device; and generating signals for communicating data based on the accessible one or more entries.

22. The method of claim 12, comprising: responsive to a determination that the one or more transaction events has occurred, trigger an alert or sending control signals to modify an amount of reserve funds held for maintaining liquidity to account for foreign exchange fluctuations.

23. A non-transitory, computer readable medium or media having stored thereon instructions for monitoring a series of point-to-point centralized ledger electronic transactions between a series of centralized ledger systems, the instructions, when executed by at least one processor, configure the at least one processor for:

receiving an originating data set including parameters for a data process executed over a network between a first centralized ledger system and a second centralized ledger system, the data process for an electronic transfer from an originator account, managed by the first centralized ledger system associated with a first entity, to a beneficiary account managed by the second centralized ledger system associated with a second entity;

generating one or more first entries for storing the originating data set on a distributed ledger of a monitoring system and generating signals to initiate propagation of the one or more first entries to a plurality of nodes;

communicating data messages between the first centralized ledger system and an intermediary centralized ledger system to execute a first hop of the data process, wherein the first hop is a first of a series of intermediate point-to-point centralized ledger transactions between the first centralized ledger system and the second centralized ledger system; and upon receipt of one or more event messages associated with the data process being executed via the intermediary centralized ledger system, generating one or more event entries for storing in association with the one or more first entries on the distributed ledger of the monitoring system and propagating the one or more event entries to the plurality of nodes; and invoking a chaincode implementing a state machine to monitor a data processing state of the data process, wherein the chaincode is configured for:

persisting each event entry to the distributed ledger with a unique key comprising a data process identifier and a feed type indicator, the feed type indicator differentiating between a received message and a completed message for a same data process;

upon initial receipt of the originating data set, creating a master payment object on the distributed ledger keyed by the data process identifier and associating the originating data set with the master payment object, the master payment object maintaining a payments index comprising an index of keys to data process entries associated with the electronic transfer;

for each subsequently received event entry, associating the event entry with the master payment object by: evaluating whether a sender institution identifier in the event entry corresponds to the ordering institution identifier in the originating data set, and when the sender institution identifier corresponds to the ordering institution identifier, associating the event entry with the master payment object by the data process identifier, and when the sender institution identifier does not correspond to the ordering institution identifier, performing a composite-key lookup against the distributed ledger using a plurality of payment fields extracted from the event entry to identify and associate the event entry with the corresponding master payment object;

updating the data processing state of the electronic transfer when traversal of the distributed ledger of the monitoring system indicates that a pair of related event entries for a particular hop of the data process are on the ledger, the pair of event entries comprising:

a transmission event entry including information from an event entry received from one of the first centralized ledger system, the intermediary centralized ledger system, or the second centralized ledger system which is a first point in the particular point-to-point transaction in the series of intermediate centralized ledger point-to-point transactions, and a corresponding receipt event entry including information from an event entry received from another of the first centralized ledger system, the intermediary centralized ledger system, or the second centralized ledger system which is a corresponding second point in the particular point-to-point transaction; and adding a key to the transmission event entry and a key to the corresponding receipt event entry to the payments index of the corresponding master payment object.

* * * * *